United States Patent
Smith et al.

(10) Patent No.: US 9,357,469 B2
(45) Date of Patent: May 31, 2016

(54) METHODS AND SYSTEM FOR DYNAMIC SPECTRUM ARBITRAGE WITH MOBILITY MANAGEMENT

(71) Applicant: Rivada Networks, LLC, Colorado Springs, CO (US)

(72) Inventors: Clint Smith, Warwick, NY (US); Nageswara Rao Deekshitha Devisetti, Bangalore (IN); Samuel Smith, Warwick, NY (US)

(73) Assignee: Rivada Networks, LLC, Colorado Springs, CO (US)

(*) Notice: Subject to any disclaimer, the term of this patent is extended or adjusted under 35 U.S.C. 154(b) by 82 days.

(21) Appl. No.: 14/287,111

(22) Filed: May 26, 2014

(65) Prior Publication Data

US 2014/0355463 A1    Dec. 4, 2014

Related U.S. Application Data

(60) Provisional application No. 61/828,360, filed on May 29, 2013, provisional application No. 61/920,368, filed on Dec. 23, 2013.

(51) Int. Cl.
*H04W 36/32* (2009.01)
*H04M 15/00* (2006.01)
*H04W 16/14* (2009.01)
(Continued)

(52) U.S. Cl.
CPC .............. *H04W 36/32* (2013.01); *H04M 15/60* (2013.01); *H04W 16/14* (2013.01); *H04W 36/0016* (2013.01); *H04W 4/22* (2013.01); *H04W 24/00* (2013.01); *H04W 24/02* (2013.01);
(Continued)

(58) Field of Classification Search
None
See application file for complete search history.

(56) References Cited

U.S. PATENT DOCUMENTS 6,434,128 B1 * 8/2002 Benz .................. H04W 72/085
                                                          370/280
6,988,272 B1 * 1/2006 Iwao ...................... G06Q 40/04
                                                          705/37
(Continued)

FOREIGN PATENT DOCUMENTS

EP           2417786 B1     12/2012
JP        2012-029259 A      2/2012
(Continued)

OTHER PUBLICATIONS

International Search Report and Written Opinion issued in International Application No. PCT/US2014/039561 mailed on Oct. 1, 2014.
(Continued)

*Primary Examiner* — Bunjob Jaroenchonwanit
(74) *Attorney, Agent, or Firm* — The Marbury Law Group, PLLC

(57) ABSTRACT

A dynamic spectrum arbitrage (DSA) system includes a dynamic spectrum policy controller (DPC) and a dynamic spectrum controller (DSC) that together dynamically manage the allocation and use of resources (e.g., spectrum resources) across different networks. The DSC component may include wired or wireless connections to eNodeBs, a mobility management entity (MME), and various other network components. These components may be configured to communicate and perform various mobility management operations to better manage and coordinate the handling (e.g., handoffs, hand-ins, backoff, etc.) of wireless devices as they are moved with respect to the allocated resources.

21 Claims, 45 Drawing Sheets

(51) Int. Cl.
*H04W 36/00* (2009.01)
*H04W 24/02* (2009.01)
*H04W 72/04* (2009.01)
*H04W 28/04* (2009.01)
*H04W 24/00* (2009.01)
*H04W 4/22* (2009.01)
*H04W 28/16* (2009.01)
*H04W 72/00* (2009.01)

(52) U.S. Cl.
CPC ............ *H04W 28/04* (2013.01); *H04W 28/16* (2013.01); *H04W 72/00* (2013.01); *H04W 72/04* (2013.01)

(56) References Cited

U.S. PATENT DOCUMENTS

| | | | | |
|---|---|---|---|---|
| 7,124,101 | B1* | 10/2006 | Mikurak | G06Q 10/06 705/35 |
| 7,236,791 | B2 | 6/2007 | Chambers et al. | |
| 8,199,768 | B1* | 6/2012 | Gossett | G06Q 40/04 370/447 |
| 8,279,786 | B1* | 10/2012 | Smith | H04W 16/14 370/310 |
| 8,310,946 | B2 | 11/2012 | Somasundaram et al. | |
| 8,521,636 | B2* | 8/2013 | Chang | G06Q 30/08 305/26.3 |
| 8,670,403 | B2* | 3/2014 | Smith | H04W 16/14 370/252 |
| 8,711,721 | B2* | 4/2014 | Smith | H04W 16/14 370/252 |
| 8,868,119 | B1* | 10/2014 | Gauba | H04W 24/02 370/328 |
| 8,964,685 | B2* | 2/2015 | Smith | H04W 16/14 370/252 |
| 9,088,989 | B2* | 7/2015 | Smith | H04W 72/0493 |
| 2002/0087674 | A1* | 7/2002 | Guilford | H04W 48/18 709/223 |
| 2006/0245404 | A1 | 11/2006 | Bajic | |
| 2007/0149187 | A1 | 6/2007 | Levy | |
| 2007/0280177 | A1 | 12/2007 | Uusikartano et al. | |
| 2008/0108365 | A1* | 5/2008 | Buddhikot | H04W 16/10 455/452.1 |
| 2008/0127232 | A1 | 5/2008 | Langen et al. | |
| 2009/0059856 | A1* | 3/2009 | Kermoal | H04W 16/14 370/329 |
| 2009/0143046 | A1 | 6/2009 | Smith | |
| 2009/0161614 | A1* | 6/2009 | Grandblaise | H04W 16/06 370/329 |
| 2009/0232142 | A1* | 9/2009 | Li | H04W 8/26 370/395.3 |
| 2009/0298461 | A1 | 12/2009 | O'Reilly | |
| 2010/0105400 | A1* | 4/2010 | Palmer | H04W 16/14 455/450 |
| 2010/0142454 | A1* | 6/2010 | Chang | H04W 16/06 370/329 |
| 2010/0216404 | A1* | 8/2010 | Hershey | H04W 72/0486 455/62 |
| 2011/0125905 | A1* | 5/2011 | Baucke | H04M 15/00 709/226 |
| 2011/0158090 | A1* | 6/2011 | Riley | H04L 12/14 370/230 |
| 2011/0228707 | A1* | 9/2011 | Multikainen | H04W 8/04 370/259 |
| 2011/0228750 | A1 | 9/2011 | Tomici et al. | |
| 2011/0231302 | A1* | 9/2011 | Stanforth | G06Q 10/063 705/37 |
| 2011/0269464 | A1 | 11/2011 | Xu et al. | |
| 2012/0014332 | A1* | 1/2012 | Smith | H04W 16/14 370/329 |
| 2012/0124328 | A1* | 5/2012 | McCombs | G06F 12/1027 711/207 |
| 2012/0134328 | A1* | 5/2012 | Gauvreau | H04L 5/0037 370/329 |
| 2012/0165020 | A1 | 6/2012 | Iwamura et al. | |
| 2012/0257597 | A1* | 10/2012 | Zhang | H04W 36/0055 370/331 |
| 2012/0264396 | A1* | 10/2012 | Smith | H04W 16/14 455/404.1 |
| 2012/0270593 | A1* | 10/2012 | Park | H04W 52/40 455/522 |
| 2012/0320741 | A1 | 12/2012 | Freda et al. | |
| 2013/0045759 | A1 | 2/2013 | Smith | |
| 2013/0072146 | A1 | 3/2013 | Smith | |
| 2013/0089067 | A1* | 4/2013 | Ji | H04W 56/00 370/330 |
| 2013/0095843 | A1* | 4/2013 | Smith | H04W 16/14 455/452.1 |
| 2013/0122908 | A1* | 5/2013 | Zhao | H04W 36/08 455/436 |
| 2013/0191266 | A1* | 7/2013 | Dayal | G06Q 30/08 705/37 |
| 2014/0106764 | A1* | 4/2014 | Huang | H04W 72/1252 455/452.1 |
| 2014/0313969 | A1* | 10/2014 | Kalhan | H04W 36/0072 370/312 |
| 2014/0351031 | A1* | 11/2014 | Randel | G06Q 30/08 705/14.14 |
| 2014/0355430 | A1* | 12/2014 | Smith | H04W 16/14 370/230 |
| 2014/0355463 | A1* | 12/2014 | Smith | H04W 24/02 370/252 |
| 2015/0131637 | A1* | 5/2015 | Rubin | G08G 9/02 370/337 |

FOREIGN PATENT DOCUMENTS

| | | |
|---|---|---|
| KR | 10-2012-0126032 A | 11/2012 |
| KR | 10-2013-0015529 A | 2/2013 |
| KR | 10-2013-0048561 A | 5/2013 |
| WO | 2010-049002 A1 | 5/2010 |
| WO | 2012-030190 A2 | 3/2012 |
| WO | 2012-037236 A2 | 5/2012 |
| WO | 2012-064563 A1 | 5/2012 |

OTHER PUBLICATIONS

International Search Report and Written Opinion issued in International Application No. PCT/US2014/039546 mailed on Oct. 2, 2014.
International Search Report and Written Opinion issued in International Application No. PCT/US2014/039580 mailed on Sep. 24, 2014.
International Search Report and Written Opinion issued in International Application No. PCT/US2014/039589 mailed on Sep. 24, 2014.
International Search Report and Written Opinion issued in International Application No. PCT/US2014/039592 mailed on Sep. 24, 2014.
International Search Report and Written Opinion issued in International Application No. PCT/US2014/039696 mailed on Sep. 23, 2014.
International Search Report and Written Opinion issued in International Application No. PCT/US2014/039757 mailed on Oct. 1, 2014.
International Search Report and Written Opinion issued in International Application No. PCT/US2014/039770 mailed on Sep. 29, 2014.
International Search Report and Written Opinion issued in International Application No. PCT/US2014/039785 mailed on Sep. 24, 2014.
International Search Report and Written Opinion issued in International Application No. PCT/US2014/039573 mailed on Oct. 14, 2014.
Notification Concerning Transmittal of International Preliminary Report on Patentability issued in International Application No. PCT/US2014/039785 mailed on Dec. 1, 2015.

* cited by examiner

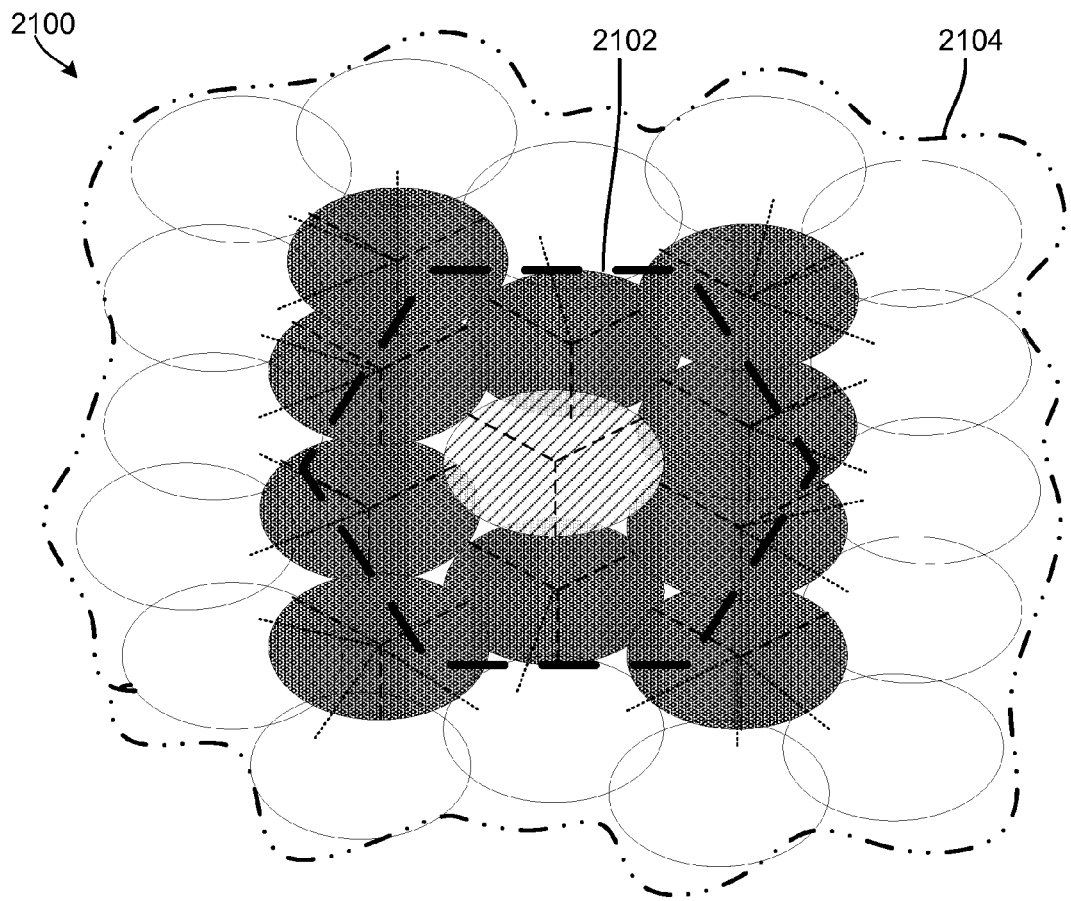

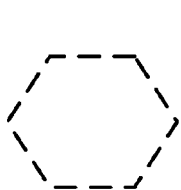

Primary Grid Boundary

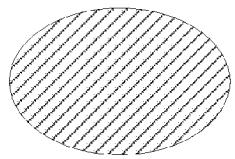

Interior Cell
A cell that's completely inside a grid boundary but not touching the grid boundary border or crossing over it.

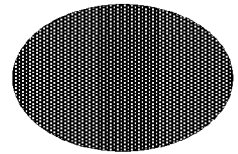

Grid Border Cell
A cell that is crossing grid boundary line or touching the boundary line, but not completely interior to the grid.

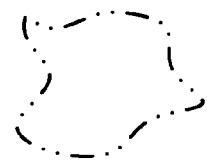

Buffer Zone boundary (with 1 level of neighbor lists)

Subsector Division of Cells

Neighbor cell relationship (Only cells forming buffer zone are shown)

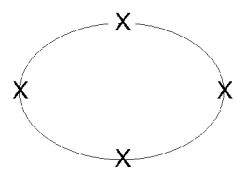

A cell site area with 4 edge points to determine proximity near a Lessor's grid boundary

FIG. 21

Coverage gap in lessor network inside leased grid, during Handin
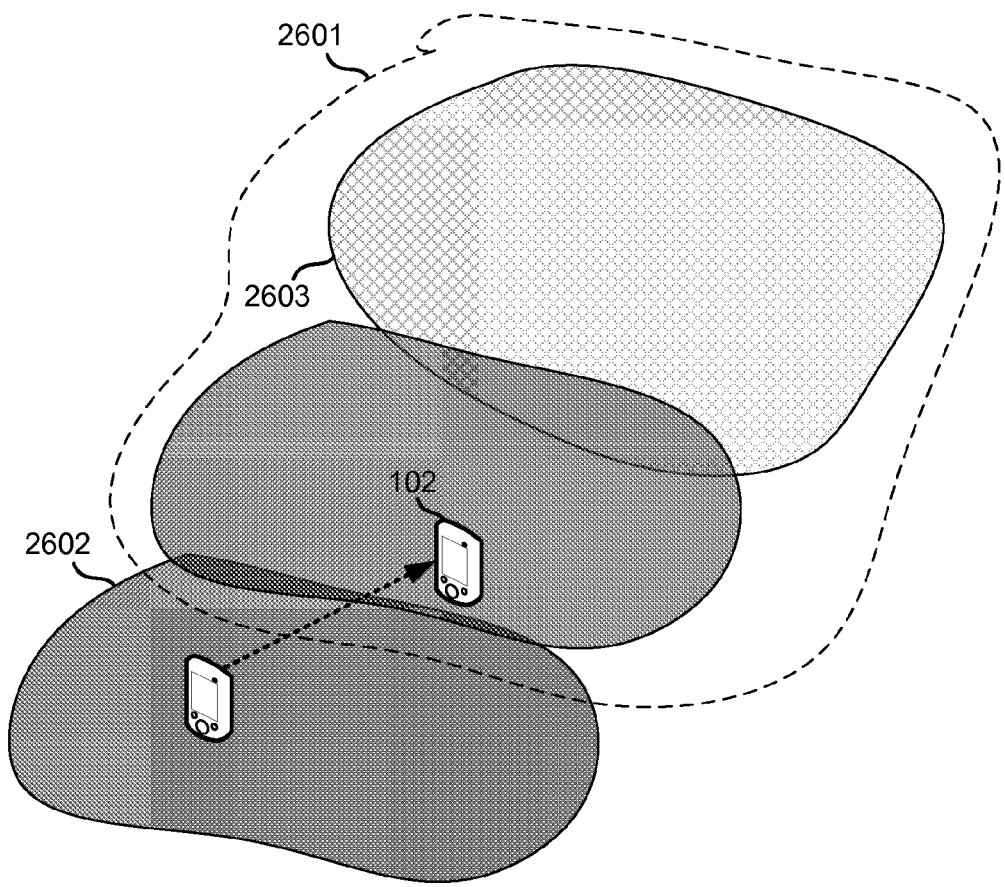
Legend:
 UE: Lessee wireless device, eligible for Handin after moving inside leased grid boundary
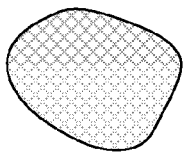 Lessor cell/sector
 UE's mobility direction
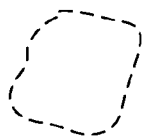 Leased grid boundary
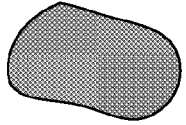 Lessee cells/sectors
FIG. 26

METHODS AND SYSTEM FOR DYNAMIC SPECTRUM ARBITRAGE WITH MOBILITY MANAGEMENT

RELATED APPLICATIONS

This application claims the benefit of priority to each of U.S. Provisional Application No. 61/828,360, entitled "Methods and System for Dynamic Spectrum Arbitrage with Mobility Management" filed Jun. May 29, 2013 and U.S. Provisional Application No. 61/920,368, entitled "Methods and System for Dynamic Spectrum Arbitrage with Mobility Management" filed Jun. Dec. 23, 2013, the entire contents of both of which are hereby incorporated by reference.

BACKGROUND

With the ever increasing use of wireless communication devices for accessing networks and downloading large files (e.g., video files), there is an increasing demand for radio frequency spectrum. Smart phone users complain about dropped calls, slow access to the Internet and similar problems which are due largely to too many devices trying to access finite radio frequency (RF) bandwidth allocated to such services. Yet parts of the RF spectrum, such as the RF bands dedicated to emergency services (e.g., police, fire and rescue, etc.), go largely unused due to the non-continuous and episodic employment of such voice-radio communication bands. Therefore, improved methods and solutions for dynamically allocating underutilized telecommunication resources (e.g., RF spectrum, etc.) of a first telecommunication network for access and use by wireless devices that subscribe to other networks will be beneficial to the telecommunication networks, service providers, and to the consumers of telecommunication services.

SUMMARY

The various embodiments include a dynamic spectrum arbitrage (DSA) methods that include receiving in a processor a notification message identifying a successful bidder for a geographical area, generating a grid-map structure that includes a primary grid structure that identifies telecommunication cells in the geographical area, monitoring locations of wireless devices, and using the locations of the wireless devices with respect to the cells of the primary grid structure to determine whether to initiate inter-network handover operations.

In an embodiment, receiving the notification message identifying the successful bidder for the geographical area may include receiving a notification message identifying a first telecommunication network as the successful bidder in a dynamic spectrum controller (DSC) in the first telecommunication network. In a further embodiment, monitoring locations of wireless devices may include monitoring the locations of wireless devices attached to a first eNodeB in the first telecommunication network. In a further embodiment, using the locations of the wireless devices with respect to the cells of the primary grid structure to determine whether to initiate inter-network handover operations may include determining whether to initiate handin operations to transfer the wireless devices attached to the first eNodeB to a second eNodeB in a second telecommunication network.

In a further embodiment, receiving the notification message identifying the successful bidder for the geographical area may include receiving a notification message identifying a first telecommunication network as the successful bidder in a dynamic spectrum controller (DSC) in a second telecommunication network, monitoring locations of wireless devices may include monitoring the location of a wireless device that subscribes to the first telecommunication network and is attached to an eNodeB in the second telecommunication network, and using the locations of the wireless devices with respect to the cells of the primary grid structure to determine whether to initiate inter-network handover operations may include determining whether to initiate backoff operations to transfer the wireless device that subscribes to the first telecommunication network and is attached to the eNodeB back to the first telecommunication network.

In a further embodiment, the operations for determining whether to initiate backoff operations to transfer the wireless device that subscribes to the first telecommunication network and is attached to the eNodeB back to the first telecommunication network are performed in response to the processor determining that resource lease period has ended, that the eNodeB is congested, and/or that the wireless device has moved outside of the geographical area.

In a further embodiment, receiving the notification message identifying the successful bidder for the geographical area may include receiving a notification message identifying a first telecommunication network as the successful bidder in a dynamic spectrum controller (DSC) in the first telecommunication network, In a further embodiment, the method may include using the generated grid-map structure to allocate telecommunication resources of the second telecommunication network for access and use by wireless devices of the first telecommunication network.

In a further embodiment, generating grid-map structure that includes the primary grid structure that identifies telecommunication cells in the geographical area may include classifying each of the telecommunication cells of the primary grid structure as being one of an interior cell and a border cell. In a further embodiment, generating grid-map structure that includes the primary grid structure that identifies telecommunication cells in the geographical area may include generating the grid-map structure to further include a buffer zone structure that identifies telecommunication cells that are adjacent to the border cells. In a further embodiment, generating the grid-map structure to include the buffer zone structure may include generating the buffer zone structure to include multiple tiers.

In a further embodiment, the method may include using the buffer zone structure to perform ping-pong avoidance operations. In a further embodiment, the method may include receiving measurement reports that include eNodeB signal strength information from the wireless devices.

Further embodiments include a dynamic spectrum arbitrage (DSA) system that includes an eNodeB having an eNodeB processor, a dynamic spectrum controller (DSC) having DSC processor that is coupled to the eNodeB via a first communication link, and a dynamic spectrum policy controller (DPC) having a DPC processor that is coupled to the DSC via a second communication link. In an embodiment, the DSC processor may be configured with processor executable instruction to perform operations may include receiving a notification message from the DPC identifying a successful bidder for a geographical area, generating grid-map structure that includes a primary grid structure that identifies telecommunication cells in the geographical area, monitoring locations of wireless devices, and using the locations of the wireless devices with respect to the cells of the primary grid structure to determine whether to initiate inter-network handover operations.

In a further embodiment, the eNodeB and DSC may be included in a first telecommunication network, and the DSC processor may be configured with processor executable instruction to perform operations such that receiving the notification message identifying the successful bidder for the geographical area includes receiving a notification message identifying the first telecommunication network as the successful bidder, monitoring locations of wireless devices includes monitoring the locations of wireless devices attached to a the eNodeB, and using the locations of the wireless devices with respect to the cells of the primary grid structure to determine whether to initiate inter-network handover operations includes determining whether to initiate handin operations to transfer the wireless devices attached to the eNodeB to another eNodeB in a second telecommunication network.

In a further embodiment, the eNodeB and DSC may be included in a first telecommunication network, and the DSC processor may be configured with processor executable instruction to perform operations such that receiving the notification message identifying the successful bidder for the geographical area includes receiving a notification message identifying a second telecommunication network as the successful bidder, monitoring locations of wireless devices includes monitoring the location of a wireless device that subscribes to the second telecommunication network and is attached to the eNodeB, and using the locations of the wireless devices with respect to the cells of the primary grid structure to determine whether to initiate inter-network handover operations includes determining whether to initiate backoff operations to transfer the wireless device to another eNodeB in the second telecommunication network.

In a further embodiment, the DSC processor may be configured with processor executable instruction to perform operations such that the operation of determining whether to initiate backoff operations to transfer the wireless device to another eNodeB in the second telecommunication network is performed in response to one of determining that resource lease period has ended, determining that the eNodeB is congested, and determining that the wireless device has moved outside of the geographical area. In a further embodiment, the DSC processor may be configured with processor executable instruction to perform operations such that receiving the notification message identifying the successful bidder for the geographical area includes receiving a notification message identifying a first telecommunication network as the successful bidder, the method further including using the generated grid-map structure to allocate telecommunication resources of a second telecommunication network for access and use by wireless devices of the first telecommunication network.

In a further embodiment, the DSC processor may be configured with processor executable instruction to perform operations such that generating grid-map structure that includes the primary grid structure that identifies telecommunication cells in the geographical area further includes classifying each of the telecommunication cells of the primary grid structure as being one of an interior cell and a border cell. In a further embodiment, the DSC processor may be configured with processor executable instruction to perform operations such that generating grid-map structure that includes the primary grid structure that identifies telecommunication cells in the geographical area includes generating the grid-map structure to further include a buffer zone structure that identifies telecommunication cells that are adjacent to the border cells. In a further embodiment, the DSC processor may be configured with processor executable instruction to perform operations such that generating the grid-map structure to include the buffer zone structure includes generating the buffer zone structure to include multiple tiers.

In a further embodiment, the DSC processor may be configured with processor executable instruction to perform operations may include using the buffer zone structure to perform ping-pong avoidance operations. In a further embodiment, the DSC processor may be configured with processor executable instruction to perform operations that include receiving measurement reports that include eNodeB signal strength information from the wireless devices.

Further embodiments include a server computing device, including a processor configured with processor executable instruction to perform operations including receiving a notification message identifying a successful bidder for a geographical area, generating grid-map structure that includes a primary grid structure that identifies telecommunication cells in the geographical area, monitoring locations of wireless devices, and using the locations of the wireless devices with respect to the cells of the primary grid structure to determine whether to initiate inter-network handover operations.

Further embodiments may include a computing device having a processor (or processing core) configured with processor-executable instructions to perform various operations corresponding to the methods discussed above.

Further embodiments may include computing devices that include various means for performing functions corresponding to the method operations discussed above.

Further embodiments may include a non-transitory processor-readable storage medium having stored thereon processor-executable instructions configured to cause a processor/processing core to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIG. 21 is an illustration of the logical and functional elements that may be represented by a grid-map data structure in accordance with an embodiment.

FIG. 26 is an illustration of a coverage gap may be caused by lack of radio frequency coverage from lessor cells in the area where lessee cell(s) have coverage and for which performing an embodiment gap avoidance method may be beneficial.

DETAILED DESCRIPTION

Figure 1A:
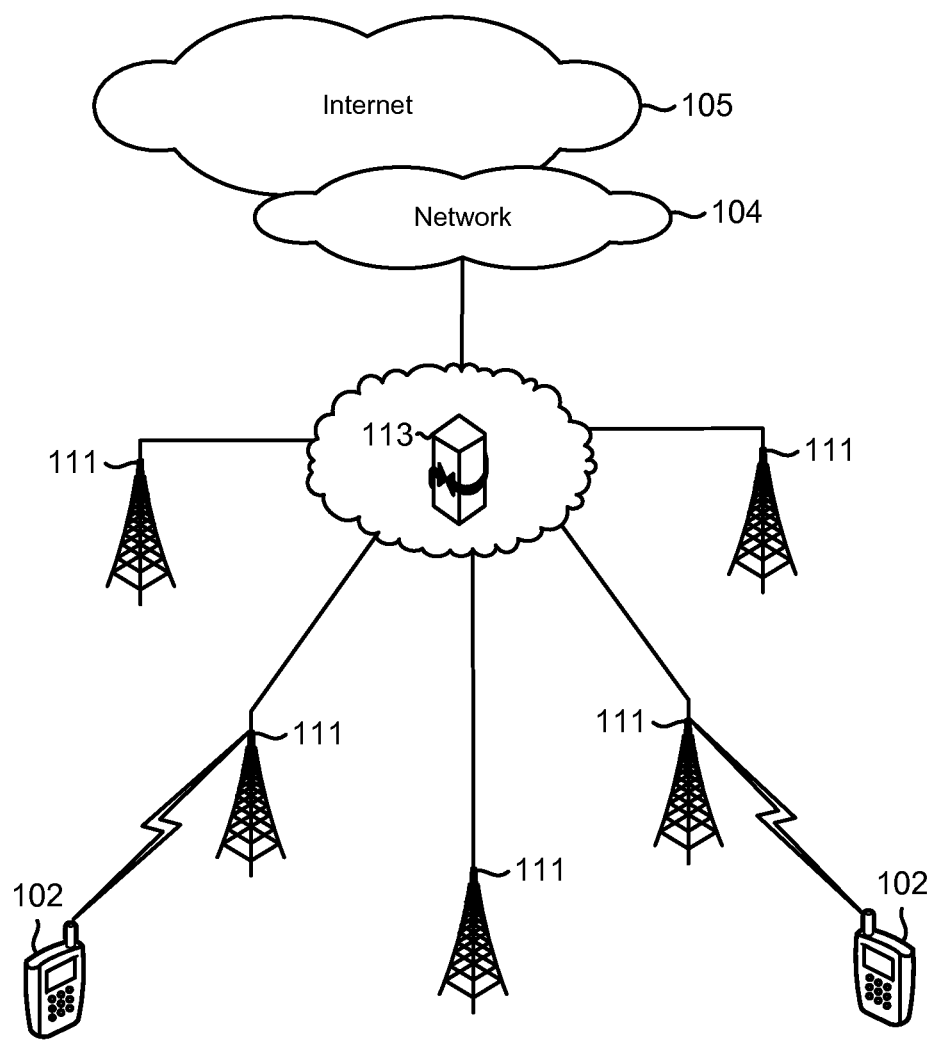
FIGS. 1A through 1E are system block diagrams illustrating various logical and functions components and communication links in communication systems that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device," "wireless device" and "user equipment (UE)" may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a wireless device), which can communicate via a cellular telephone communications network.

As used in this application, the terms "component," "module," "engine," "manager" are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.).

With the ubiquity of wireless device ownership and usage, emergency communication via wireless devices using commercial cellular communication networks often are the most efficient and effective means to mobilize emergency response personnel and resources. Enabling wireless devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a wireless device.

Emergency communications over cellular communication networks is not without problems, however. Cellular and other telecommunication networks ("networks") are designed to accommodate access requests from only a fraction of the total number of wireless devices in a particular cell. At times of emergency or crisis, network resources may become overtaxed when predictable human responses to the situation prompt an extraordinary number of wireless device users within a particular cell to access the network at the same time. Wireless device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using wireless devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To overcome these and other limitations of existing solutions, the various embodiments include components configured to provide tiered priority access (TPA) capabilities to deliver quality of service (QoS) and grade of service (GoS) based wireless device communications for first responders. Detailed descriptions of example TPA systems are provided in U.S. Pat. No. 8,275,349 dated Sep. 25, 2102, the entire contents of which are hereby incorporated by reference in their entirety and for all purposes.

In overview, a TPA system or solution may include various components configured to perform various TPA operations to coordinate, make available and/or provide wireless communication resources to high priority users (e.g., emergency personnel) during times of high congestion or in emergency situations. For example, TPA components may be configured to monitor a wireless network's call volume, determine whether the wireless network call volume exceeds a first pre-determined threshold, partition the wireless network resources based on priorities when the wireless network call volume exceeds the first pre-determined threshold, and reserve a portion of the partitioned resources for high priority usage (i.e., use by wireless devices of authorized emergency personnel). The TPA components may be further configured to monitor incoming and outgoing calls to determine whether a call is made from or to an high priority device (e.g., to or from a pre-registered wireless device or wireless devices of authorized emergency personnel), allow general access to the wireless network resources so long as no call is made from or to high priority device, and restrict general access to the wireless network resources in response to determining that a call is made to or from a high priority device. As such, TPA solutions allow telecommunication systems use more the available resources, and ensure that high priority users can access and use the system when needed.

In the various embodiments, these and other TPA operations may be performed in (or in conjunction with) a dynamic spectrum arbitrage (DSA) system configured to dynamically manage the availability, allocation, access, and use of telecommunication resources (e.g., RF spectrum, etc.) between two or more networks (e.g., between a lessor network and a lessee network). A detailed description of an example DSA system is provided in U.S. Pat. No. 8,711,721 dated Apr. 29, 2014, the entire contents of which are hereby incorporated by reference in their entirety and for all purposes.

Briefly, a DSA system may include a dynamic spectrum policy controller (DPC) configured to manage the DSA operations and interactions between two or more networks (e.g., between a lessor network and a lessee network). The DPC may communicate with various network components in a network provider network through one or more dynamic spectrum controller (DSC) components, which may be included in or added to the networks participating in the DSA communications. The DSC component may include wired or wireless connections to eNodeBs, a mobility management entity (MME) component/server, various satellite systems, and other network components. The DSC may communicate with the DPC component to offer, allocate, request, and/or receive resources to and from other networks. This allows two or more networks to collaborate and make better use their resources (e.g., by leasing resources during times of high congestion, leasing out resources when they are not in use, etc.).

In the various embodiments, the DSA system may be configured to allocate or lease-out resources, monitor the usage of the leased resources, and automatically charge accounts for the usage of the leased resources by generating, installing, or enforcing bid-specific closed subscriber group identifier based (i.e., CSG-ID based) charging rules.

In an embodiment, the DSA system may include DSA components (e.g., DPC, DSC, eNodeB, etc.) configured to perform mobility management operations to better manage and coordinate the handling (e.g., handoffs, hand-ins, back-off, etc.) of wireless devices as they are moved with respect to the available/leased resources.

In an embodiment, the DSA components may be configured to coordinate their operations and communicate information so as to better monitor the locations of the wireless device and make better and more informed DSA decisions. For example, a DSC component may be configured to communicate with an MME component to determine the precise location of a wireless device with respect to a telecommunication resource. The DSC component may use this location information (i.e., precise location of the wireless device) to better identify candidate devices for handoff, handin, backoff, and move-back operations.

In addition, the DSA components may be configured to perform various special functions to further support the mobility of wireless devices as they are moved with respect to the available resources and between the participating networks. These special functions may include identifying a resource grid, determining a buffer zone for the grid, finding geographical boundaries or boundaries during wireless device mobility, performing inter-network handovers for connected wireless devices, monitoring a wireless device's vicinity, determining whether a wireless device is an idle, performing move-back operations for idle devices, determining congestion state changes, etc. The special functions may also include handling coverage gaps due to cell outages or blacklisting during a handin, a handoff, or backoff procedure. The special functions may further include identifying operator policies, determining blacklists and dynamic changes via a grid map, and pre-planning a handin, a handoff, or a backoff procedure. The special functions may also include performing mobility-based, congestion-based, bid-based, or expiry-based backoff operations.

The various embodiments may include a DSA system configured to manage the allocation, transfer, and/or use of resources by the wireless networks based on a geographical area. For example, the DSA system may be configured to perform auction/arbitration operations that result in a successful bidder for a geographical area (which may include two whole networks, a region, cell sites, sectors, sub-sectors, etc.). A detailed description of an example DSA system configured to allocate resources based on a geographical area is provided in U.S. Published Patent Application No. 2013/0203435 dated Aug. 8, 2013, the entire contents of which are hereby incorporated by reference in their entirety and for all purposes.

The various embodiments provide improved methods of allocating resources based on geographical areas by accounting for the mobility of the wireless devices with respect to the available/leased resources. For example, in an embodiment, the DSA components may be configured to divide a relevant geographical area into subunits, generate a grid-map information structure that identifies these geographical subunits, and use the grid-map data structure to allocate, de-allocate, and reallocate resources based on the geographical locations of the wireless devices with respect to the available resources. The available resource may include both lessee and lessor resources.

In an embodiment, the DSA components may generate grid-map structure to include a primary grid and a buffer zone, each of which may be an information structure that includes/stores information suitable for identifying cells/sectors and their coverage zones. The primary grid structure may classify its cells/sectors as interior or border cells, and the buffer zone may classify its cells/sectors into layers, zones, or tiers based on their proximity to the border cells in primary grid. In an embodiment, the primary grid structure may be generated to include the cells/sectors that are in geographical area purchased or won by a lessee network as part of the DSA operations. The DSA components may then use the locations and movements of the wireless devices 102 with respect to the cells/sectors identified by the primary grid and/or buffer zone to determine whether to initiate intra-network and/or inter-network handover operations (i.e. to handover the device from the lessee network to the lessor network, or vice versa). In various embodiments, the inter-network handover operations may include handins, backoff, and/or move-back operations.

In an embodiment, the DSA components may be configured to generate or update the grid-map structure based on information received from the wireless devices attached to the resources of the lessee or lessor networks.

In an embodiment, the DSA components may be configured to periodically reevaluate the identification/classification of the interior, border, and buffer zone cells to better account for changes in the availability of resources identified in the grid-map. For example, the DSA components may reevaluate the cell classifications to account for cell sites that are taken down for maintenance, new sectors that are brought online, etc. In an embodiment, such information may be received from the wireless devices.

In an embodiment, the DSA components may be configured to perform handin operations to transfer wireless devices from a lessee network to a lessor network based on the grid-map information structure. The DSA components may be configured to perform the handin operations so that the wireless devices that are located closest to the center of the primary grid are transferred first, and the wireless devices that are located closest to the edge of the buffer zone are transferred last. That is, the DSA components may perform the handins operations so as to transfer the wireless devices from the center of the grid outward towards the edges of buffer zone.

In an embodiment, the DSA components may be configured to perform backoff operations to transfer wireless devices from the lessor network to the lessee network based on the grid-map structure. The DSA components may be configured to perform the backoff operations so that the wireless devices that are located closest to the edges of buffer zone are transferred first, and the wireless devices located closest to the center of the primary grid are transferred last. That is, the DSA components may perform the handins operations so as to transfer the wireless devices from the edges of buffer zone inward towards the center of the grid.

In an embodiment, the DSA components may be configured to receive measurement reports from the wireless devices. The measurement reports may include signal strength information detected in the wireless device for the available resources or potential target network. The DSA components may use the received measurement reports to select a target cell and/or to initiate inter-network handover (handin or backoff) procedures based on the reports/signal strengths. For example, an eNodeB may be configured to receive measurement reports from a wireless device for the target network, and use the measurement report to select a target eNodeB based on its signal strength relative to the wireless device.

In an embodiment, the DSA components may be configured to receive congestion state information from an eNodeB, and use this congestion state information to intelligently allocate resources, manage user traffic of the eNodeBs, select target eNodeBs for handovers, determine the quality of service (QoS) levels that are to be given to wireless devices attached to the eNodeBs, and/or perform other similar operations to intelligently manage the allocation or use of resources by the various networks. The congestion state information may identify a current congestion state (e.g., Normal, Minor, Major, Critical, etc.) of the eNodeB and/or other network components. Each congestion state may be associated with a congestion level. For example, a "Normal" congestion state may indicate that a network component (e.g., eNodeB, etc.) is operating under normal load (e.g., user traffic is within the normal operating rages, etc.). A "Minor" congestion state may indicate that the network component is experiencing congestion and/or operating under an above-average load. A "Major" congestion state may indicate that the network component is experiencing significant congestion and/or operating under heavy load. A "Critical" congestion state may indicate that the network component is experiencing severe congestion, experiencing an emergency situation, or operating under an extremely heavy load.

In an embodiment, the DSA components may be configured to implement different thresholds for the up and down triggers that cause the congestion state transitions so as to avoid frequent fluctuations between the same two congestion states (e.g., Normal-to-Minor and Minor-to-Normal, etc.). For example, an eNodeB may be configured to transition from the Normal to Minor state in response to determining that the user traffic levels increased to above 50%, and transition from the Minor to Normal state in response to determining that the user traffic levels decreased to below 40%. That is, the eNodeB may be configured to set a Normal-to-Minor congestion state up-trigger to 50% and a Minor-to-Normal congestion state down-trigger to 40%.

In an embodiment, the DSA components may be configured to use the buffer zone structure to perform ping-pong avoidance operations. For example, the DSA components may be configured to use the buffer zone structure (e.g., in the grid-map) to perform handin or backoff operations so as to reduce the ping-pong effect that may be caused by a wireless device frequently crossing the same grid boundary. These DSA components may also be configured to use a timer to further reduce the ping-pong effect.

In an embodiment, the DSA components may be configured to perform load balancing operations based on inter-network mobility of the wireless devices. The inter-network mobility of the wireless devices may be determined based on the location of the wireless device with respect to the available resources. In an embodiment, the inter-network mobility of the wireless devices may be determined based on the information included in the grid-map information structure.

In various embodiments, the DSA components may be configured to perform various operations for handling coverage gaps in lessor network (within leased grid) during handin, handling coverage gaps in lessor network (within leased grid) during handoff, handling coverage gaps in lessee network (within leased grid) during backoff, handling coverage gaps caused by cell outages, and handling coverage gaps due to blacklisting of cell. The DSA components may be configured to respond to coverage gaps caused by cell outages and blacklisting.

In various embodiments, the DSA components may be configured to perform handoff pre-planning operations, handin pre-planning operations, and backoff pre-planning operations. In an embodiment, the DSA components may be configured to perform move-back operations to transfer an idle lessee wireless device attached to a lessor network back to the lessee network.

In an embodiment, the DSA components may be configured to identify the cells/sectors that are associated with the bid grid (i.e., geographical area purchased/won by a lessee network as part of the DSA operations) in the grid-map information structure.

In an embodiment, the DSA components may be configured to use the grid-map to identify the resources that are to be used by the wireless device. For example, the DSA components of a lessee network may use the grid-map and measurement reports received from the wireless devices to determine whether to initiate handin operations (or the process of handing wireless devices into the lessor network) based on the locations and availability of the resources of the lessor network with respect to the wireless devices. DSA components of a lessor network may use the grid-map to determine whether to initiate backoff operations (or the process of handing wireless devices back to the lessee system) based on the locations and availability of the resources in the lessee network in response to detecting bid expiry, congestion, and/or that a wireless device has moved to a geographical area that is outside of the bid grid.

The various embodiments may also include DSA components configured to intelligently identify and select wireless devices as candidates for handover or handin to lessor network resources in the bid grid/area. In further embodiments, the DSA components may be configured to make intelligent handover, handin, handout, and backoff decisions to move/transfer wireless devices between the participating networks.

In an embodiment, the DSA components may include a DSC component configured to receive resource allocation information that is suitable for use in identifying all the active wireless devices that are within a geographical boundary of the bid area and candidates to be handed over to a lessor network. The DSC component may use the resource allocation information to intelligently select and handover the candidate wireless devices to the lessor network (i.e., to use resources allocated by the lessor network).

In an embodiment, the DSA components may be configured to perform DSA operations that include identifying a plurality of eNodeBs that are inside a geographical boundary of a bid area, computing a round trip delay (RTD) value, receiving (e.g., in DSC component) measurement reports for lessor network absolute radio frequency channel numbers (ARFCNs) for each of a plurality of active wireless devices in each of the identified plurality of eNodeBs, and generating a listing of all the active wireless devices that are eligible to be handed over to lessor network based on the measurement reporting in each of the plurality of eNodeBs. The DSA operations may further include receiving the listing of the active wireless devices that are eligible to be handed over to lessor network, receiving the RTD values, measurement reports, and wireless device position information, and selecting wireless devices to hand over to the lessor network based on any or all of the received listings, RTD values, measurement reports, and UE position information.

The various embodiments may be implemented within a variety of communication systems, examples of which are illustrated in FIGS. 1A-1E. With reference to FIG. 1A, wireless devices 102 may be configured to transmit and receive voice, data, and control signals to and from a base station 111, which may be a base transceiver station (BTS), NodeB, eNodeB, etc. The base station 111 may communicate with an access gateway 113, which may include one or more of a controller, a gateway, a serving gateway (SGW), a packet data network gateway (PGW), an evolved packet data gateway (ePDG), a packet data serving node (PDSN), a serving GPRS support node (SGSN), or any similar component or combinations of the features/functions provided thereof. Since these structures are well known and/or discussed in detail further below, certain details have been omitted from FIG. 1A in order to focus the descriptions on the most relevant features.

The access gateway 113 may be any logical and/or functional component that serves as the primary point of entry and exit of wireless device traffic and/or connects the wireless devices 102 to their immediate service provider and/or packet data networks (PDNs). The access gateway 113 may forward the voice, data, and control signals to other network components as user data packets, provide connectivity to external packet data networks, manage and store contexts (e.g. network internal routing information, etc.), and act as an anchor between different technologies (e.g., 3GPP and non-3GPP systems). The access gateway 113 may coordinate the transmission and reception of data to and from the Internet 105, as well as the transmission and reception of voice, data and control information to and from an external service network 104, the Internet 105, other base stations 111, and to wireless devices 102.

In various embodiments, the base stations 111 and/or access gateway 113 may be coupled (e.g., via wired or wireless communication links) to a dynamic spectrum arbitrage (DSA) system configured to dynamically manage the availability, allocation, access, and use of various network resources (e.g., RF spectrum, RF spectrum resources, etc.). The DSA system is discussed in detail further below.

Figure 1B:
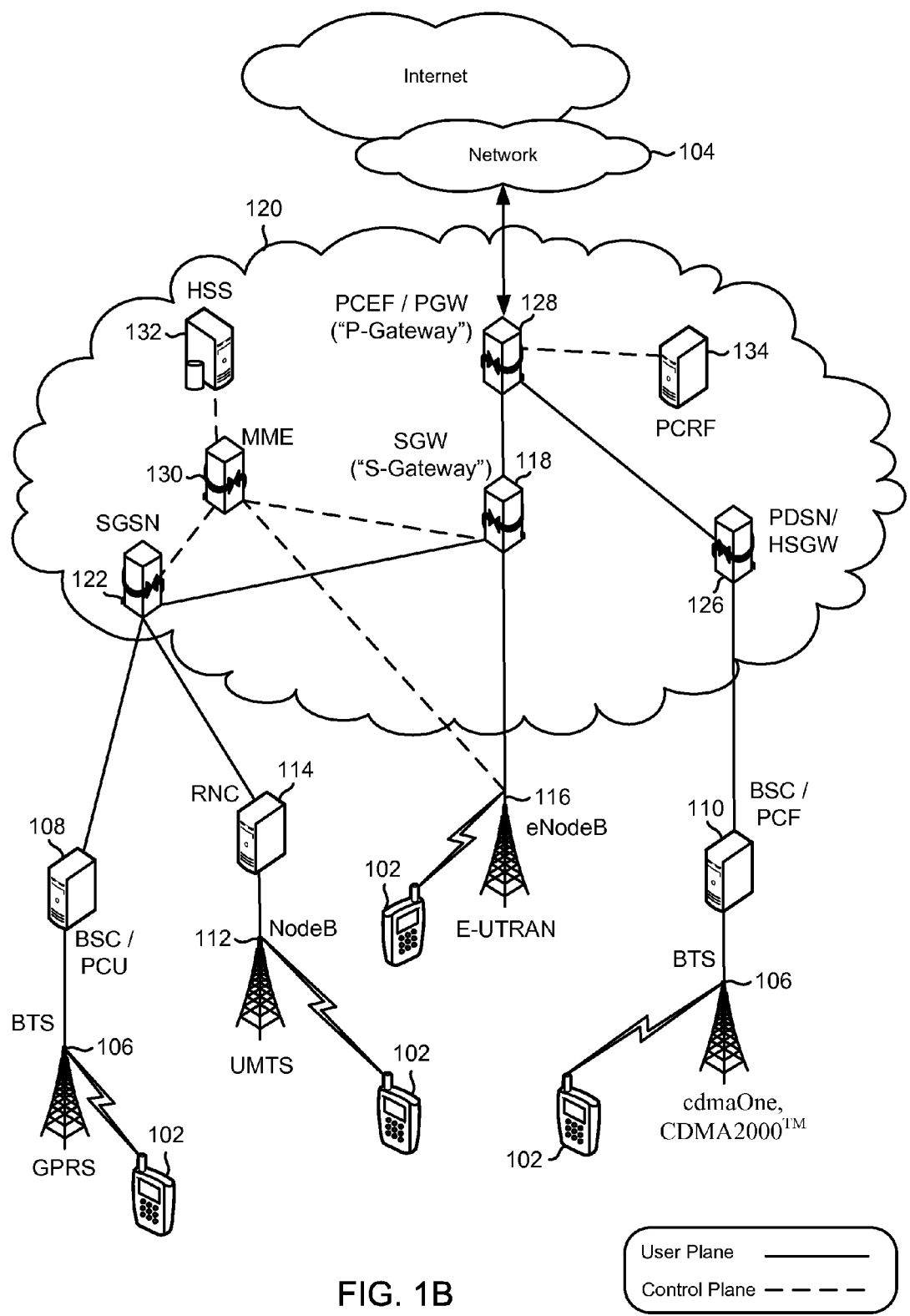

FIG. 1B illustrates that wireless devices 102 may be configured to send and receive voice, data and control signals to and from the service network 104 (and ultimately the Internet 105) using a variety of communication systems/technologies (e.g., GPRS, UMTS, LTE, cdmaOne, CDMA2000™), any or all of which may be supported by, or used to implement, the various embodiments.

In the example illustrated in FIG. 1B, long term evolution (LTE) and/or evolved universal terrestrial radio access network (E-UTRAN) data transmitted from a wireless device 102 is received by an eNodeB 116, and sent to a serving gateway (SGW) 118 located within the core network 120. The eNodeB 116 may send signaling/control information (e.g., information pertaining to call setup, security, authentication, etc.) to a mobility management entity (MME) 130. The MME 130 may request user/subscription information from a home subscriber server (HSS) 132, communicate with other MME components, perform various administrative tasks (e.g., user authentication, enforcement of roaming restrictions, etc.), select a SGW 118, and send authorization and administrative information to the eNodeB 116 and/or SGW 118. Upon receiving the authorization information from the MME 130 (e.g., an authentication complete indication, an identifier of a selected SGW, etc.), the eNodeB 116 may send data received from the wireless device 102 to a selected SGW 118. The SGW 118 may store information about the received data (e.g., parameters of the IP bearer service, network internal routing information, etc.) and forward user data packets to a policy control enforcement function (PCEF) and/or packet data network gateway (PGW) 128.

FIG. 1B further illustrates that general packet radio service (GPRS) data transmitted from the wireless devices 102 may be received by a base transceiver station (BTS) 106 and sent to a base station controller (BSC) and/or packet control unit (PCU) component (BSC/PCU) 108. Code division multiple access (CDMA) data transmitted from a wireless device 102 may be received by a base transceiver station 106 and sent to a base station controller (BSC) and/or packet control function (PCF) component (BSC/PCF) 110. Universal mobile telecommunications system (UMTS) data transmitted from a wireless device 102 may be received by a NodeB 112 and sent to a radio network controller (RNC) 114.

The BSC/PCU 108, BSC/PCF 110, and RNC 114 components may process the GPRS, CDMA, and UMTS data, respectively, and send the processed data to a component within the core network 120. More specifically, the BSC/PCU 108 and RNC 114 units may send the processed data to a serving GPRS support node (SGSN) 122, and the BSC/PCF 110 may send the processed data to a packet data serving node (PDSN) and/or high rate packet data serving gateway (HSGW) component (PDSN/HSGW) 126. The PDSN/HSGW 126 may act as a connection point between the radio access network and the IP based PCEF/PGW 128. The SGSN 122 may be responsible for routing the data within a particular geographical service area, and send signaling (control plane) information (e.g., information pertaining to call setup, security, authentication, etc.) to an MME 130. The MME 130 may request user and subscription information from a home subscriber server (HSS) 132, perform various administrative tasks (e.g., user authentication, enforcement of roaming restrictions, etc.), select a SGW 118, and send administrative and/or authorization information to the SGSN 122.

The SGSN 122 may send the GPRS/UMTS data to a selected SGW 118 in response to receiving authorization information from the MME 130. The SGW 118 may store information about the data (e.g., parameters of the IP bearer service, network internal routing information, etc.) and forward user data packets to the PCEF/PGW 128. The PCEF/PGW 128 may send signaling information (control plane) to a policy control rules function (PCRF) 134. The PCRF 134 may access subscriber databases, create a set of policy rules and performs other specialized functions (e.g., interacts with online/offline charging systems, application functions, etc.). The PCRF 134 may then send the policy rules to the PCEF/PGW 128 for enforcement. The PCEF/PGW 128 may implement the policy rules to control the bandwidth, the quality of service (QoS), the characteristics of the data, and the services being communicated between the service network 104 and the end users.

In the various embodiments, any or all of the components discussed above (e.g., components 102-134) may be coupled to, or included in, a DSA system configured to dynamically manage the availability, allocation, access, and use of telecommunication resources.

Figure 1C:
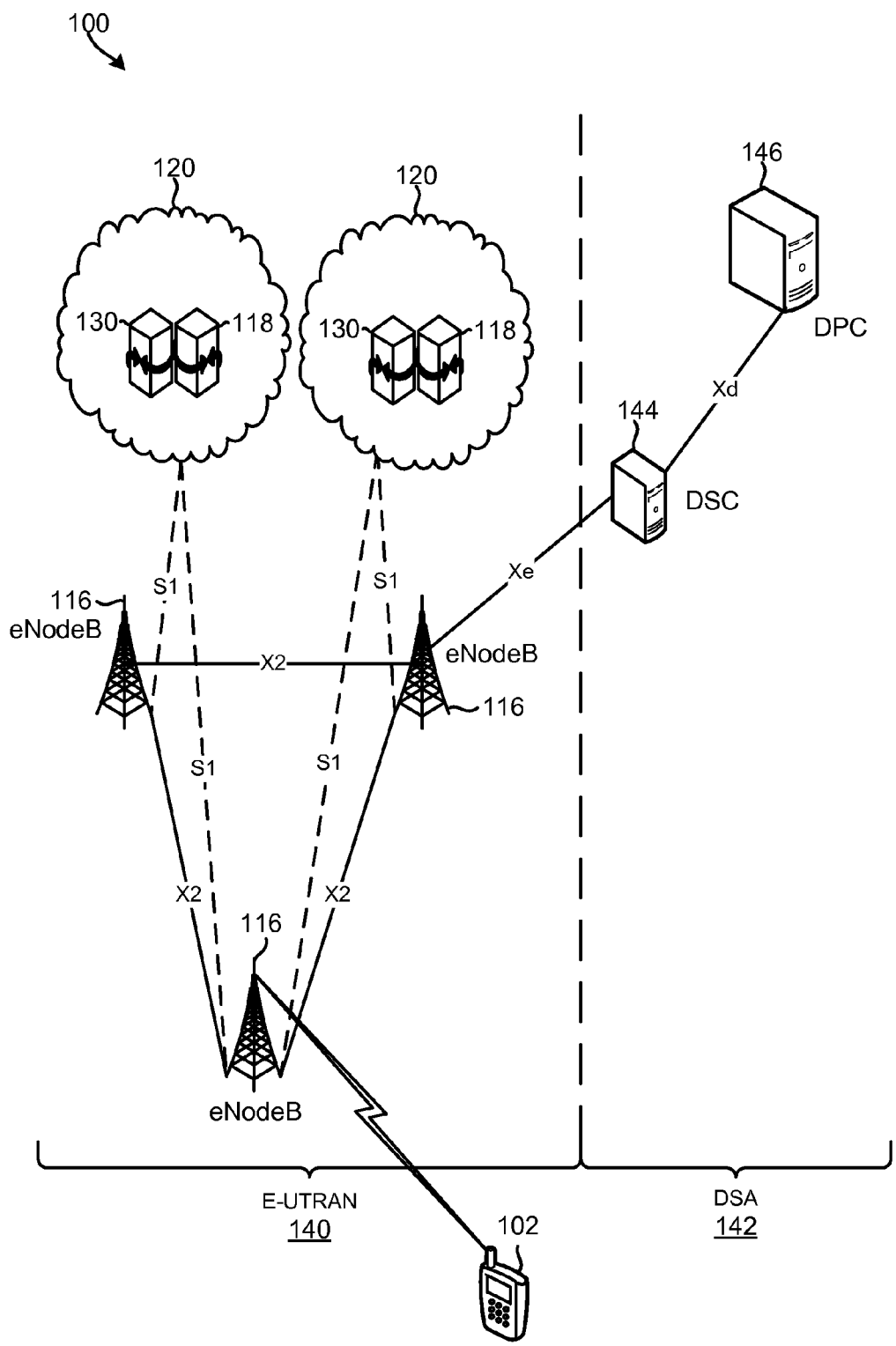

FIG. 1C illustrates various logical components and communication links in an embodiment system 100 that includes an DSA system 142 and a evolved universal terrestrial radio access network (E-UTRAN) 140. In the example illustrated in FIG. 1C, the DSA system 142 includes a dynamic spectrum controller (DSC) 144 component and a dynamic spectrum policy controller (DPC) 146 component. The E-UTRAN 140 includes a plurality of interconnected eNodeBs 116 coupled to the core network 120 (e.g., via a connection to an MME, SGW, etc.).

In various embodiments, the DSC 144 may be included in or coupled to the E-UTRAN 140, either as part of its core network 120 or outside of the core network 120. In an embodiment, the DSC 144 may be coupled directly (e.g., via wired or wireless communication links) to one or more eNodeBs 116.

The eNodeBs 116 may be configured to communicate with the DSC 144 via the Xe interface/reference point. In various embodiments, the Xe reference point between DSC and eNodeB 116 may use the DSAAP protocol, TR-069 protocol, and/or TR-192 data model extensions to support listing available resources at the eNodeB 116 and notifying the eNodeB 116 of bid/buy confirmations. The DSC 144 may be configured to communicate with the DPC 146 via the Xd interface/reference point. The Xd reference point between DSC and DPC may use the DSAAP protocol for dynamic spectrum and resource arbitrage operations. The eNodeBs 116 may be interconnected, and configured to communicate via an X2 interface/reference point, which may also use the DSAAP protocol to communicate information. The eNodeBs 116 may be configured to communicate with components in the core network 120 via the S1 interface. For example, the eNodeBs 116 may be connected to an MME 130 via the S1-MME interface and to a SGW 118 via the S1-U interface. The S1 interface may support a many-to-many relation between the MMEs 130, SGWs 118, and eNodeBs 116. In embodiment, the DPC and/or DSC component may also be configured to communicate with a HSS 132 component.

The eNodeBs 116 may be configured to provide user plane (e.g., PDCP, RLC, MAC, PHY) and control plane (RRC) protocol terminations towards the wireless device 102. That is, the eNodeBs 116 may act as a bridge (e.g., layer 2 bridge) between the wireless devices 102 and the core network 120 by serving as the termination point of all radio protocols towards the wireless devices 102, and relaying voice (e.g., VoIP, etc.), data, and control signals to network components in the core network 120. The eNodeBs 116 may also be configured to perform various radio resource management operations, such as controlling the usage of radio interfaces, allocating resources based on requests, prioritizing and scheduling traffic according to various quality of service (QoS) requirements, monitoring the usage of network resources, etc. In addition, the eNodeBs 116 may be configured to collect radio signal level measurements, analyze the collected radio signal level measurements, and handover wireless devices 102 (or connections to the mobile devices) to another base station (e.g., a second eNodeB) based on the results of the analysis.

The DSC 144 and DPC 146 may be functional components configured to manage the dynamic spectrum arbitrage process for sharing radio frequency and other network resources between different E-UTRANs 140. For example, the DPC 146 component may be configured to manage the DSA operations and interactions between multiple E-UTRAN networks by communicating with DSCs 144 in the E-UTRAN network.

Figure 1D:
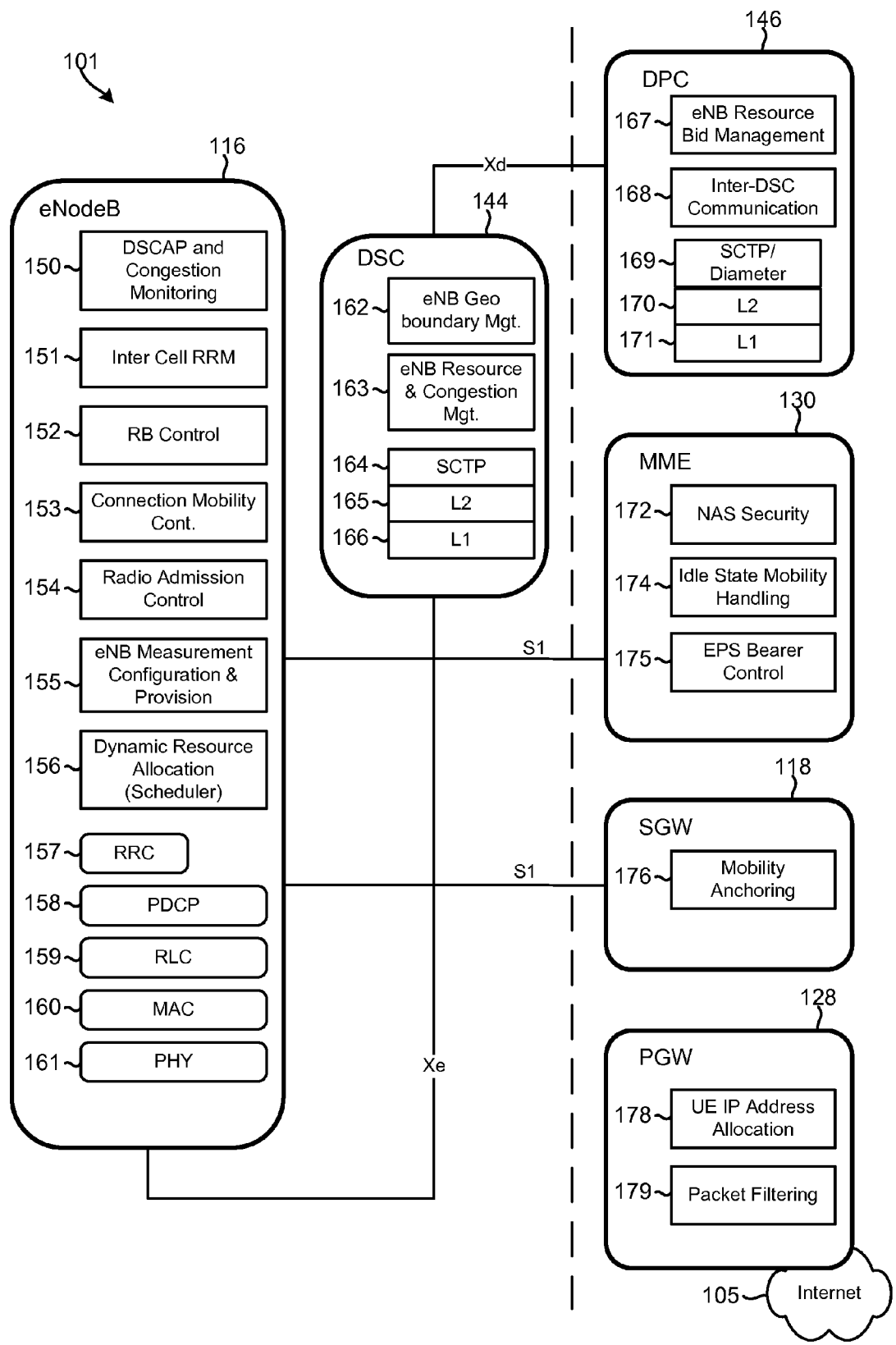

FIG. 1D illustrates various logical and functional components that may be included in a communication system 101 that suitable for use in performing DSA operations in accordance with various embodiments. In the example illustrated in FIG. 1D, the communication system 101 includes an eNodeB 116, a DSC 144, a DPC 146, an MME 130, a SGW 118, and a PGW 128.

The eNodeB 116 may include a DSC application protocol and congestion monitoring module 150, an inter-cell radio resource management (RRM) module 151, a radio bearer (RB) control module 152, a connection mobility control module 153, a radio admission control module 154, an eNodeB measurement configuration and provision module 155, and a dynamic resource allocation module 156. Each of these modules 150-156 may be implemented in hardware, in software, or in a combination of hardware and software.

In addition, the eNodeB 116 may include various protocol layers, including a radio resource control (RRC) layer 157, a packet data convergence protocol (PDCP) layer 158, a radio link control (RLC) layer 159, a medium access control (MAC) layer 160, and a physical (PHY) layer 161. In each of these protocol layers, various hardware and/or software components may implement functionality that is commensurate with responsibilities assigned to that layer. For example, data streams may be received in the physical layer 161, which may include a radio receiver, buffers, and processing components that perform the operations of demodulating, recognizing symbols within the radio frequency (RF) signal, and performing other operations for extracting raw data from the received RF signal.

The DSC 144 may include an eNodeB geographical boundary management module 162, an eNodeB resource and congestion management module 163, a stream control transmission protocol (SCTP) module 164, a Layer-2 (L2) buffer module 165, and a Layer-1 (L1) buffer module 166. The DPC 146 may include an eNodeB resource bid management module 167, an inter-DSC communication module 168, SCTP/DIAMETER module 169, an L2 buffer module 170, and a L1 buffer module 171. The MME 130 may include a non-access stratum (NAS) security module 172, and idle state mobility handling module 173, and an evolved packet system (EPS) bearer control module 174. The SGW 118 may include a mobility anchoring module 176. The PGW 128 may include a UE IP address allocation module 178 and a packet filtering module 179. Each of these modules 162-179 may be implemented in hardware, in software, or in a combination of hardware and software.

The eNodeB 116 may be configured to communicate with the SGW 118 and/or MME 130 via the S1 interface/protocol. The eNodeB 116 may also be configured to communicate with the DSC 144 via the Xe interface/protocol. The DSC 144 may be configured to communicate with the DPC 146 via the Xd interface/protocol.

The eNodeB 116 may be configured to perform various operations (e.g., via modules/layers 150-161) to provide various functions, including functions for radio resource management, such as radio bearer control, radio admission control, connection mobility control, dynamic allocation of resources to wireless devices 102 in both uplink and downlink (scheduling), etc. These functions may also include IP header compression and encryption of user data stream, selection of an MME at UE attachment when no routing to an MME 130 can be determined from the information provided by the UE, routing of user plane data towards SGW 118, scheduling and transmission of paging messages (originated from the MME), scheduling and transmission of broadcast information (originated from the MME), measurement and measurement reporting configuration for mobility and scheduling, scheduling and transmission of public warning system (e.g., earthquake and tsunami warning system, commercial mobile alert service, etc.) messages (originated from the MME), closed subscriber group (CSG) handling, and transport level packet marking in the uplink. In an embodiment, the eNodeB 116 may be a donor eNodeB (DeNB) that is configured to perform various operations to provide additional functions, such as an S1/X2 proxy functionality, S11 termination, and/or SGW/PGW functionality for supporting relay nodes (RNs).

The MME 130 may be configured to perform various operations (e.g., via modules 172-175) to provide various functions, including non-access stratum (NAS) signaling, NAS signaling security, access stratum (AS) security control, inter-CN node signaling for mobility between 3GPP access networks, idle mode UE reach-ability (including control and execution of paging retransmission), tracking area list management (e.g., for a wireless device in idle and active mode), PGW and SGW selection, MME selection for handovers with MME change, SGSN selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization. The MME module may also communicate various device state and attach/detach status information to the DSC. In an embodiment, the MME 130 may be configured to not filter paging massages based on the CSG IDs towards macro eNodeBs.

The SGW 118 may be configured to perform various operations (e.g., via module 176) to provide various functions, including mobility anchoring (e.g., for inter-3GPP mobility), serving as a local mobility anchor point for inter-eNodeB handovers, E-UTRAN idle mode downlink packet buffering, initiation of network triggered service request procedures, lawful interception, packet routing and forwarding, transport level packet marking in the uplink (UL) and the downlink (DL), accounting on user and QoS class identifier (QCI) granularity for inter-operator charging, uplink (UL) and the downlink (DL) charging (e.g., per device, PDN, and/or QCI), etc.

The PGW 128 may be configured to perform various operations (e.g., via modules 178-179) to provide various functions, including per-user based packet filtering (by e.g. deep packet inspection), lawful interception, UE IP address allocation, transport level packet marking in the uplink and the downlink, UL and DL service level charging, gating and rate enforcement, DL rate enforcement based on APN-aggregate maximum bit rate (AMBR), etc.

The DSC 144 may be configured to perform various operations (e.g., via modules 162-166) to provide various functions, including managing resource arbitration operations within a network (e.g., PLMN), tracking network resource listings, tracking current bids in progress, tracking executed bids, and tracking bid specific closed subscriber group (CSG) identifiers (CSG-IDs) for mobility management of lessee wireless devices 102 in lessor networks. The DSC 144 may be configured to handover wireless devices 102 from lessee network to lessor network (i.e., perform handins), and handover wireless devices 102 from lessor network back to lessee network (i.e., perform backoff).

The DSC 144 may also be configured to track congestion states of eNodeBs, select target eNodeBs for handovers, and manage traffic on lessor eNodeBs. The DSC 144 may be configured to offload users based on configured policies (e.g. offload lower priority users, offload higher priority users, offload users with specific QoS, etc.) from lessee networks to other less loaded eNodeBs 116 within a lessor network. The DSC 144 may also perform backoff operations to handover a wireless device 102 from lessor network back to the lessee network. The DSC 144 may also be configured to monitor, manage, and/or maintain historic congestion information that is collected or received from one or more eNodeBs in the system.

The DPC 146 may be configured to perform various operations (e.g., via modules 167-171) to provide various functions, including functioning as a resource arbitrage broker between the DSCs 144 of lessor and lessee networks (e.g., PLMNs), listing resources from various lessor networks for auction, and managing the auction process. The DPC 146 may be configured to send notifications of outbid, bid win, bid cancel and bid withdrawal and bid expiry to DSCs 144, install bid specific charging rules in the online and/or offline charging systems of lessee and lessor networks, and coordinate resource usage between DSCs 144 by acting as gateway between lessee and lessor DSCs 144.

Figure 1E:
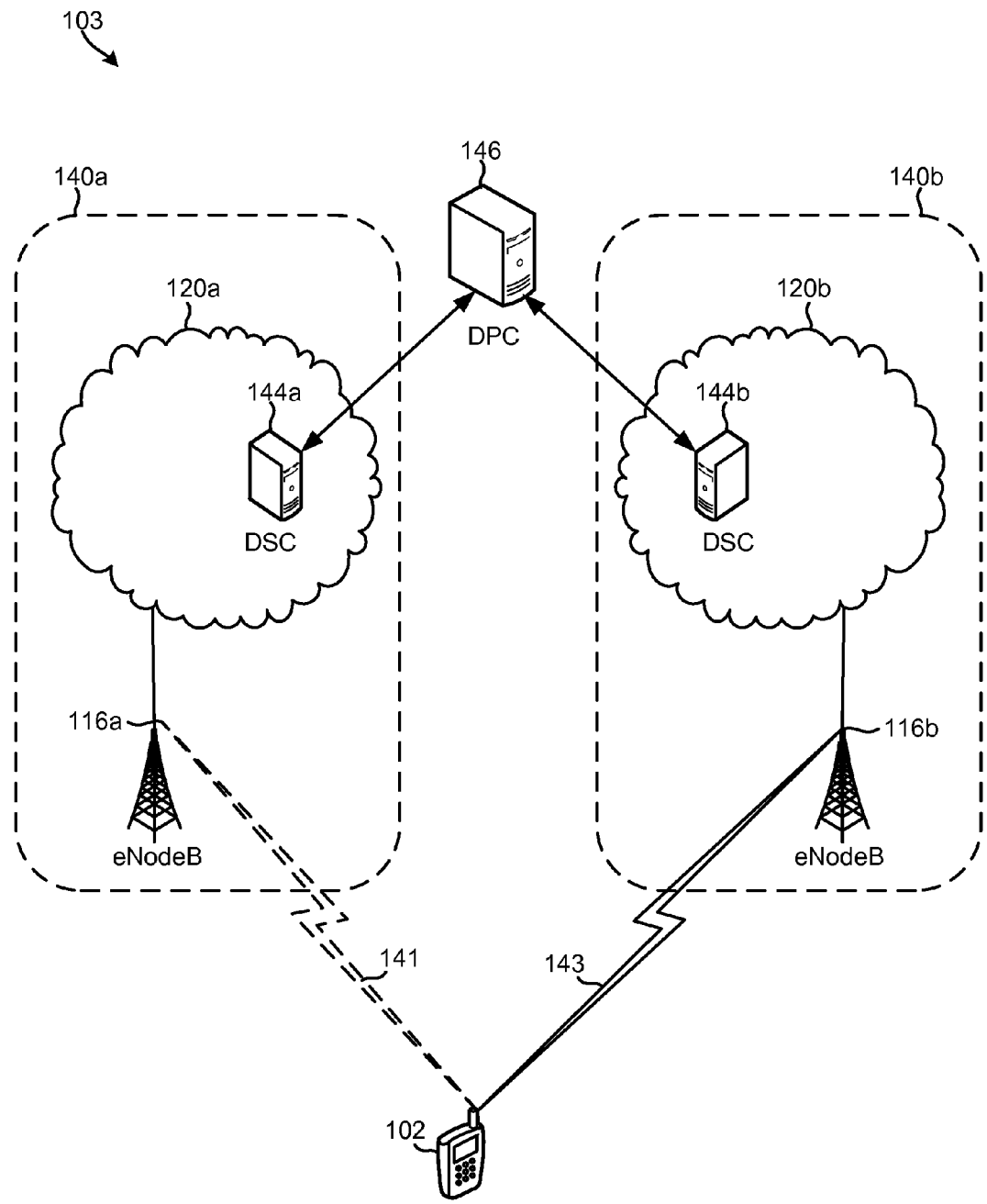

FIG. 1E illustrates network components and information flows in an example communication system 103 that includes two E-UTRANs 140a, 140b interconnected by a DPC 146 configured to manage DSA operations and interactions. In the example illustrated in FIG. 1E, each E-UTRAN 140a, 140b includes an eNodeB 116a, 116b that is outside of its core network 120a, 120b, and a DSC 144a, 144b that is inside of the core network 120a, 120b.

The DSCs 144a, 144b may be configured to communicate with the DPC 146 via Xd interface. The DSCs 144a, 144b may also be connected, directly or indirectly, to various network components in their respective core networks 120a, 120b, such as a PCRF 134, HSS 132 and a PCEF/PGW 128 (not illustrated in FIG. 1E). In an embodiment, one or more of the DSCs 144a, 144b may be connected directly to one or more of the eNodeBs 116a, 116b.

In addition to the above-mentioned connections and communication links, the system 103 may include additional connections/links to accommodate data flows and communications between components in different E-UTRANs (e.g., E-UTRANS 140a and 140b). For example, the system 103 may include a connection/communication link between an eNodeB 116b in the second E-UTRAN 140b to an SGW 118 in the first E-UTRAN 140a. As another example, the system 103 may include a connection/communication link between a SGW 118 in the second E-UTRAN 140b to a PGW 128 in the first E-UTRAN 140a. To focus the discussion of the relevant embodiments, these additional components, connections, and communication links are not illustrated in FIG. 1E.

As is discussed in detail further below, the DSCs 144a, 144b may be configured to send information regarding the availability of spectrum resources (e.g., information received from an eNodeB, PCRF, PCEF, PGW, etc.) to the DPC 146. This information may include data relating to current and expected future usage and/or capacity of each network or sub-network. The DPC 146 may be configured to receive and use such information to intelligently allocate, transfer, manage, coordinate, or lease the available resources of the first E-UTRAN 140a to the second E-UTRAN 140b, and vice versa.

For example, the DPC 146 may be configured to coordinate the allocation of spectrum resources to the second E-UTRAN 140b (i.e., lessee network) from the E-UTRAN 140a (i.e., lessor network) as part of the dynamic spectrum arbitrage operations. Such operations may allow a wireless device 102 that is wirelessly connected to the eNodeB 116b in the second E-UTRAN 140b via a communication link 143 to be handed off to an eNodeB 116a in the first E-UTRAN 140a so that it may use the allocated spectrum resources of the first E-UTRAN 140a. As part of this handoff procedure, the wireless device 102 may establish a new connection 141 to the eNodeB 116a in the first E-UTRAN 140a, terminate the wireless connection 143 to the original eNodeB 116b, and use the allocated resources of the first E-UTRAN 140a as if they are included in the second E-UTRAN 140b. The DSA operations may be performed so that the first DSC 144a is a lessor DSC for a first resource/period of time, and a lessee DSC for a second resource or another period of time.

In an embodiment, the DSA and/or handoff operations may be performed so that the wireless device 102 maintains a data connection to (or a data connection that is managed by) the original network after it is handed off. For example, DSA and/or handoff operations may be performed so that the wireless device 102 maintains a dataflow connection to a PGW 128 in the second E-UTRAN 140b after being handed off to the eNodeB 116a in the first E-UTRAN 140a.

Figure 2A:
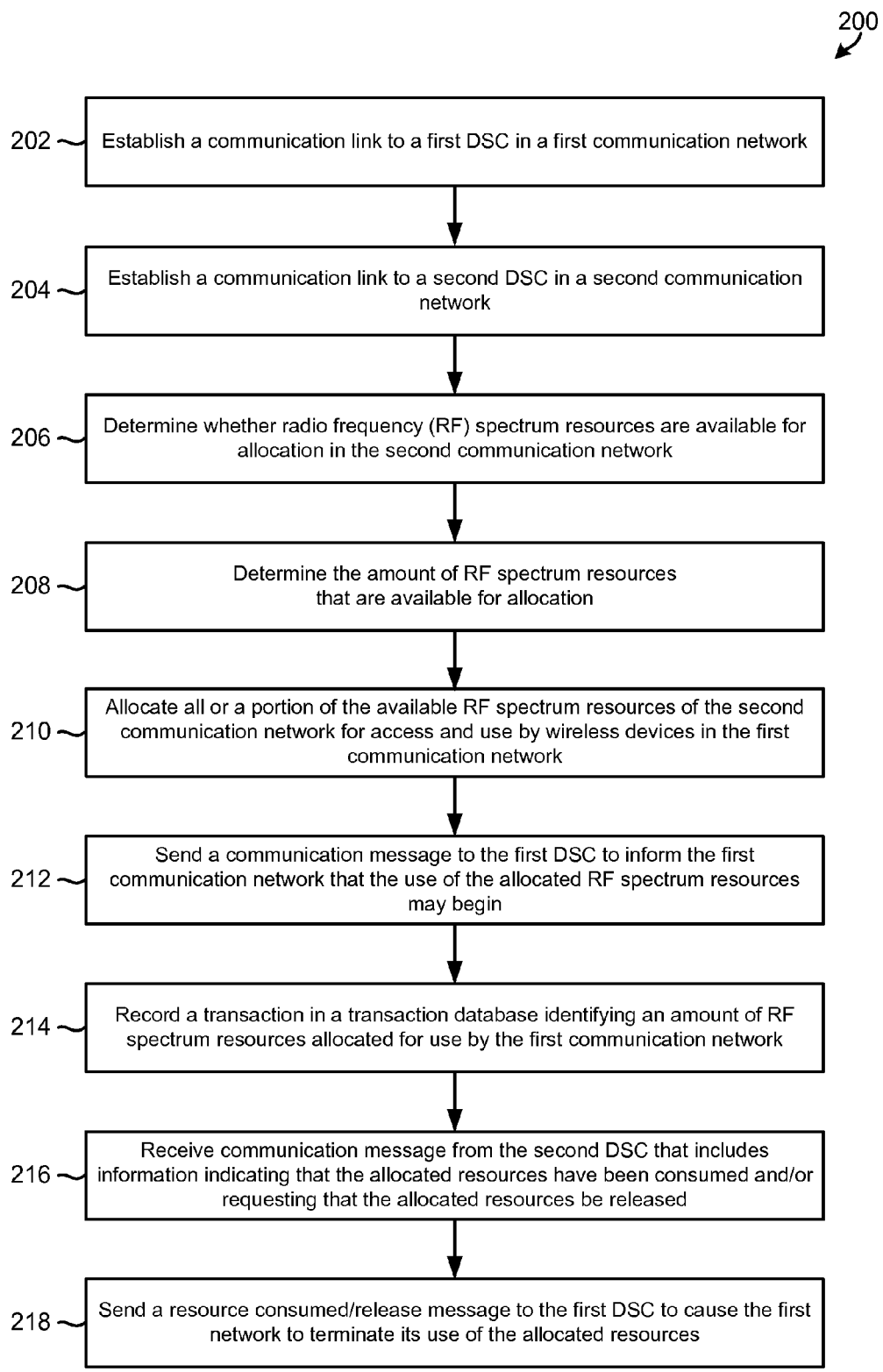
FIG. 2A is a process flow diagram illustrating a dynamic spectrum arbitrage (DSA) method of allocating resources from the perspective of a dynamic spectrum policy controller (DPC) in accordance with an embodiment.

FIG. 2A illustrates an example DSA method 200 of allocating resources in accordance with an embodiment. Method 200 may be performed by a processing core in a DPC 146 component (e.g., server computing device, etc.).

In block 202, the DPC 146 may establish a first communication link to a first DSC 144a in a first communication network (e.g., E-UTRAN, etc.). In block 204, the DPC 146 may establish a second communication link to a second DSC 144b in a second communication network. In block 206, the DPC 146 may determine whether radio frequency (RF) spectrum resources are available for allocation within the second communication network. This may be accomplished by using the DSAAP protocol to communicate with a DSC 144 in the second communication network via the second communication link, which may be a wired or wireless communication link. In block 208, the DPC 146 may determine the amount of RF spectrum resources that are available for allocation. In block 210, the DPC 146 may perform various operations to allocate all or a portion of the available RF resources of the second communication network for access and use by wireless devices 102 in the first communication network.

In block 212, the DPC 146 may send a communication message to the first DSC 144*a* (e.g., by using the DSAAP protocol) to inform the first communication network that the use of the allocated RF spectrum resources may begin. In block 214, the DPC 146 may record a transaction in a transaction database identifying an amount of RF spectrum resources allocated for use by the first communication network.

In block 216, the DPC 146 may receive a communication message from the second DSC 144*b* that includes information indicating that the allocated resources have been consumed and/or requesting that the allocated resources be released. In block 218, the DPC 146 may send a resource consumed/release message to the first DSC 144*a* to cause the first network to terminate its use of the allocated resources.

Figure 2B:
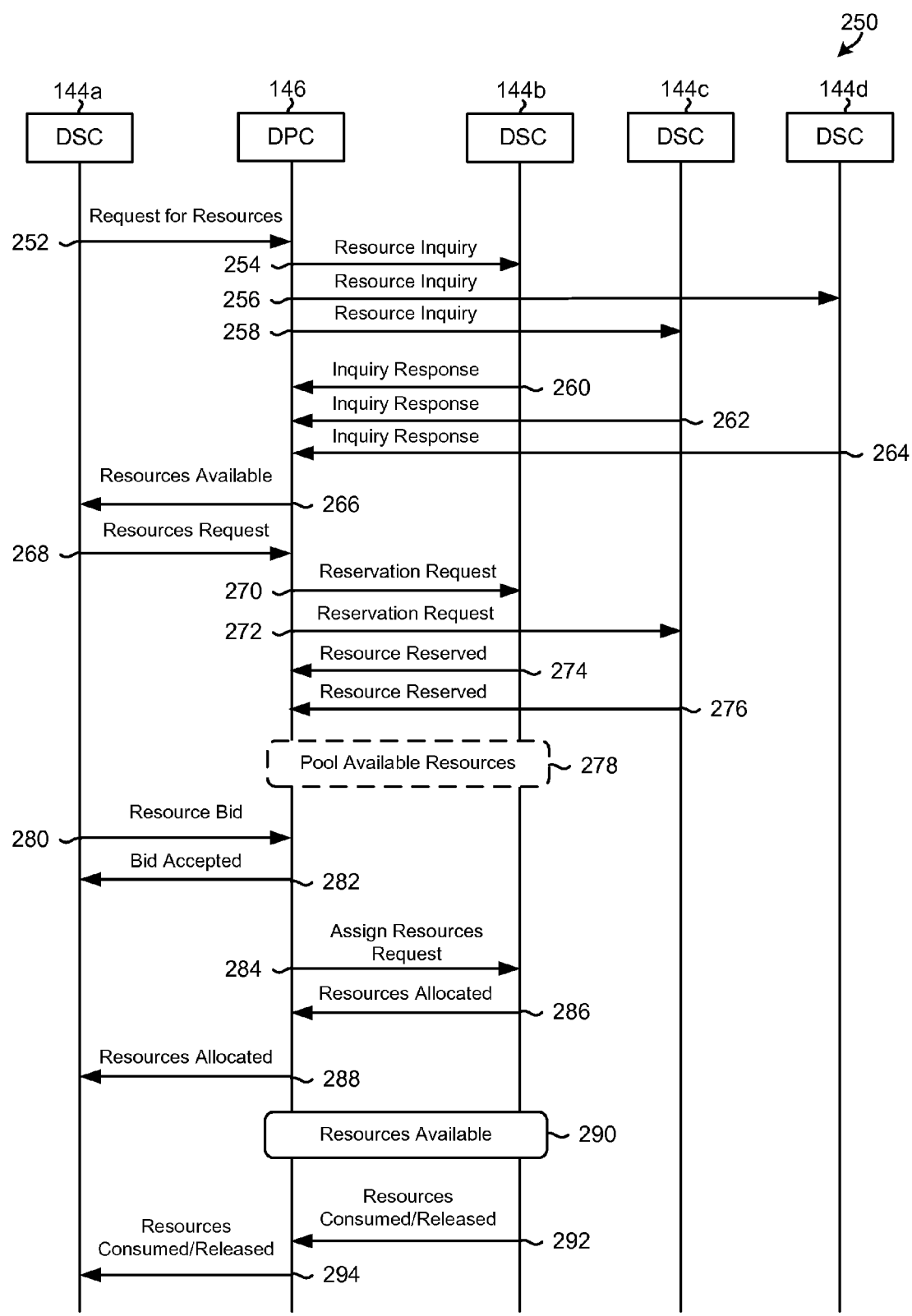
FIG. 2B is a message flow diagram illustrating message communications between components of a DSA communication system when allocating resources in accordance with an embodiment.

FIG. 2B illustrates example information flows between a DPC 146 and a plurality of DSCs 144*a-d* when performing another embodiment DSA method 250 to allocate resources. In the description below, the DSA method 250 is discussed from the perspective of the DPC 146 component, and may be performed by a processing core in the DPC 146. However, it should be understood that the DSA method 250 may be performed by processing cores in a DPC 146 component, processing cores in DSC 144*a-d* components, or a combination thereof. In addition, it should be understood that all the interactions and communications between the DPC 146 and the other components may be accomplished by DSAAP components and/or using the DSAAP protocol. As such, all such interactions and communications may be included in the DSAAP protocol.

In operation 252, a processing core in a DPC 146 component may receive a "request for resources" communication message from a first DSC 144*a* component in a first network (e.g., E-UTRAN, etc.). It should be understood that the "request for resources" communication message and all other communication messages discussed in this application may be DSAAP messages.

The "request for resources" communication message may include information suitable for informing the DPC 146 that the first network is interested in purchasing, leasing, accessing, and/or using resources from other networks. The "request for resources" communication message may also include information suitable for identifying the types and/or amounts of resources (e.g., RF spectrum resources, etc.) that are requested by the first network, the types and capabilities of the wireless devices 102 to which the requested resources will be allocated, and other similar information.

In operations 254, 256, and 258 the DPC 146 may generate and send a "resource inquiry" communication message to each of a second DSC 144*b* component in a second network, a third DSC 144*c* component in a third network, and a fourth DSC 144*d* component in a fourth network, respectively. The DPC 146 may be configured to generate the "resource inquiry" communication messages to include various component, device, and resource requirements, criteria, and information. For example, the DPC 146 may generate a "resource inquiry" communication message to include information identifying the types, capabilities, and geographic criteria of user wireless devices 102 in the first network (and other networks) to which resources are to be allocated. The geographic criteria may include a geographic location, a geographic polygon, and/or license area for a user wireless device 102 to which resources will be allocated.

In operations 260 and 262, the DPC 146 may receive "resource inquiry response" communication messages from the second and third DSCs 144*b*, 144*c*. These "resource inquiry response" communication messages may include information identifying the availability of excess resources that comply with the requirements/criteria included in the resource inquiry messages. In operation 264, the DPC 146 may receive another "resource inquiry response" communication message from the fourth DSC 144*d*. This "resource inquiry response" communication messages may include information indicating that the fourth network does not include resources that meet the requested requirements/criteria.

In an embodiment, as part of operations 260-264, the DPC 146 may update a database record to identify the second and third networks as having resources available for allocation and/or to identify the fourth network as not including such resources.

In operation 266, the DPC 146 may generate and send a "resource availability" communication message to a plurality of DSCs in a plurality of networks, including the first DSC 144*a* in the first network. The DPC 146 may be configured to generate the "resource availability" communication message to include information that is suitable for informing the networks that resources are available for allocation. In an embodiment, the DPC 146 may be configured to inform the networks that resources are available for allocation by broadcasting a communication signal that includes information suitable for informing the networks that resources are available for allocation via auction and/or an auction start time for the auction.

In operation 268, the DPC 146 may receive a "resource reservation request" communication message from the first DSC 144*a*. The received "resource reservation request" communication message may include information suitable for informing the DPC 146 that the first network intends to participate in the auction and/or bid on at least a portion of the available resources.

In operations 270 and 272, the DPC 146 may send the "resource reservation request" communication message to the second and third DSCs 144*b*, 144*c*, respectively. The "resource reservation request" communication message may include information suitable for causing the second and third DSCs 144*b*, 144*c* to reserve all or a portion of their available resources for allocation and use by other networks.

In operations 274 and 276, the DPC 146 may receive a "resource reservation response" communication message from each of the second and third DSCs 144*b*, 144*c*. The "resource reservation response" messages may include information suitable for informing the DPC 146 that the requested resources that have been reserved and/or information suitable for identifying the reserved resources.

Optionally, in operation block 278, the DPC 146 may pool the reserved resources for allocation and use by wireless devices 102 in other networks (e.g., the first network). For example, the DPC 146 may combine a block of spectrum reserved in the second network with a block of spectrum reserved in the third network. As another example, the DPC 146 may pool the resources available in the first and fourth channels of a block of spectrum reserved in the second network.

In operation 280, the DPC 146 may receive "resource bid" communication messages from a plurality of networks, including from the first DSC 144a in the first network. Each "resource bid" communication message may include a bid or offer for accessing, using, leasing, and/or purchasing a resource, as well as other related bid information (e.g., price, requested allocation/access methods, etc.). As part of operation 280, the DPC 146 may determine whether the received resource bids comply with the policies and rules of the DSA system and/or with requirements set forth by the networks offering the resources for allocation (e.g., meet the minimum asking price, etc.).

In operation 282, the DPC 146 may accept the bid/offer from the first network in response to determining that the resource bid received from the first network complies with the policies/rules of the DSA system and with requirements set forth by the resource offering network (e.g., offers a monetary amount for the use of all or a portion of the resources in the pool of available resources that is greater than or equal to a minimum amount specified by the second network). Also in operation 282, the DPC 146 may generate and send a "bid acceptance" communication message to the first DSC 144a.

In operation 284, the DPC 146 may allocate the resources of the second network for access and used by wireless devices 102 in the first network by sending an "assign resources request" communication message to the second DSC 144b. That is, in operation 284, the DPC may determine that the portion of the resources (e.g., in the pool of available resources) won by the first DSC 144a are fully available via the second network, and in response, only send the assign resources request message to the second network.

In operation 286, the DPC 146 may receive a "resources allocated" communication message from the second DSC 144b. In operation 288, the DPC 146 may send the "resources allocated" communication message to the first DSC 144a to inform the first network that the resources have been allocated for access and used by its wireless devices 102 and/or that the use of the allocated resources may begin. In operation block 290, the DPC 146 may record a transaction in a transaction database identifying these resources as being allocated for access and use by the first network.

In operation 292, the DPC 146 may receive a "release resources" communication message from the second DSC 144b that includes information indicating that the allocated resources have been consumed and/or information suitable for requesting that the allocated resources be released. In operation 294, the DPC 146 may send a resource consumed/release message to the first DSC 144a to cause the first network to terminate its use of the allocated resources.

FIGS. 3-7 illustrate an embodiment DSA method 300 for allocating and accessing resources in a communication system that includes a DPC 146 component, two DSC 144a, 144b components, and wireless devices 102. All or portions of DSA method 300 may be performed by processing cores in a DPC 146, DSCs 144a-b, and/or wireless device 102. In the various embodiments, any of all of the interactions and communications between the components 146, 144a, 144b, and 102 may be accomplished or facilitated by DSAAP components and/or using the DSAAP protocol. As such, all such interactions and communications may be included in the DSAAP protocol.

Figure 3:
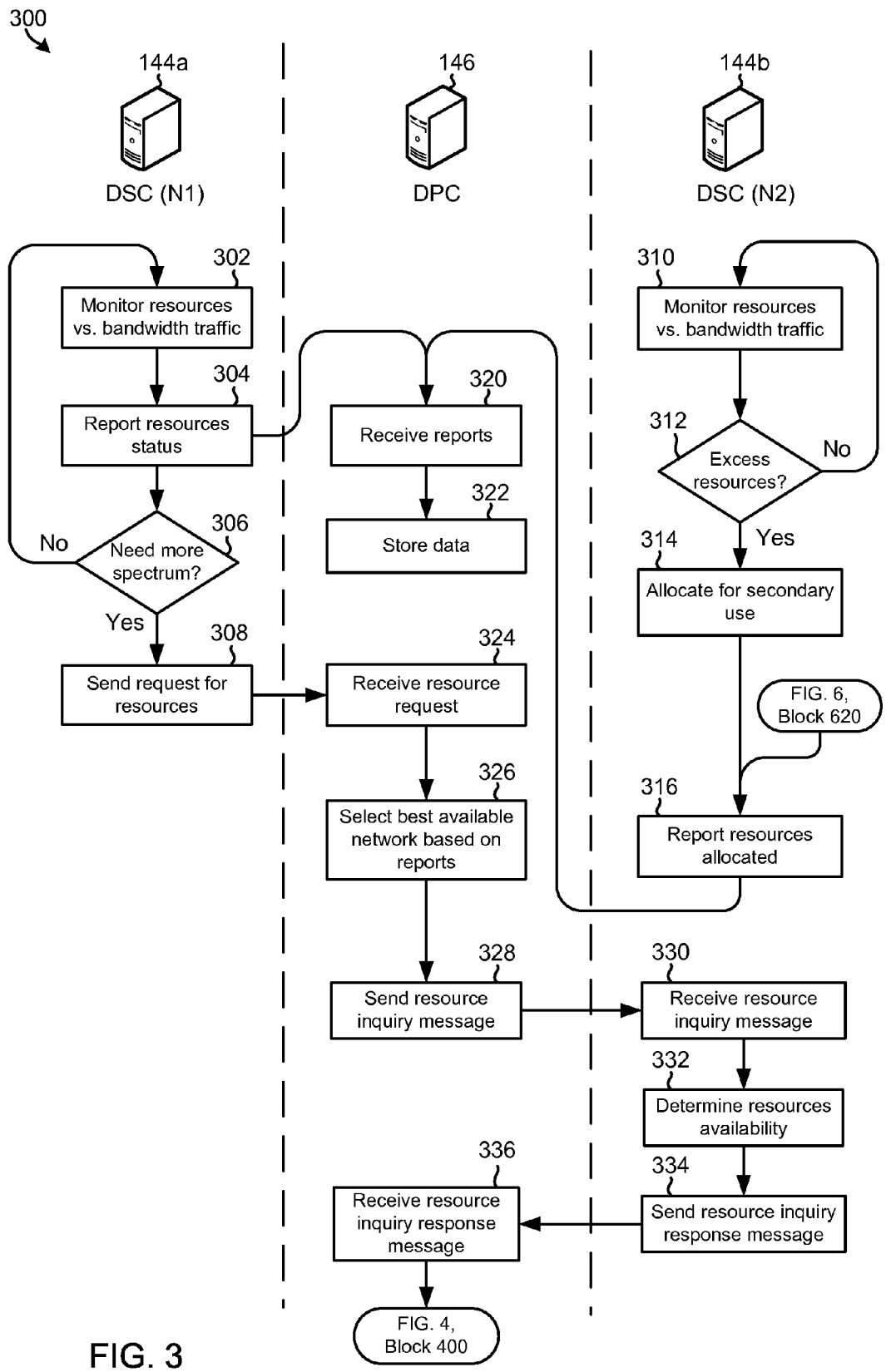
FIGS. 3 through 7 are process flow diagrams illustrating an embodiment DSA method of allocating and accessing resources in a communication system that includes a DPC, two dynamic spectrum controllers (DSCs), and a wireless device.

With reference to FIG. 3, in block 302, a first DSC 144a in a first network may monitor user traffic (e.g., call and data traffic, etc.) as compared to the total spectrum resources available to the first network. In block 304, the first DSC 144a may generate a resource status report based on a result of its monitoring, record/store the resource status report in memory, and send a resource status report to the DPC 146 via a resources status report communication message. In determination block 306, the first DSC 144a may determine, based on the received resource status reports, whether additional resources are required (and/or whether there is a high probability that additional resources will be required in the near future) to provide adequate service to the existing wireless devices 102 in the first network. In response to determining that additional resources are required (i.e., determination block 306="Yes"), in block 308, the first DSC 144a may send a "request for resources" communication message to the DPC 146. In response to determining that additional resources are not required (i.e., determination block 306="No"), the first DSC 144a may continue monitoring user traffic and/or perform other DSC operations in block 302.

In block 310, a second DSC 144b in a second network may monitor user traffic as compared to the total spectrum resources available to the second network, generate resource status reports, and/or perform any or all of the DSC operations discussed in this application. In determination block 312, the second DSC 144b may determine whether there is an excess amount of resources available in the second network. In response to determining that there are no excess resources available in the second network (i.e., determination block 312="No"), in block 310, the second DSC 144b may continue monitoring user traffic and/or performing other DSC operations.

In response to determining that there is an excess amount of resources available in the second network (i.e., determination block 312="Yes"), in block 314, the second DSC 144b may mark, designate, or allocate all or portions of its excess resources for access and use by other networks (e.g., the first network, etc.). In block 316, the second DSC 144b may generate a resource allocation report, and send the generated resource allocation report to the DPC 146 (e.g., via a resource communication message). The DSC 144b may be configured to generate the resource allocation report to include information identifying the resources (or portions or amounts of resources) that are available for allocation and/or that have been marked, designated, or allocated by the second network.

In block 320, the DPC 146 may receive various resource status and allocation reports from DSCs 144 in many different networks, including the first and second DSCs 144a, 144b in the first and second networks. These reports may include information identifying various characteristics, criteria, requirements, and conditions of the networks and their components, such as the ratio of the detected user traffic to the total available spectrum resources, the amount of resources that are required by a network, the amount of resources that are available for allocation in a network, the types and capabilities of the wireless devices 102 that will use the allocated resources, system requirements that must be met before the wireless devices 102 access the allocated resources, network rules and policies with respect to access and use of resources, and other similar information.

In block 322, the DPC 146 may store the received reports (e.g., resource status reports, resource allocation reports, etc.) in memory (e.g., a non-volatile memory). In block 324, the DPC 146 may receive a request for resources from DSCs 144 in different networks, including the first DSC 144a in the first network. In block 326, the DPC 146 may use the received/stored information (e.g., information received in requests for resources, resource allocation reports, resource status reports, etc.) to identify and select the most suitable/best available network from which the first network may lease or purchase additional resources. In the example illustrated in FIG. 3, the DPC 146 identifies and selects the second network as the most suitable network to provide resources to the first network.

In block 328, the DPC 146 may send a resource inquiry communication message to the second DSC 1144b. In block 330, the second DSC 1144b may receive the resource inquiry communication message. In block 332, the second DSC 1144b may determine the availability, amounts, and/or quantity of the excess resources that are marked, designated, or allocated by the second network. In block 334, the second DSC 1144b may generate and send a "resource inquiry response" communication message to the DPC 146. The second DSC 1144b may generate resource inquiry response to include information suitable for use in identifying the availability and quantity of the resources that are marked, designated, or allocated for access and use by other networks (e.g., the first network). In block 336, the DPC 146 may receive the "resources inquiry response" communication message from the second DSC 1144b, and in response, perform the operations of determination block 400 illustrated in FIG. 4.

Figure 4:
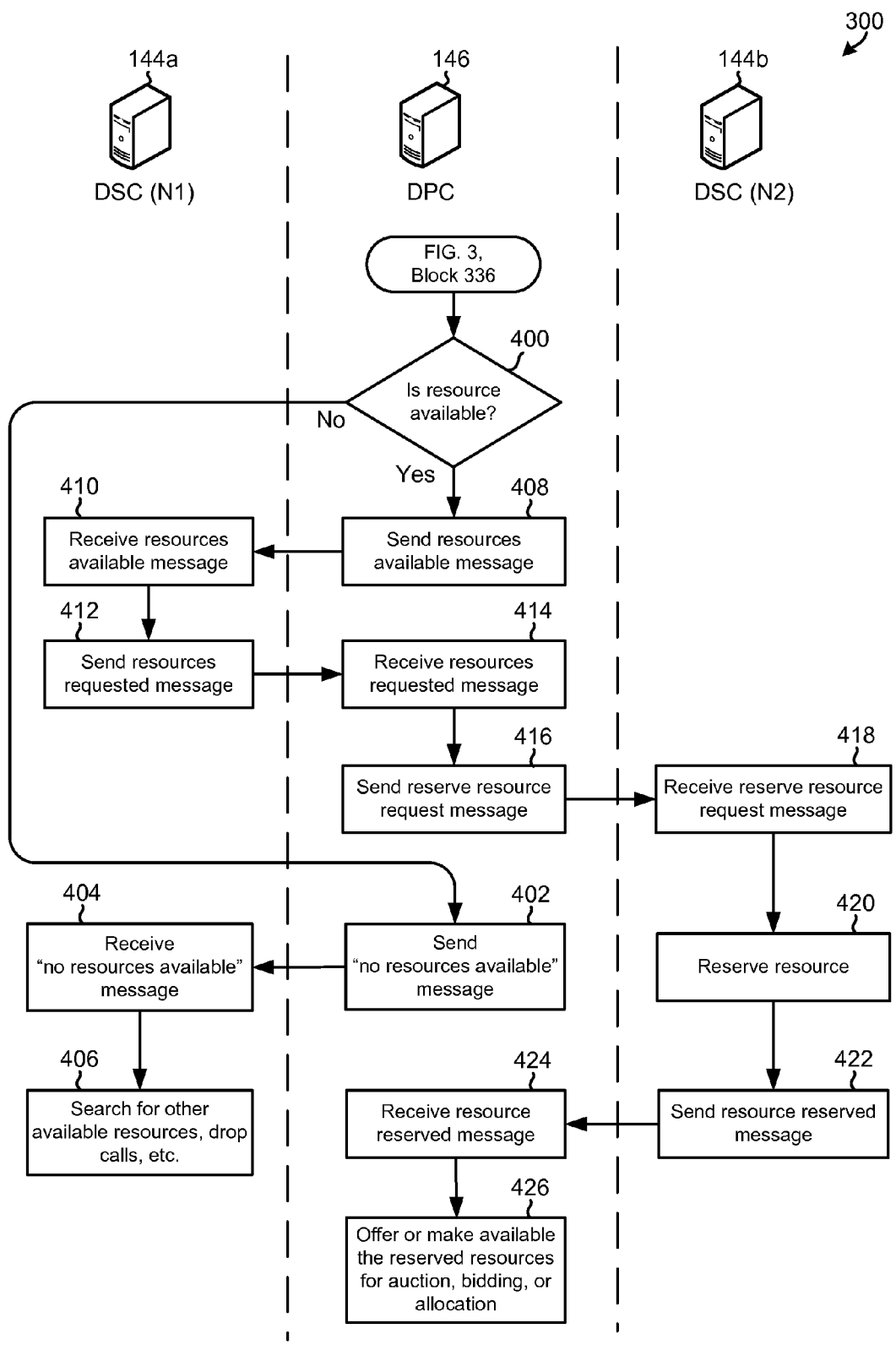

With reference to FIG. 4, in determination block 400, the DPC 146 may determine whether resources are available based on the data (e.g., resources inquiry response message) received from the second DSC 144b in the second network. For example, the DPC 146 may determine that the identified resources are not available in response to determining that all or a portion of the resources were purchased or won by other bidders before they were reserved.

In response to determining that the resources are not available (i.e., determination block 400="No"), in block 402, the DPC 146 may send a "no resources available" communication message to the first DSC 144a in the first network. In block 404, the first DSC 144a may receive the "no resources available" communication message. In block 406, the first DSC 144a may search (e.g., via the DPC 146) for other available resources, request resources from a different network, request different resources, terminate connections or communication sessions with users to free-up resources, or perform other similar operations to manage network traffic and congestion in the first network.

In response to determining that the resources are available (i.e., determination block 400="Yes"), in block 408, the DPC 146 may send a "resources available" communication message to the first DSC 144a. The resources available message may include information that may be used by the first DSC 144a to determine the quality and quantity of resources in the second network that may be used by wireless devices 102 in the first network.

In block 410, the first DSC 144a may receive the resources available communication message sent from the DPC 146. In block 412, the first DSC 144a may determine the amount/quantity of resources that the first network requires and/or will attempt to acquire, and send this and other resource information to the DPC 146 in a "request resources" communication message.

In block 414, the DPC 146 may receive the "request resources" message from the first DSC 144a. In block 416, the DPC 146 may use information included in received message to generate and send a "reserve resources request" communication message to the second DSC 144b in the second network.

In block 418, the second DSC 144b may receive the "reserve resource request" message from the DPC 146. In block 420, the second DSC 144b may use the information included in the received "reserve resources request" message to reserve the requested quantity of allocated resources for access and use by components in other networks. In block 422, the second DSC 144b may send a "resource reserved" communication message to the DPC 146 to confirm that the requested quantity of resources has been reserved and/or to identify the reserved resources.

In block 424, the DPC 146 may receive the "resource reserved" communication message from the second DSC 144b. In block 426, the DPC 146 may offer the reserved resources for auction and/or begin accepting resource bids on the reserved resources.

Figure 5:
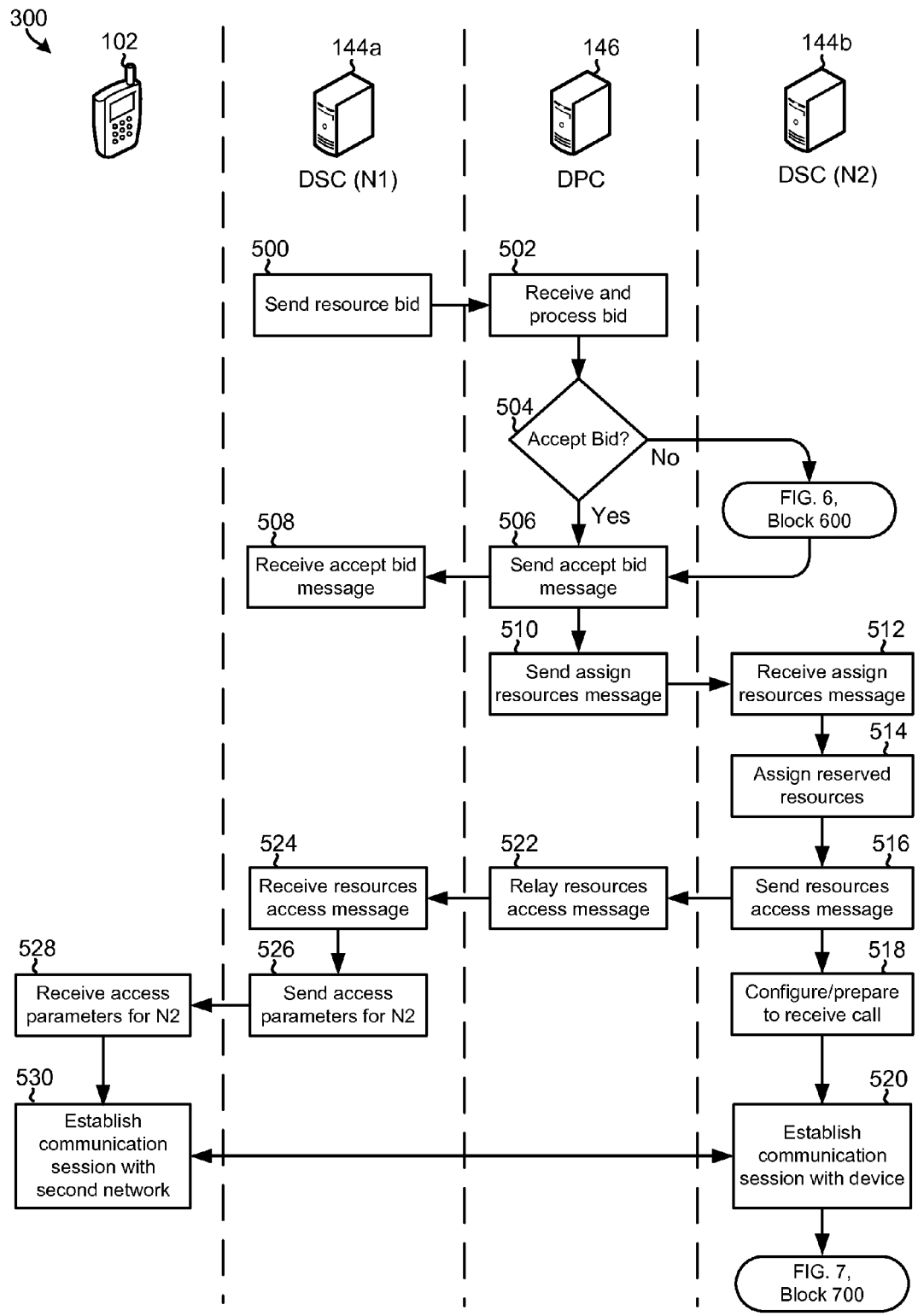

FIG. 5 illustrates a bidding procedure of the DSA method 300 that may be performed after the DPC 146 offers the reserved resources for auction and/or begins accepting resource bids on the reserved resources (e.g., after performing the operations of block 426 illustrated in FIG. 4).

With reference to FIG. 5, in block 500, the first DSC 144a in the first network may negotiate access to the reserved resources of second network by sending a resource bid (e.g., via a communication message) to the DPC 146. In block 502, the DPC 146 may receive the resource bid from the first DSC 144a.

In determination block 504, the DPC 146 may determine whether the received resource bid is to be accepted, which may be accomplished by determining whether the resource bid complies with the policies and rules of the DSA system and the requirements of the second network (e.g., is greater than a minimum amount, etc.). In response to determining that the resource bid received from the first DSC 144a is to be accepted (i.e., determination block 504="Yes"), in block 506, the DPC 146 may send an "accept bid" communication message to the first DSC 144a. In block 508, the first DSC 144a may receive the "accept bid" message and wait to receive resource access instructions. In block 510, the DPC 146 may send an "assign resources" communication message to the second DSC 144b in the second network.

In block 512, the second DSC 144b may receive the "assign resources" communication message from the DPC 146. In block 514, the second DSC 144b may use the information included in the received "assign resources" message to assign all or portions of its reserved resources for access and use by components in the first network. In block 516, the second DSC 144b may generate a "resources access" communication message that includes information (e.g., access parameters, etc.) that may be used by a wireless device 102 (i.e., in the first network) to access the assigned resources, and the send the "resources access" message to the DPC 146. In block 518, the second DSC 144b may perform various operations to prepare for establishing a communication session/link to wireless device 102 in the first network, such as by configuring or preparing to receive a voice or data call.

In block 522, the DPC 146 may receive the "resources access" communication message from the second DSC 144b, and relay the resources access message to the first DSC 144a. In block 524, the first DSC 144a may receive the "resources access" message from the DPC 146. The received "resource access" message may include access parameters that may be used by the wireless devices 102 to access the allocated resources of the second network. In block 526, the first DSC 144a may send access parameters to wireless devices 102 that have communication sessions with the first network and/or to the wireless devices 102 that the first network has designated/marked for migration to other networks.

In block 528, the wireless devices 102 may receive the access parameters of second network from the first DSC 144a. In blocks 530 and 520, the wireless devices 102 and/or second DSC 142b may perform various operations to establish a communication session/link between the wireless devices 102 and the second network. The second DSC 144b may then perform the operations of block 700 illustrated in FIG. 7 and discussed further below.

As mentioned above, in determination block 504, the DPC 146 may determine whether the resource bid received from the first DSC 144*a* is to be accepted. In response to determining that the resource bid received from the first DSC 144*a* is not to be accepted (i.e., determination block 504="No"), the DPC 146 may perform the operations of block 600 illustrated in FIG. 6.

Figure 6:
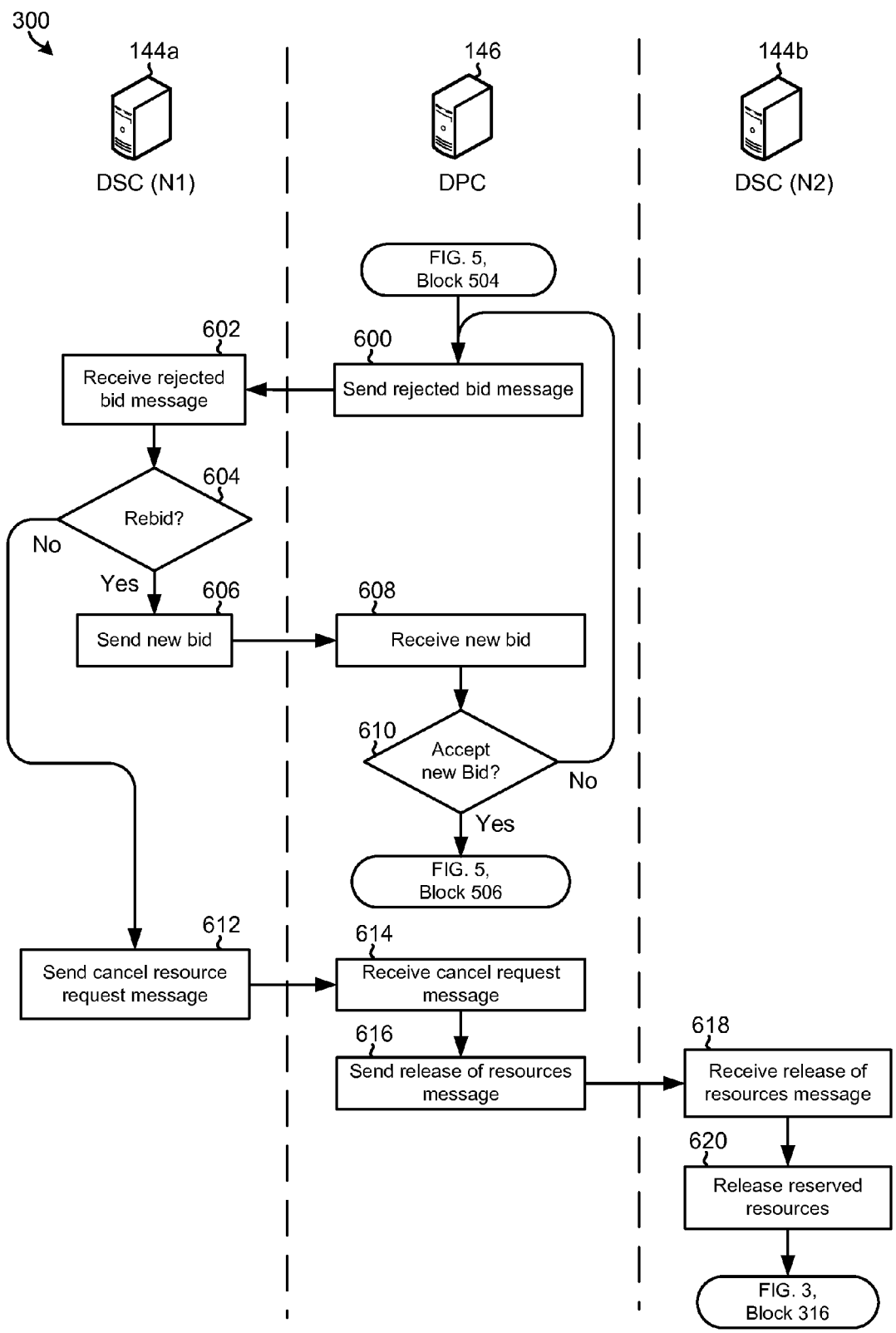

With reference to FIG. 6, in block 600, the DPC 146 may send a "rejected bid" communication message to the first DSC 144*a*. In block 602, the first DSC 144*a* may receive the "rejected bid" message from the DPC 146. In determination block 604, the first DSC 144*a* may determine whether the first network will/should rebid for the resources. In response to determining that the first network will/should rebid for the resources (i.e., determination block 604="Yes"), in block 606, the first DSC 144*a* may send a new resource bid (e.g., in a resource bid communication message) to the DPC 146.

In block 608, the DPC 146 may receive the new resource bid (or rebid) from the first DSC 144*a*. In determination block 610, the DPC 146 may determine whether to accept the new resource bid, such as by determining whether the new resource bid complies with the policies and rules of the DSA system and the requirements of the second network. In response to determining that the new resource bid is to be accepted (i.e., determination block 610="Yes"), the DPC 146 may perform the operations of block 506 illustrated in FIG. 5. In response to determining that the new resource bid is to not be accepted (i.e., determination block 610="No"), the DPC 146 may perform the operations of block 600.

In response to determining that the first network should rebid for the resources (i.e., determination block 604="No"), in block 612, the first DSC 144*a* may send a "cancel resource request" communication message to the DPC 146. In block 614, the DPC 146 may receive the "cancel resource request" message from the first DSC 144*a*. In block 616, the DPC 146 may send a "release of resources" communication message to the second DSC 144*b*.

In block 618, the second DSC 144*b* may receive the "release of resources" message from the DPC 146. In block 620, the second DSC 144*b* may release the reserved resources so that they may be used by other networks. The second DSC 144*b* may then report the status of the allocated resources to DPC 146, which may be accomplished by performing the operations of block 316, which is illustrated in FIG. 3 and discussed above.

Figure 7:
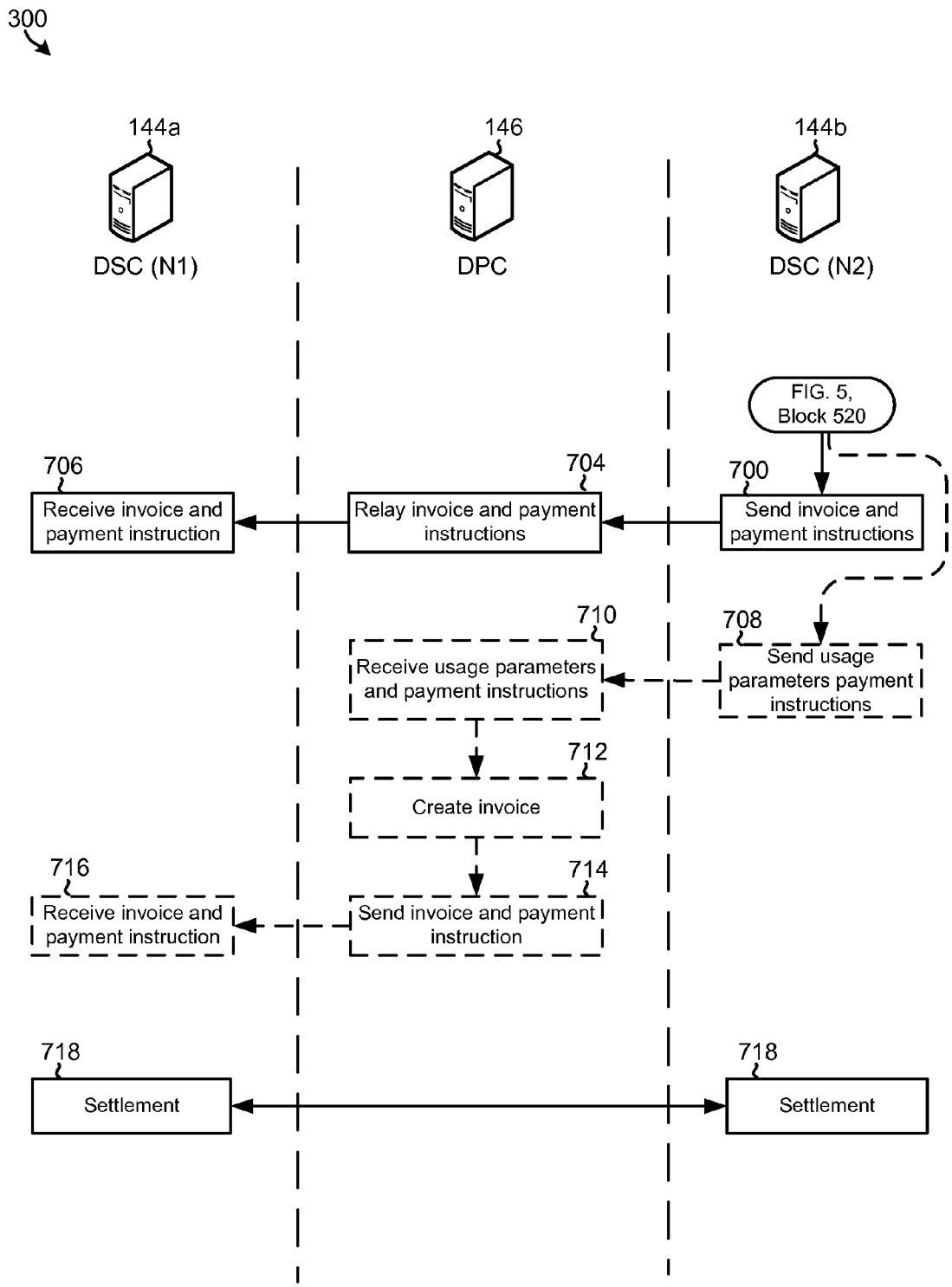

FIG. 7 illustrates settlement procedure of the DSA method 300 that may be performed after second network provides access to the secondary user wireless devices 102 in the first network (i.e., after performing the operations of block 520 illustrated in FIG. 5).

In block 700, the second DSC 144*b* may send invoices and payment instructions relating to the use of allocated resources by the first network to the DPC 146. In block 704, the DPC 146 may relay the received invoice and payment instructions to the first DSC 144*a*. In block 706, the first DSC 144*a* may receive the invoices and payment instructions, and settle the charges with the second network in block 718.

Optionally or alternatively, in block 708, the second DSC 144*b* may send usage parameters and payment instructions to the DPC 146. In block 710, the DPC 146 may receive the usage parameters and payment instructions from the second DSC 144*b*. In block 712, the DPC 146 may create an invoice for the access and use of the resources. In block 714, the DPC 146 may send the invoice to the first DSC 144*a* in the first network. In block 716, the first DSC 144*a* may receive the invoice and payment instructions, and perform various operations to settle the charges with second network in block 718.

In the various embodiments, the DPC 146 and DSC 144 components may be configured to communicate via an interface, which may be implemented in, or provided via, a dynamic spectrum arbitrage application part (DSAAP) protocol/module/component that is defined over the Xe and/or Xd reference points. The DSAAP may allow, facilitate, support, or augment communications between the DPC 146 and DSC 144 so as to improve the efficiency and speed of the DSA system and telecommunication network. In various embodiments, all or portions of the DSAAP module/component may be included in a DPC 146 component, a DSC 144 component, in a component that is independent of the DPC 146 and DSC 144 components, or any combination thereof. The DSAAP module/component may allow these and other DSA components to communicate information using the DSAAP protocol.

For example, the DSAAP may allow the DPC 146 and DSC 144 components to communicate specific information and/or perform operations that together provide various functions, including a DSC registration function, resource availability advertisement function, bidding and allocation of resources functions, handing off lessee users to lessor network function, backoff from lessor networks function, error handling function (e.g., reporting of general error situations for which function specific error messages are not defined, etc.), DSC de-registration function, error indication function, DSC bidding success and failure indication functions, and DSC resource allocation withdrawal function. In various embodiments, these functions may be provided, implemented, or accomplished by configuring the DPC 146 and/or DSC 144 components to perform one or a combination of the DSAAP methods discussed below with reference to FIGS. 8A-17B. Using the DSAAP protocol and performing the DSAAP methods may include communicating via one or more DSAAP messages.

In various embodiments, the DSAAP messages used to communicate information between the DSC 144 and DPC 146 may include a DSC REGISTER REQUEST message, DSC REGISTER ACCEPT message, DSC REGISTER REJECT message, DSC DE-REGISTER message, DSC RESOURCE REGISTER REQUEST message, DSC RESOURCE REGISTER ACCEPT message, DSC RESOURCE REGISTER REJECT message, AVAILABLE BIDS REQUEST message, AVAILABLE BIDS RESPONSE message, AVAILABLE BIDS REJECT message, DSC BID REQUEST message, DSC BID ACCEPT message, DSC BID REJECT message, DSC BID OUTBID message, DSC BID WON message, DSC BID LOST message, DSC BID CANCELLED message, DSC BUY REQUEST message, DSC BUY ACCEPT message, DSC BUY REJECT message, DSC RESOURCES ALLOCATED message, DSC RESOURCES WITHDRAWN message, and/or DSC BACKOFF COMMAND message. Each of these messages may include, or may be associated with, criticality information, presence information, range information, and assigned criticality information. These messages and their contents are discussed in detail further below.

In various embodiments, the DSAAP methods may be performed in a DSA system that includes a first DSC server in a first telecommunication network (e.g., a lessee network), a second DSC server in second telecommunication network (e.g., a lessor network), and a DPC server that is outside of the first and second telecommunication networks. The first DSC may include first DSC processor coupled to the DPC via a first communication link, and the second DSC may include a second DSC processor coupled to the DPC via a second communication link. The second DSC may be coupled to an eNodeB in the second telecommunication network via third communication link. The first and second communication links may be defined over the Xd interface, and the third communication link is defined over the Xe interface.

Figure 8A:
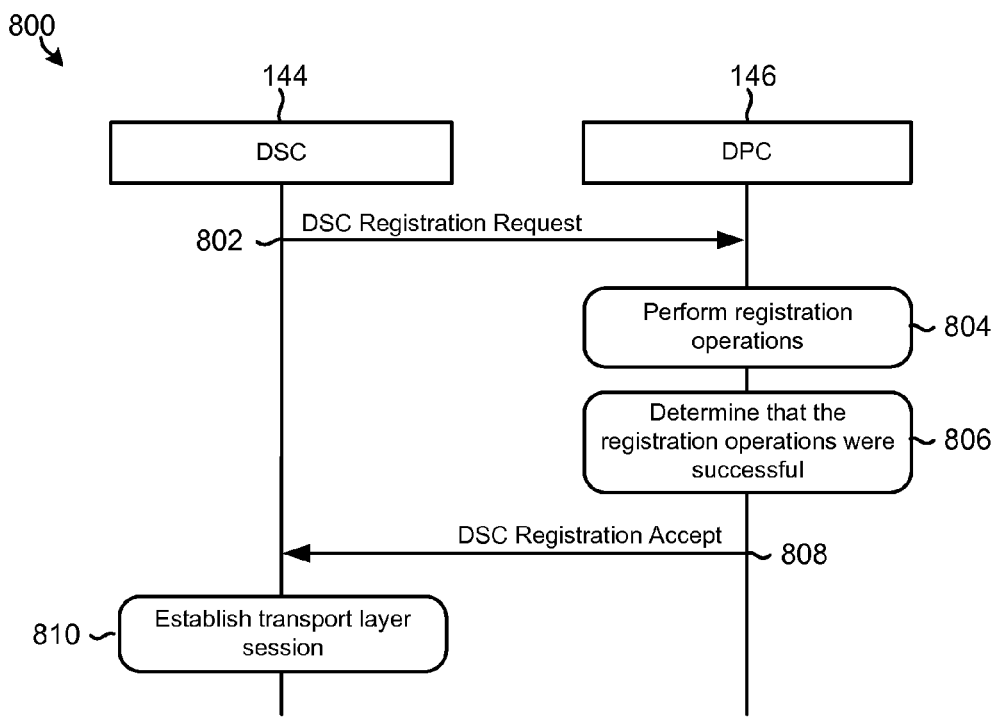
FIGS. 8A through 8C are message flow diagrams illustrating an embodiment dynamic spectrum arbitrage application part (DSAAP) registration method.
Figure 8B:
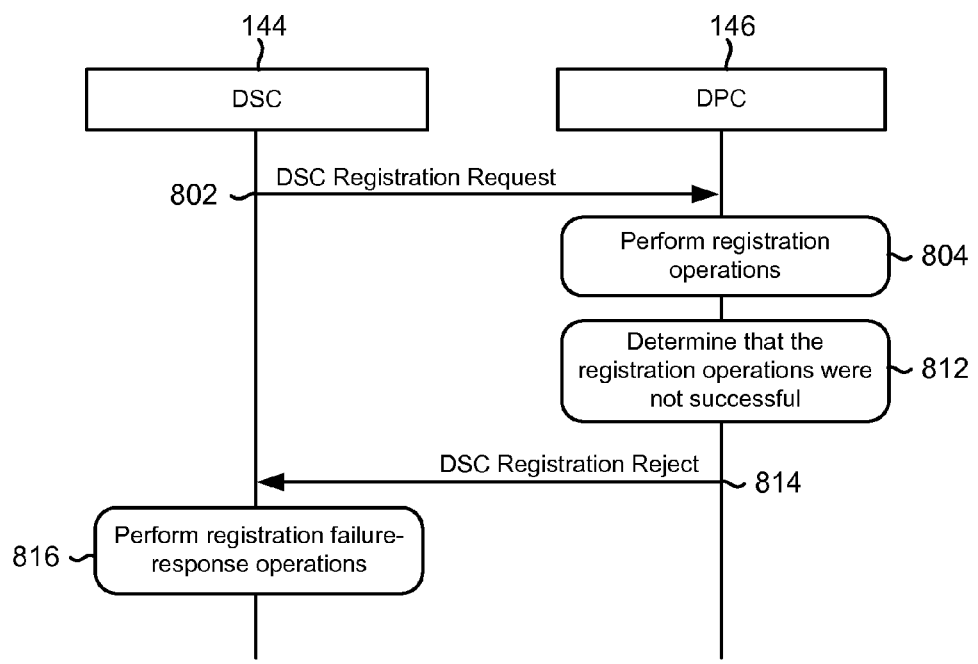
Figure 8C:
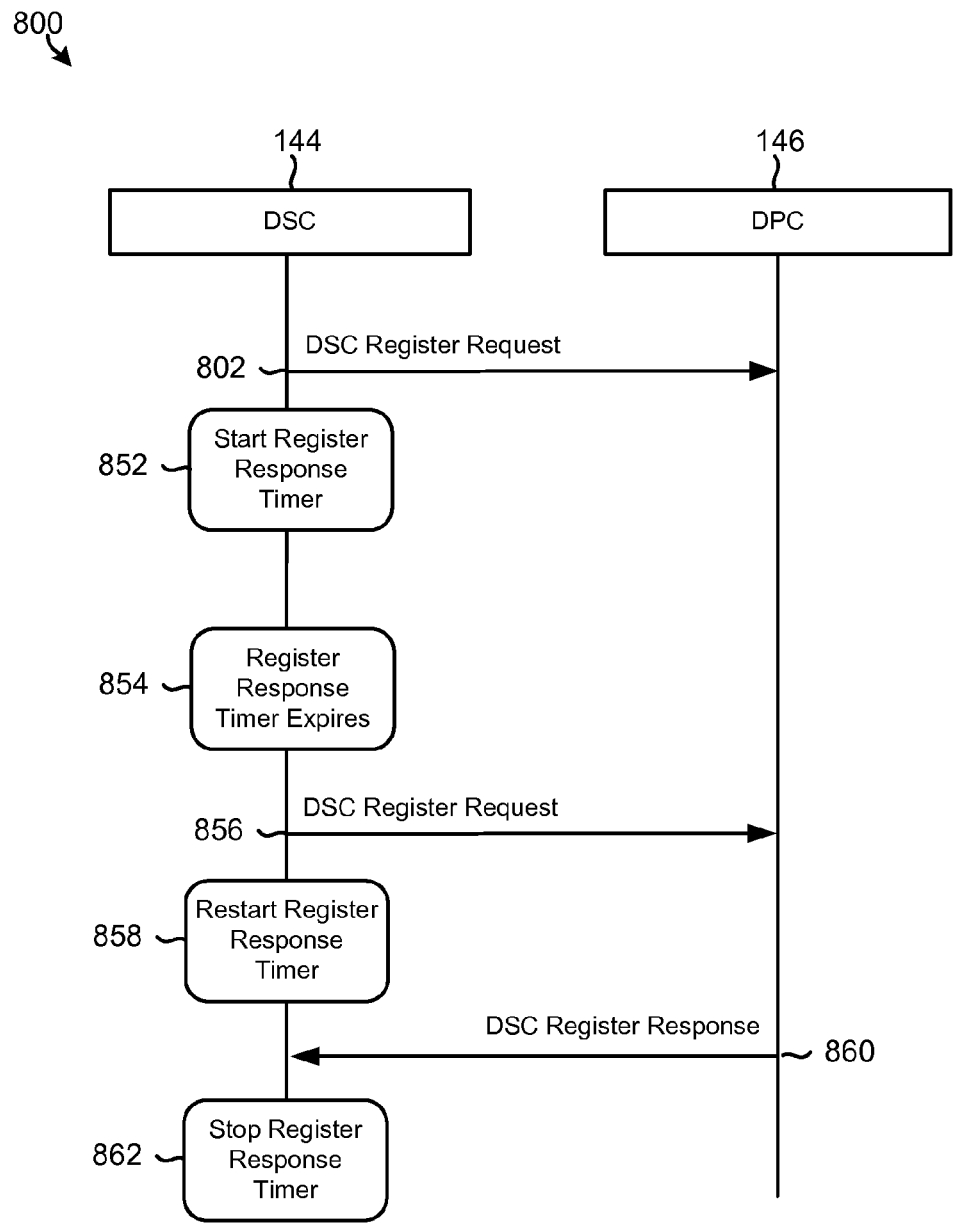

FIGS. 8A through 8C illustrate an embodiment DSAAP registration method 800 for registering a DSC 144 component with a DPC 146 so as to allow the DPC 146 to provide various services to the DSC 144 (e.g., advertizing a lessor DSC's 144 resources for bidding, allowing a lessee DSC 144 to bid for resources provided by other networks, etc.). In the examples illustrated in FIGS. 8A through 8C, the DSAAP registration method 800 is performed by processing cores in a DPC 146 component and a DSC 144 component, each of which may include all or portions of a DSAAP module/component. The operations DSAAP registration method 800 may be performed after, or in response to the DSC 144 or DPC 146 detecting that, an XE signaling transport or communication link has been established.

In operation 802 illustrated in FIGS. 8A through 8C, the DSC 144 may initiate DSAAP registration method 800 by generating and sending a DSC REGISTER REQUEST message to the DPC 146. In an embodiment, the DSC 144 may be configured to generate and/or send the DSC REGISTER REQUEST message in response to determining that it requires services from the DPC 146. For example, the DSC 144 may be configured to generate the DSC REGISTER REQUEST message in response to determining that its corresponding network (i.e., the network represented by the DSC) includes excess resources that may be allocated to other networks. As another example, the DSC 144 may be configured to generate the DSC REGISTER REQUEST message in response to determining that its network requires additional resources to provide adequate service to its existing wireless devices 102 in view of the current or expected future user traffic, network congestion, etc.

In various embodiments, the DSC 144 may be configured to generate the DSC REGISTER REQUEST message to include any or all of a message type information element (IE), a message ID IE, a DSC identity IE, a DSC Internet protocol (IP) address IE, a DSC type IE, a DSC PLMN-ID IE, PLMN type IE, and DSC resource update timer IE. The DSC PLMN-ID IE may include a PLMN ID that is suitable for use in identifying the network (e.g., E-UTRAN) that is associated with, or represented by, the DSC 144. The PLMN type IE may include information that is suitable for use in determining the type of network (e.g., public safety, commercial, etc.) that is represented by the DSC 144. The DSC IP address IE may include the IP address of a DSC 144 that is responsible for managing, maintaining, or providing the XE interface of the DSAAP.

In operation block 804 illustrated in FIGS. 8A and 8B, the DPC 146 may perform various registration operations (i.e., authenticating the DSC, storing DSC identifier information in memory, etc.) to register the DSC 144 with the DPC 146. In an embodiment, as part of these registration operations, the DPC 146 may overwrite/override an existing registration with a new registration, such as in response to receiving a duplicate DSC REGISTER REQUEST message (i.e. for an already registered DSC identified by the same unique DSC identity).

In operation block 806 illustrated in FIG. 8A, the DPC 146 may determine that the registration operations were successful. In operation 808, the DPC 146 may generate and send a DSC REGISTER ACCEPT message to the DSC 144 to indicate the acceptance and registration of the DSC 144. In various embodiments, the DPC 146 may generate the DSC REGISTER ACCEPT message to include any or all of a message type information element (IE), a message ID IE, a DPC ID IE, a XEh signaling transport network layer (TNL) address IE, and a tunneling information IE. The XEh signaling TNL address IE may include an address value that is suitable for use in establishing to transport layer session. The tunneling information IE may include information that may used to encapsulate a different payload protocol, establish a secured communication through an untrusted or unverified network, carry a payload over an incompatible delivery-network, and/or to perform other similar tunneling operations.

To support XEh connectivity via/to the DPC 146, in operation block 810, the DSC 144 may use the address value included in the XEh signaling TNL address IE of the DSC REGISTER ACCEPT message establish a transport layer session. In an embodiment, the DSC 144 may be configured to establish the transport layer session in response to determining that the DSC REGISTER ACCEPT message includes an address value in the XEh signaling TNL address information element. In an embodiment, the DSC 144 may be configured to determine that the XEh connectivity via/to the DPC 146 is not supported or not required in response to determining that the XEh signaling TNL address information element is not present, null, empty, or not valid.

With reference to FIG. 8B, in operation block 812, the DPC 146 may determine that the registration operations performed as part of operation 804 failed. The DPC 146 may determine that registration failed in response to detecting any of a variety of conditions/events, including the failure to authenticate or authorize the DSC, network or component overload, DSC parameter mismatch, etc. In operation 814, the DPC 146 may generate and send a DSC REGISTER REJECT message to the DSC 144 to inform the DSC 144 that the registration failed and/or that the DPC 146 cannot register the DSC 144. In various embodiments, the DPC 146 may generate the DSC REGISTER REJECT message to include any or all of a message type information element (IE), a message ID IE, a cause IE, a criticality diagnostics IE, and a backoff timer IE. The cause IE may include information suitable for identifying a specific reason for the failure (e.g., overloaded, etc.) or for indicating that the reason for the failure is not known or is unspecified.

In operation block 816, the DSC 144 may perform various registration failure-response operations based on the information included in the received REGISTER REJECT message. For example, the DSC 144 may wait for a duration indicated in the backoff timer IE of the received REGISTER REJECT message before reattempting registration with that same DPC 146 in response to determining that the value of the cause IE in the received REGISTER REJECT message is set to "overload."

With reference to FIG. 8C, in operation block 852, the DSC 144 may start a register response timer in response to sending a DSC REGISTER REQUEST message to the DPC 146 (e.g., as part of operation 802). In operation block 854, the DSC 144 may determine that the register response timer expired before the DSC 144 received a DSC REGISTER RESPONSE message. In operation 856, the DSC 144 may resend the DSC REGISTER REQUEST message to the DPC 146 in response to determining that the timer expired before it received a corresponding DSC REGISTER RESPONSE message. In operation block 858, the DSC 144 may restart or reset the register response timer. In operation 860, the DPC may send a DSC REGISTER RESPONSE message to the DSC 144. In operation block 862, the DSC 144 may stop the register response timer in response to receiving the DSC REGISTER RESPONSE message.

Figure 9A:
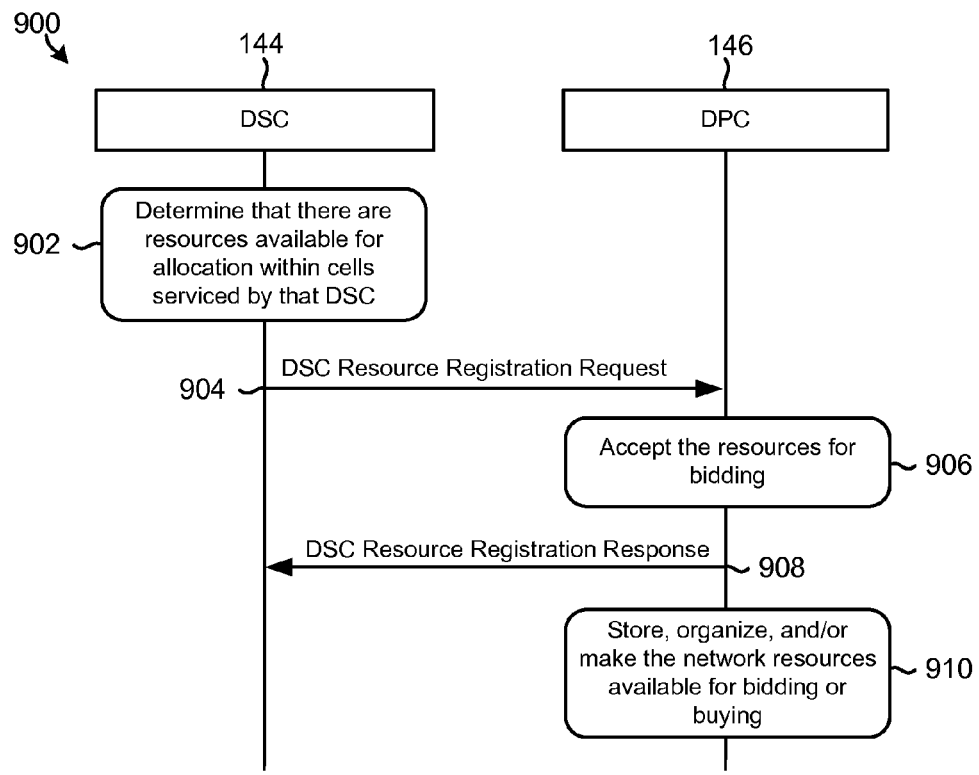
FIGS. 9A and 9B are message flow diagrams illustrating an embodiment DSAAP advertizing method.
Figure 9B:
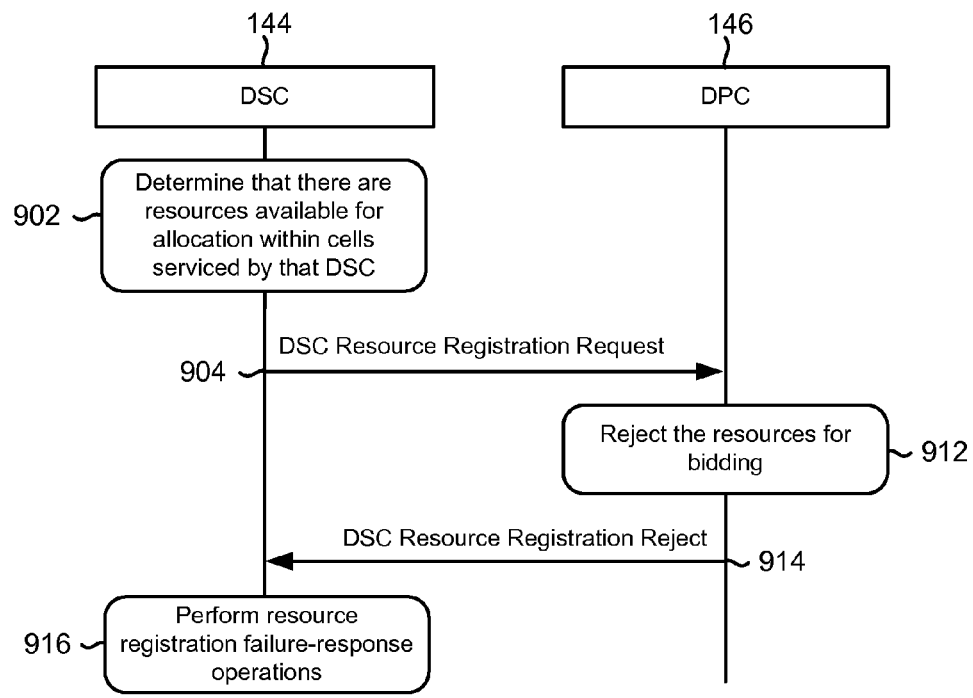

FIGS. 9A and 9B illustrate a DSAAP advertizing method 900 for advertizing resources that are available for bidding/buying so as to allow the DPC 146 to store, organize, and/or make those resources available for bidding/allocation via a financial brokerage platform. In the examples illustrated in FIGS. 9A and 9B, the DSAAP advertizing method 900 is performed by processing cores in a DPC 146 component and a DSC 144 component, each of which may include all or portions of a DSAAP module/component.

In operation block 902 illustrated in FIGS. 9A and 9B, the DSC 144 may determine that there are resources available for allocation within cells serviced by that DSC 144. In operation block 904, the DSC 144 may generate and send a DSC RESOURCE REGISTER REQUEST message to the DPC 146. In various embodiments, the DSC 144 may generate the DSC RESOURCE REGISTER REQUEST message to include any or all of a message type information element (IE), a message ID IE, a DSC identity IE, a DSC type IE, a PLMN-ID list IE, resource availability IE, resource availability start time IE, a data bandwidth IE, a list of grids IE, a bid or buy IE, a minimum bid amount IE, resource availability end time IE, a time of the day IE, a time duration IE, megabits per second (MBPS) IE, and a cell identity IE.

The DSC identity IE may include information that may be used by the DPC 146 to determine the identity of DSC 144. For example, the DSC identity IE may include a DSC pool ID, DSC instance information, and a PLMN ID of the network that the DSC is managing or representing. The DSC pool ID may be a unique identifier of a pool of available resources and/or may be the same as or similar to MME pool IDs and MME IDs in 3GPP EPC architecture.

The message ID IE may include a message identifier for the specific DSC RESOURCE REGISTER REQUEST message sent from the DSC 144. The DSC 144 and DPC 146 may be configured to use the message ID IE as a sequence number to identify and correlate DSC RESOURCE REGISTER REQUEST, DSC RESOURCE REGISTER ACCEPT and/or DSC RESOURCE REGISTER REJECT messages.

The resource availability IE may include information suitable for use by the DPC 146 in determining the PLMN ID of the network that is advertising resources for allocation and use by other networks. The DPC 146 may be configured to receive, store, and/or maintain resource availability IEs for multiple DSCs and/or for multiple different networks (i.e. different PLMN IDs). As such, each resource availability IE may include information suitable for identifying one or more of the networks that are advertising resources.

The time of the day IE may include information suitable for use by the DPC 146 in determining the time of the day that the DSC 144 transmitted the DSC RESOURCE REGISTER REQUEST message. The time duration IE may include information that is suitable for use in determining a time period during which the resources are to be made available for bidding or buying.

The data bandwidth IE may include information suitable for use in determining the available bandwidth (e.g., in MBPS) for the time duration specified in the optional time duration IE. The DPC 146 may determine that the bandwidth specified in the MBPS IE is to be made available until that bandwidth is consumed by the winning bidder or buyer in response to determining that the time duration IE is not included in the received DSC RESOURCE REGISTER REQUEST message (or in response to determining that the time duration IE does not include a valid value).

The list of grids IE may include information suitable for use in determining grid identifiers for the locations of the network bandwidth that is to be made available for bidding or buying. The cell identity IE may include information suitable for use in determining the individual cells within each grid (identified by grid ID and cell ID) that have available resources offered for bidding or buying as part of the offer in the DSC RESOURCE REGISTER REQUEST message. The minimum bid amount IE may include a monetary amount in a denomination or currency, such as in United States Dollars (USD).

In operation block 906 illustrated in FIG. 9A, the DPC 146 may accept the DSC's 144 resources for bidding. In operation 908, the DPC 146 may generate and send a DSC RESOURCE REGISTER RESPONSE or DSC RESOURCE REGISTER ACCEPT message to the DSC 144 to acknowledge that the resources were accepted. In various embodiments, the DPC 146 may generate the DSC RESOURCE REGISTER message to include any or all of a message type information element (IE), a bid ID IE, and a message ID IE. The message ID IE may include the same message identifier value that is included in the received DSC RESOURCE REGISTER REQUEST message. The DPC 146 and/or DSC may be configured to use the value of the message ID IE to identify and correlate the DSC RESOURCE REGISTER REQUEST and DSC RESOURCE REGISTER ACCEPT messages. In operation block 910, the DPC 146 may store, organize, and/or make the network resources available for bidding or buying via the financial brokerage platform.

In operation 912 illustrated in FIG. 9B, the DPC 146 may reject the DSC RESOURCE REGISTER REQUEST message and/or reject for bidding the resources identified in the received DSC RESOURCE REGISTER REQUEST message. The DPC 146 may reject the message/resources for a variety of reasons and/or in response to detecting any of a variety of events or conditions. For example, the DPC 146 may reject the resources in response to determining that the DPC 146 is not accepting resources from any operator, is not accepting resources for the specific operator identified in the received message, is not accepting the resources identified in the message, that the DPC is overloaded, that there is insufficient memory to store and service the resources available for bidding, etc. The DPC 146 may also reject the resource available message in response to determining that an administrator of the DPC 146 has disabled further bidding from the specific PLMN ID included in the DSC RESOURCE REGISTER REQUEST message, from all the networks (e.g., all the PLMN IDs), etc.

In operation 914 illustrated in FIG. 9B, the DPC 146 may generate and send a DSC RESOURCE REGISTER REJECT message to the DSC 144. In various embodiments, the DPC 146 may generate the DSC RESOURCE REGISTER REJECT message to include any or all of a message type information element (IE), a message ID IE, a cause IE, and a criticality diagnostics IE. The DPC 146 may also generate the DSC RESOURCE REGISTER REJECT message to include a message ID IE that includes a value that is the same as the message identifier included in the DSC RESOURCE REGISTER REQUEST message received from DSC 144. The DPC 146 and/or DSC 144 may be configured to use the value of the message ID IE to identify and correlate the DSC RESOURCE REGISTER REQUEST and DSC RESOURCE REGISTER REJECT messages.

In operation block 916, the DSC 144 may perform various resource registration failure response operations based on information included in the received DSC RESOURCE REGISTER REJECT message. For example, the DSC 144 may use the information included in the DSC RESOURCE REGISTER REJECT message to determine whether to reattempt resource registration with the DPC 146, attempt to register the resources with another DPC, reattempt the registration with different resources, or perform any of the other DSC operations discussed in this application.

Figure 10A:
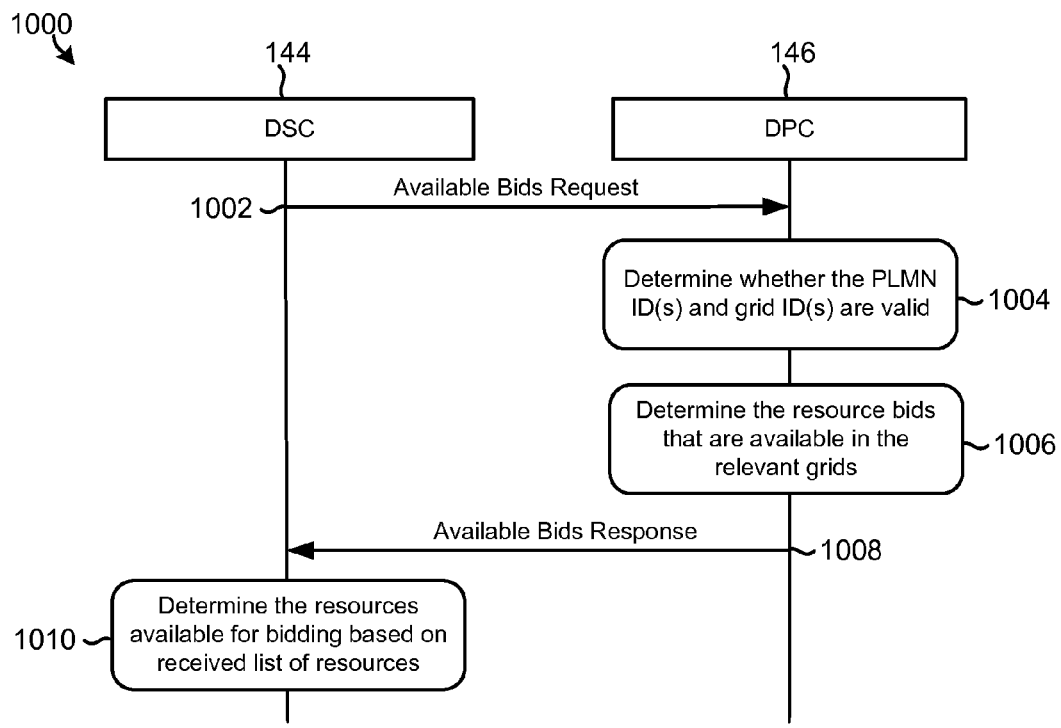
FIGS. 10A and 10B are message flow diagrams illustrating an embodiment DSAAP method for communicating a list of available resources.
Figure 10B:
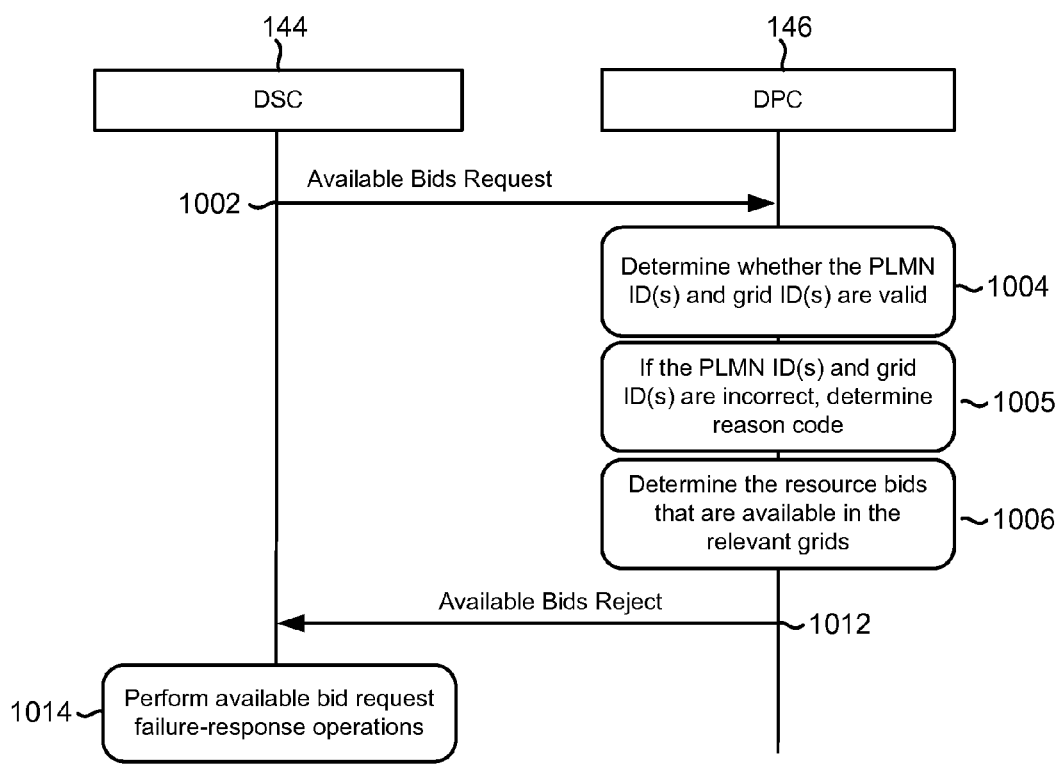

FIGS. 10A and 10B illustrate a DSAAP method 1000 for communicating a list of available resources in accordance with an embodiment. DSAAP method 1000 may be performed to inform lessee networks of the resource bids or resources that are available for bidding/buying. In the examples illustrated in FIGS. 10A and 10B, the DSAAP method 1000 is performed by processing cores in a DPC 146 component and a DSC 144 component, each of which may include all or portions of a DSAAP module/component. In an embodiment, a lessee DSC 144 may be configured to perform DSAAP method 1000 to retrieve/receive a list of available resources prior to that DSC 144 bidding on, or requesting to lease or purchase, resources from the DPC 146.

In operation 1002 illustrated in FIGS. 10A and 10B, a lessee DSC 144 may generate and send an AVAILABLE BIDS REQUEST message to the DPC 146 to request information on the resource bids that are available for allocation from lessor network(s) for bidding or buying. In various embodiments, the lessee DSC 144 may generate the AVAILABLE BIDS REQUEST message to include any or all of a sequence number information element (IE), a message type IE, a PLMN list IE that includes one or more PLMN ID IEs, a grid ID list IE that includes one or more Grid ID IEs.

In an embodiment, the lessee DSC 144 may be configured to request specific resources from a specific network by generating the AVAILABLE BIDS REQUEST message to include the PLMN ID of the desired network, which may be included in the PLMN ID IE of the PLMN list IE in the AVAILABLE BIDS REQUEST message.

In an embodiment, the lessee DSC 144 may be configured to request resources from any available network by not populating the PLMN list IE in the generated AVAILABLE BIDS REQUEST message and/or by generating the AVAILABLE BIDS REQUEST message to not include a PLMN list IE and/or PLMN ID value.

In an embodiment, the lessee DSC 144 may be configured to request resources from a specific grid within a lessor network by generating the AVAILABLE BIDS REQUEST message to include the grid IDs of the desired grids, which may be included in the grid ID IE of the grid ID list IE in the AVAILABLE BIDS REQUEST message.

In an embodiment, the lessee DSC 144 may be configured to request resources from any or all grids within a specified PLMN ID in PLMN ID IE grid by not populating the grid ID list IE in the generated AVAILABLE BIDS REQUEST message and/or by generating the AVAILABLE BIDS REQUEST message to not include a grid ID.

In operation block 1004 illustrated in FIGS. 10A and 10B, the DPC 146 may determine whether the PLMN ID(s) and grid ID(s) included in the received AVAILABLE BIDS REQUEST message are valid. If the PLMN ID(s) and grid ID(s) are incorrect, in operation block 1005, the DPC 146 may determine a reason code for the error/incorrect values. In operation block 1006, the DPC 146 may determine whether there are resources/bids available for each grid identified in the received AVAILABLE BIDS REQUEST message or for all the available grids (e.g., when the grid ID list IE in the received AVAILABLE BIDS REQUEST message not include valid values).

In operation 1008 illustrated in FIG. 10A, the DPC 146 may generate and send an AVAILABLE BIDS RESPONSE message to the DSC 144. The DPC 146 may be configured to generate the AVAILABLE BIDS RESPONSE message to include any or all of a message type information element (IE), a message ID IE, a DSC identity IE, a PLMN-ID grid cell bid info list IE, a sequence number IE, a PLMN list IE that includes one or more PLMN ID IEs, and a grid list IE. In an embodiment, the PLMN list IE and grid list IE may be included in the PLMN-ID grid cell bid info list IE. In an embodiment, the grid list IE may include one or more cell ID list IEs that include one or more cell ID IEs.

In various embodiments, the DPC 146 may generate the AVAILABLE BIDS RESPONSE message to also include any or all of an absolute radio-frequency channel number (ARFCN) IE, a channel bandwidth IE, a megabit or megabyte IE for identifying total available bandwidth, a MBPS IE for identifying the peak data rate for the resource, a resource available time IE, a resource expiration time IE, a bid/buy IE, a bid/buy expiry time IE, a minimum bid amount IE, and a buy price IE. The DPC 146 may generate the AVAILABLE BIDS RESPONSE message to include such information for each PMLN, each resource, each grid, and/or each cell identified in the message.

In an embodiment, the DPC 146 may be configured to generate the AVAILABLE BIDS RESPONSE message to include the list of PLMN ID, lists of grid ID(s) within each PLMN, and the available resources/bids within each grid in response to determining that there are bids for resources available for auction.

In an embodiment, the DPC 146 may be configured to generate the AVAILABLE BIDS RESPONSE message to include the message type and sequence number IEs (or valid values for these IEs) in response to determining that there no resources/bids for resources available for auction by that DPC 146 for the relevant networks/PLMN IDs. In an embodiment, the DPC 146 may be configured to generate the AVAILABLE BIDS RESPONSE message to include a sequence number IE having the same value as in the sequence number IE included in the received AVAILABLE BIDS REQUEST message. In an embodiment, the DSC 144 may be configured to use the sequence number IEs in these request and response messages to correlate the messages.

In an embodiment, the DPC 146 may be configured to generate the AVAILABLE BIDS RESPONSE message to include a PLMN list IE that includes a PLMN ID and grid ID list IE. The grid ID list IE may include a list of cells available for auction within the grid. The cell ID list IE may include a cell ID, and for each cell, the ARFCN, channel bandwidth, total available bandwidth, peak data rate allowed, the time of day (e.g., in UTC) when the resources are available and when they expire/end, whether it's a bid or buy type auction, minimum bid amount or buy price, bid expiry time (e.g., in UTC), and other similar information.

In operation block 1010, the DSC 144 may use the information included in the AVAILABLE BIDS RESPONSE message to identify the resources that are available for bidding, determine whether the DSC 144 will submit a bid for the available resources, determine the resources for which the DSC 144 will submit bids, and/or perform other similar operations.

With reference to FIG. 10B, in operation 1012, the DPC 146 may reject the AVAILABLE BIDS REQUEST message received from lessee DSC 144 by generating and sending a AVAILABLE BIDS REJECT message to the DSC 144. The DPC 146 may be configured to reject the AVAILABLE BIDS REQUEST message in response to determining (e.g., as part of operation 1004 or 1006) that one or more of the PLMN IDs supplied in the request message is not from any of the known networks, that one or more of the Grid IDs supplied in the request message is not valid with respect to the supplied PLMN ID, and/or that there are no resources/bids available in the relevant grids.

In an embodiment, the DPC 146 may be configured to generate the AVAILABLE BIDS REJECT message to include a message type information element (IE), a message ID IE, a cause IE, a criticality diagnostics IE, and a sequence number IE. The cause IE may include a reason code (e.g., Invalid PLMN ID, Invalid Grid ID, etc.) for the rejection of the available bids request, which may be determined in operation block 1005. The sequence number IE may include the same sequence number value that was included in the AVAILABLE BIDS REQUEST message received from lessee DSC 144. As such, the DPC 146 and/or DSC 144 may be configured to use sequence number IEs in the request and response messages to correlate those messages.

In operation block 1014, the DSC 144 may use the information included in the received AVAILABLE BIDS REJECT message to perform various failure-response operations. For example, the DSC 144 may determine whether to send another AVAILABLE BIDS REQUEST message to the DPC 146, determine whether to send another AVAILABLE BIDS REQUEST message to a different DPC, etc.

Figure 11A:
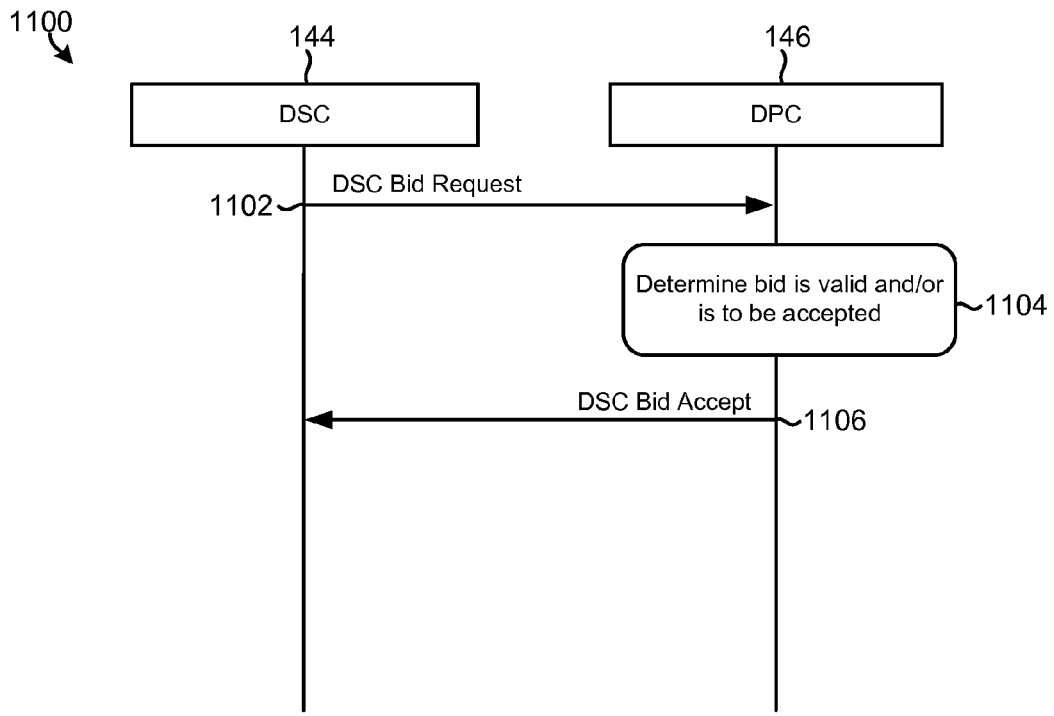
FIGS. 11A and 11B are message flow diagrams illustrating an embodiment DSAAP bidding method.
Figure 11B:
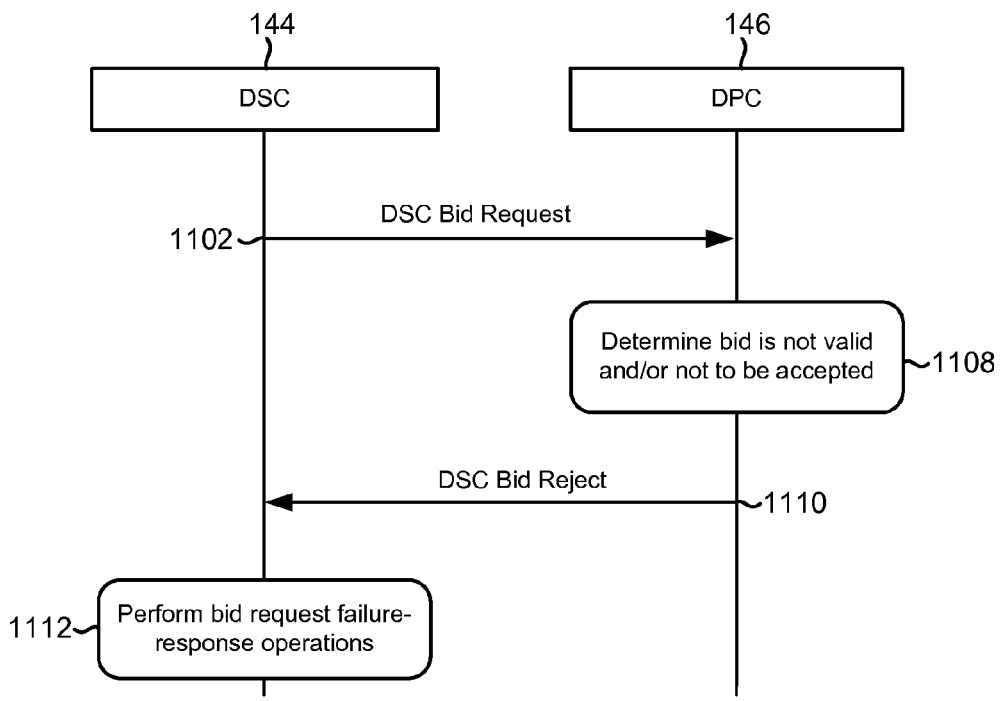

FIGS. 11A and 11B illustrate a DSAAP bidding method 1100 of bidding for DSC resources, which allows different lessee networks to bid for resources that are available from lessor networks. In the examples illustrated in FIGS. 11A and 11B, the DSAAP method 1100 is performed by processing cores in a DPC 146 component and a DSC 144 component, each of which may include all or portions of a DSAAP module/component.

In an embodiment, the DSC 144 and/or DPC 146 may be configured to perform DSAAP method 1100 after the DSC 144 retrieves the list of resources that are available for bidding (e.g., after performing DSAAP method 1000). In various embodiments, the DSC 144 and/or DPC 146 may be configured to perform DSAAP method 1100 continuously or repeatedly until the expiration of a bidding time. In an embodiment, the DPC 146 may be configured to select a winning bid (i.e., bid highest bid value) at the expiry of a bidding time.

In operation 1102 of method 1100 illustrated in FIGS. 11A and 11B, the lessee DSC 144 may generate and send a DSC BID REQUEST message to the DPC 146 to bid for one or more of the resource that are determined to be available from a lessor network, (i.e., one or more of resources included the list of resources obtained via the performance of method 1000). The lessee DSC 144 may be configured to generate the DSC BID REQUEST message to include any or all of a message type information element (IE), a message ID IE, a DSC identity IE, a DSC type IE, bid ID IE, a PLMN ID IE, and a bid amount IE. The bid ID IE may include information suitable for identifying a specific resource for which the lessee DSC 144 places a bid. The PLMN ID IE may include information suitable for use in identifying the PLMN ID of the network associated with the resources identified in the bid ID IE. The bid amount IE may include a monetary amount in a currency (e.g., USD), or the bid value.

In an embodiment, the lessee DSC 144 may be configured to generate the DSC BID REQUEST message to include a bid amount IE value that is greater than a minimum bid amount specified in a bid listing for the specific resource/bid ID. In an embodiment, the lessee DSC 144 may be configured to obtain the minimum bid amount and/or bid listing from the received AVAILABLE BIDS RESPONSE message (e.g., the message sent as part of operation 1008 illustrated in FIG. 10A).

In operation block 1104 illustrated in FIG. 11A, the DPC 146 may use the information included in the received DSC BID REQUEST message to determine whether the bid (resource bid) is valid and is to be accepted, such as by determining whether the bid complies with the policies and rules of the DSA system and the requirements of the lessor network. In operation 1106, the DPC 146 may generate and send DSC BID ACCEPT message to the DSC in response to determining that the bid is valid and/or is to be accepted. The DPC 146 may be configured to generate the DSC BID ACCEPT message to include any or all of a message type information element (IE), a message ID IE, a bid ID IE, and other information suitable for informing the DSC 144 that the bid has been determined to be valid and/or has been accepted.

It should be noted that, in the example discussed above, the DSC BID ACCEPT message informs the DSC 144 that the bid is valid/accepted, not that lessee DSC 144 has won the bid. The winning lessee DSC may be informed via DSC BID WON message when the DPC 146 determines that the bid time has expired and that lessee DSC is the highest bidder at the time of bid expiry. Similarly, the DPC 146 may inform lessee DSC(s) who participated in the bidding process but submitted losing bids that they did not submit a winning bid via a DSC BID LOST message. The DSC BID WON message and DSC BID LOST message are discussed in more detail further below.

With reference to FIG. 11B, in operation block 1108, the DPC 146 may use the information included in the received DSC BID REQUEST message to determine that the bid is not valid and is not to be accepted. For example, the DPC 146 may use the received information to determine that the bid does not comply with the policies/rules of the DSA system and/or does not comply with the requirements of the lessor network (e.g., does not meet the minimum asking price, etc.). As further examples, the DPC 146 may be configured to determine that the bid is not valid or is not to be accepted in response to determining that the bid amount specific in bid amount IE in the BID REQUEST message is not higher than the minimum bid, that the bid amount is not the highest among currently offered bids, that the bid id included in the bid ID IE is invalid, or that the bid/resource is no longer available for bidding (e.g., due to expiry, end of auction, bid withdrawn or invalid bid id).

In operation 1110, the DPC 146 may generate and send a DSC BID REJECT message to the DSC 144. The DPC 146 may be configured to generate the DSC BID REJECT message to include any or all of a message type information element (IE), a message ID IE, a bid ID IE, a cause IE, and a criticality diagnostics IE. The bid ID IE in the DSC BID REJECT message may include the same value as the bid identifier included in the received DSC BID REQUEST message. The cause IE may include a reason code identifying a reason for the rejection of the bid (e.g., minimum bid not met, outbid, bid not found, etc.). In operation block 1112, the DSC 144 may use information included in the received DSC BID REJECT message to perform various bid request failure-response operations, such as operations to determine whether to rebid for the resources, to generate a new DSC BID REQUEST message that includes a valid bid ID, etc.

FIGS. 12A through 12D illustrate a DSAAP notification method 1200 of informing participating networks of the results of the bidding operations. That is, DSAAP notification method 1200 may be performed to inform DSCs 144 of a result of an auction (e.g., that they submitted a winning bid, that they have been outbid, that they submitted a losing bid, that the auction was cancelled, etc.). In the examples illustrated in FIGS. 12A-12D, the DSAAP notification method 1200 is performed by processing cores in a DPC 146 component and a DSC 144 component, each of which may include all or portions of a DSAAP module/component.

DSAAP notification method 1200 may be performed after the DPC 146 notifies the DSC 144 that the bid has been accepted (e.g., after operation 1106 illustrated in FIG. 11). The DSAAP notification method 1200 also may be performed after the expiry of a bidding time and/or in response to the DPC 146 detecting an event or condition (e.g., new bid received, outbid, etc.).

Figure 12A:
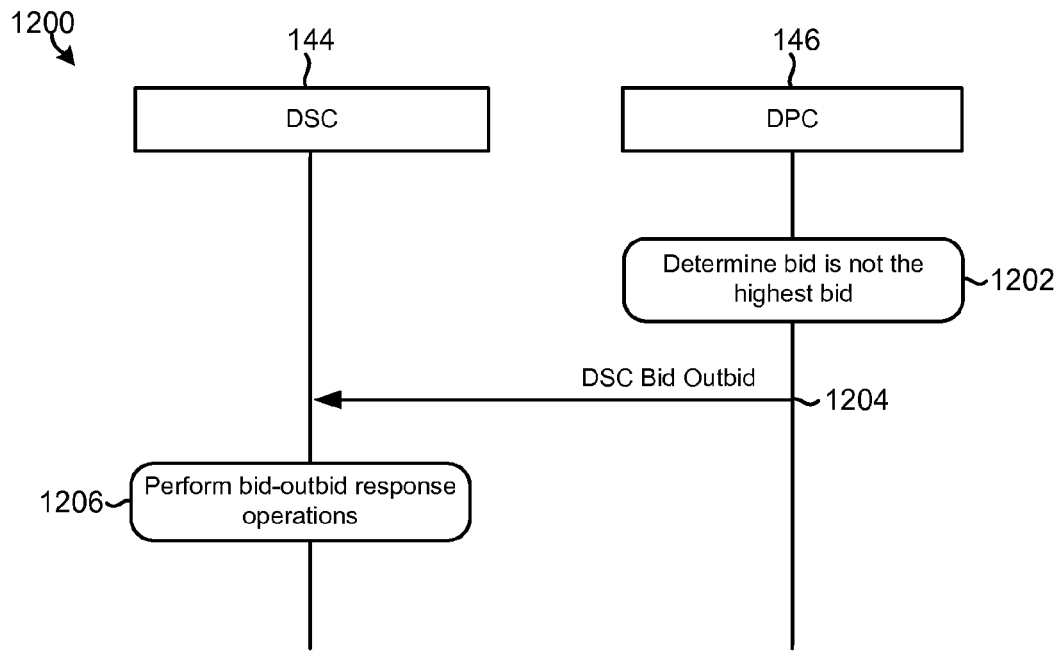
FIGS. 12A through 12D are message flow diagrams illustrating an embodiment DSAAP notification method for informing participating networks of the results of the bidding operations.

In operation block 1202 illustrated in FIG. 12A, the DPC 146 may determine that the bid amount specific in bid amount IE in the last, latest, or most current BID REQUEST message accepted from the DSC 144 is not the highest among the current bids. In operation 1204, the DPC 146 may generate and send a DSC BID OUTBID message to the DSC 144 to inform the lessee DSC 144 that its earlier bid was outbid by a higher bid from another lessee DSC and/or that their earlier bid is no longer valid. In various embodiments, the DPC 146 may generate the DSC BID OUTBID message to include any or all of a message type information element (IE), a message ID IE, a cause IE, a bid info IE, a criticality diagnostics IE, a DSC ID IE and a BID ID IE.

The DSC ID IE may include information that is suitable for use in identifying the specific lessee DSC 144. The BID ID IE may include a bid ID suitable for use in identifying the submitted bid that has been outbid. In operation block 1206, the lessee DSC 144 may perform various bid-outbid failure-response operations, such as by determining whether to submit a higher bid for the resources to that DPC 146, to submit a bid to a different DPC 146, to drop existing calls to free bandwidth, etc.

Figure 12B:
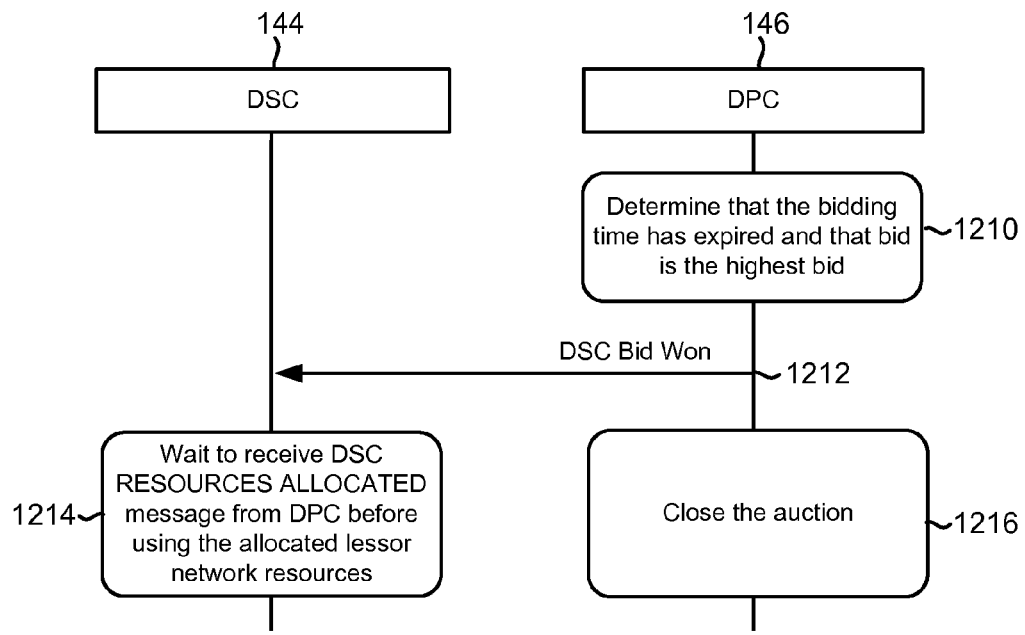

With reference to FIG. 12B, in operation block 1210, the DPC 146 may determine that the bidding time has expired and that the bid amount specific in bid amount IE in the last, latest, or most current BID REQUEST message accepted from the DSC 144 is the highest among the current bids. In operation 1212, the DPC 146 may generate and send a DSC BID WON message to the DSC 144 to inform the lessee DSC 144 that their earlier bid is the winning bid. In various embodiments, the DPC 146 may generate the DSC BID WON message to include any or all of a message type information element (IE), a message ID IE, a bid ID IE, a bid info IE, a DSC ID IE, and original bid details such as bandwidth, MBPS, duration and the winning bid amount, etc. The DSC ID IE may include information that is suitable for use in identifying the specific lessee DSC 144. The bid ID IE may include a bid identifier suitable for identifying the bid that won the resource auction/bidding operations.

In operation block 1214, the winning lessee DSC 144 may wait to receive DSC RESOURCES ALLOCATED message from the DPC 146 before scheduling its network equipment and device (e.g., wireless devices) to start using the resources and/or for the resources to be made available for use (i.e. scheduling for the time of day when the resources will be ready for use by the winning lessee network). In operation block 1216, the DPC 146 may close the auction, such as by rejecting further bids from other networks for the resources won by the bid submitted by lessee DSC 144.

Figure 12C:
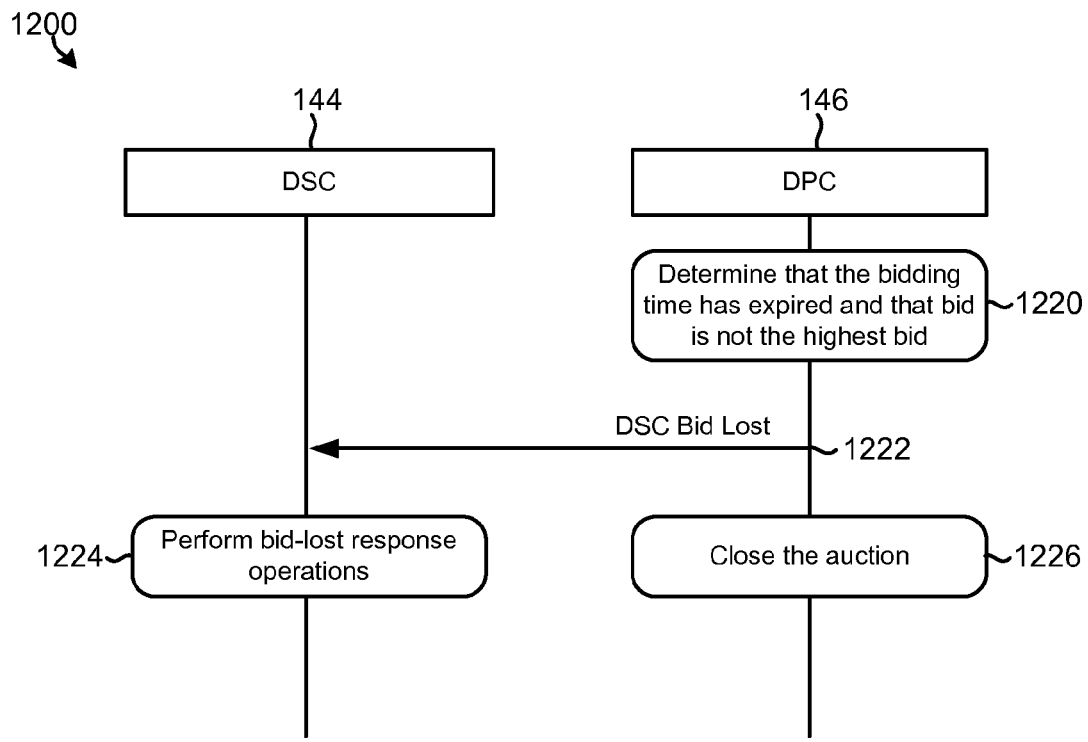

With reference to FIG. 12C, in operation block 1220, the DPC 146 may determine that the bidding time has expired and that the bid amount specific in bid amount IE in the last, latest, or most current BID REQUEST message accepted from the DSC 144 is not the highest among the current bids. In operation 1222, the DPC 146 may generate and send a DSC BID LOST message to the DSC 144 to inform the lessee DSC 144 that its earlier bid has not won the bid and the auction/bid is closed due to another lessee DSC winning the auction. In various embodiments, the DPC 146 may generate the DSC BID LOST message to include any or all of a message type information element (IE), a message ID IE, a bid ID IE, and a DSC ID IE. The DSC ID IE may include information that is suitable for use in identifying the specific lessee DSC 144 that submitted the losing bid and/or to which the DSC BID LOST message is sent. The bid ID IE may include a bid identifier suitable for use in identifying the submitted bid.

In operation block 1224, the lessee DSC 144 may perform various failure response operations, such as determining whether to submit a bid to for other available resources, whether to drop existing calls to free up resources, etc. In operation block 1226, the DPC 146 may close the auction and/or allow the losing lessee DSCs to bid for other available resources.

Figure 12D:
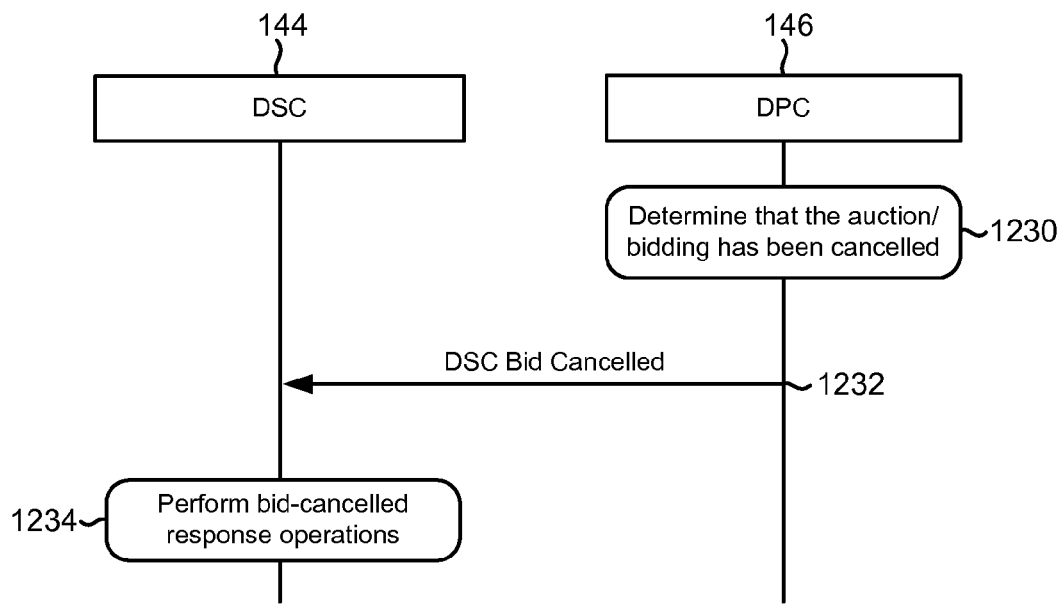

With reference to FIG. 12D, in operation block 1230, the DPC 146 may determine that the auction for a network resource that the DSC 144 previously submitted a bid has been cancelled. For example, the DPC 146 may determine that the auction has been withdrawn by lessor network operator or that the auction has been cancelled by DPC operator for administrative reasons. In operation 1232, the DPC 146 may generate and send a DSC BID CANCELLED message to the DSC 144 to inform the lessee DSC 144 that the auction has been cancelled. In various embodiments, the DPC 146 may generate the DSC BID CANCELLED message to include any or all of a message type information element (IE), a message ID IE, a bid ID IE, a DSC ID IE, and a cause IE. The DSC ID IE may include information that is suitable for use in identifying the specific lessee DSC 144. The bid ID IE may include a bid identifier suitable for use in identifying the resource/bid for which the auction has been cancelled. The cause IE may include a reason code for the bid's cancellation (e.g., auction withdrawn, auction cancelled, etc.). In operation block 1234, the lessee DSC 144 may perform various failure-response operations, such as by determining whether to submit a bid to a different DPC 146, to drop calls, etc.

Figure 13A:
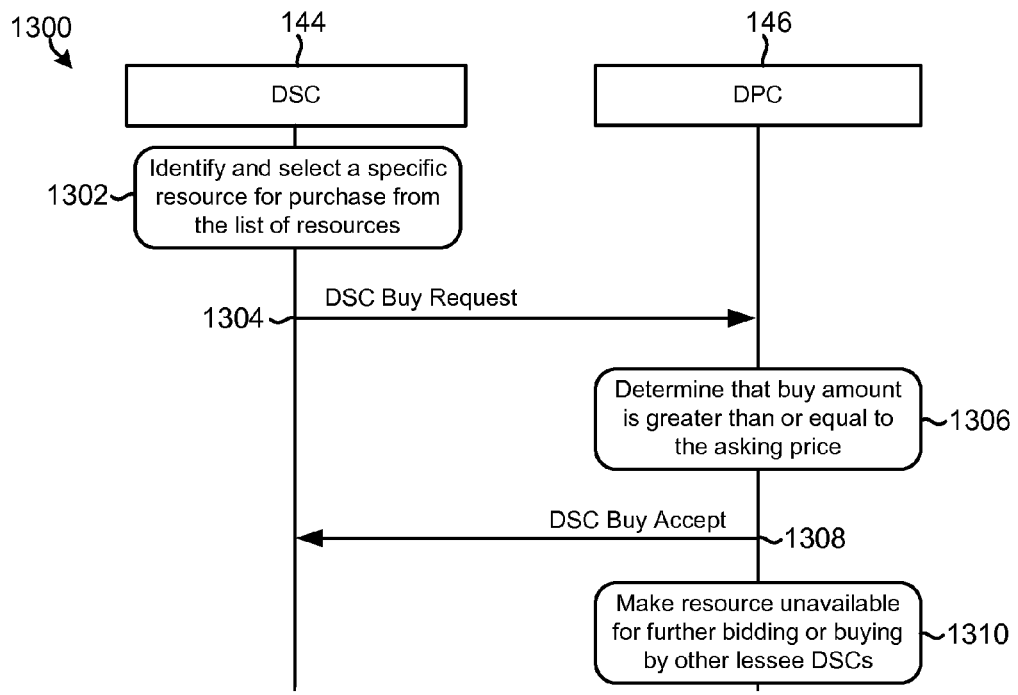
FIGS. 13A and 13B are message flow diagrams illustrating an embodiment DSAAP purchase method for immediately (or near immediately) purchasing a resource.
Figure 13B:
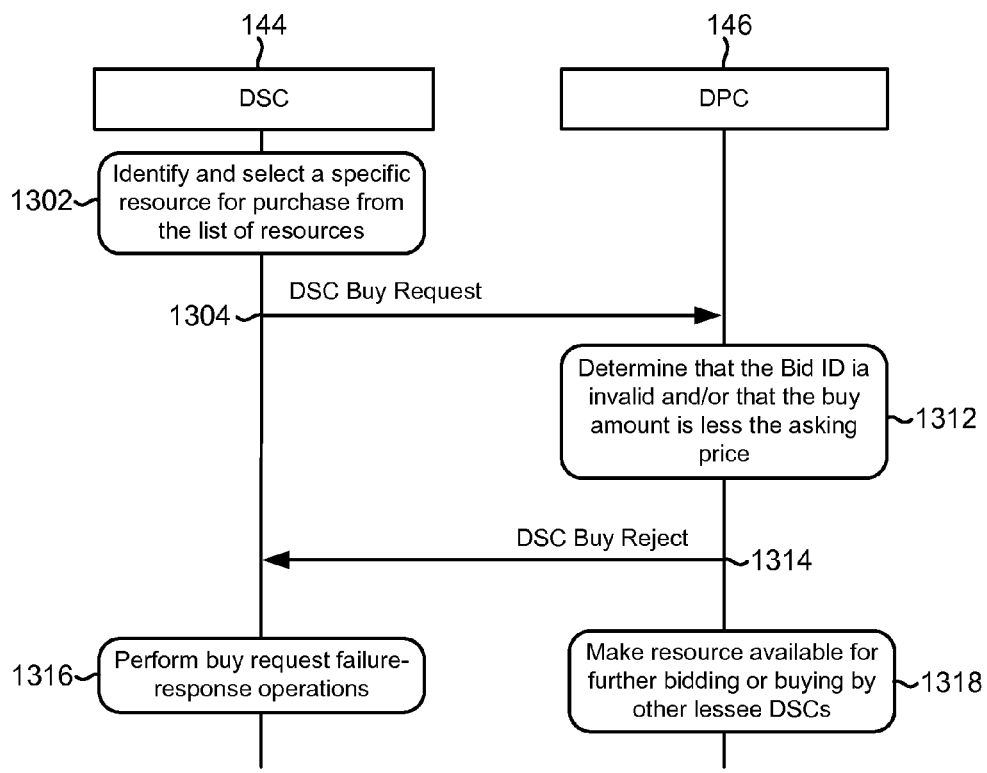

FIGS. 13A and 13B illustrate a DSAAP purchase method 1300 of allowing a lessee network to make an immediate (or near immediate) purchase and/or claim of use for a resource that is made available for allocation by a lessor network. In the examples illustrated in FIGS. 13A and 13B, the DSAAP purchasing method 1300 is performed by processing cores in a DPC 146 component and a DSC 144 component, each of which may include all or portions of a DSAAP module/component. In an embodiment, the DSC 144 and DPC 146 may be configured to perform DSAAP method 1300 after the DSC 144 retrieves/receives a list of resources that are available for purchase (e.g., after performing DSAAP method 1000 discussed above with reference to FIG. 10).

In operation block 1302 illustrated in FIGS. 13A and 13B, the lessee DSC 144 may identify and select a specific resource for immediate purchase from the list of resources (e.g., list of resources obtained from performing DSAAP method 1000 discussed above). In various the embodiments, the lessee DSC 144 may select a resource that is scheduled for bidding, that is currently being auctioned, that is only made available for immediate purchase, etc. In operation 1304, the DSC 144 may generate and send DSC BUY REQUEST message to the DPC 146 to request to buy the identified/selected resources from a lessor network.

In various embodiments, the DSC 144 may generate the DSC BUY REQUEST message to include any or all of a message type information element (IE), a message ID IE, a DSC identity IE, a DSC type IE, a bid ID IE, a buy amount IE, and a PLMN ID IE. The PLMN ID IE may include information suitable for use in identifying the PLMN ID of the network associated with the bid, which may identified via the bid ID IE. The buy amount IE may include the amount (e.g., in USD) of the bid (i.e., bid value) submitted by the lessee DSC 144.

In an embodiment, the DSC 144 may be configured to generate the DSC BUY REQUEST message to include a buy amount value that is equal to an amount identified via a buy amount IE in a listing for the bid ID included in a received AVAILABLE BIDS RESPONSE message (which is discussed above with reference to FIG. 10).

In operation block 1306 illustrated in FIG. 13A, the DPC 146 may use the information included in the received DSC BUY REQUEST message to identify the requested resource, the network associated with the request resource, whether the requested resource is currently being auctioned, whether the requested resource has been made available for immediate purchase, a minimum purchase amount requested for the immediate purchase of that resource, and/or whether the buy amount included in the received DSC BUY REQUEST message is equal to (or greater than) the requested purchase amount. In the example illustrated in FIG. 13A, as part of operation block 1306, the DPC 146 determines that the buy amount included in the received DSC BUY REQUEST message is greater than or equal to the requested purchase amount.

In operation 1308, the DPC 146 may generate and send a DSC BUY ACCEPT message to the DSC 144 to inform the lessee DSC 144 that it has successfully purchased/leased the resource for use. In various embodiments, the DPC 146 may generate the DSC BUY ACCEPT message to include any or all of a message type information element (IE), a message ID IE, and a bid ID IE. In operation block 1310, the DPC 146 may terminate, stop, or close an active auction for that resource and/or perform similar operations so that the resource is no longer available for bidding or buying by other lessee DSCs.

With reference to FIG. 13B, in operation block 1312, the DPC 146 may use the information included in the received DSC BUY REQUEST message (e.g., as part of operation 1304) to determine that the bid (buy request) is to be rejected. For example, the DPC 146 may determine that the buy amount specific in buy amount IE in the received DSC BUY REQUEST message is less than the requested purchase amount. As another example, the DPC 146 may determine that the bid ID value included in the bid ID IE is invalid, or that the resource/bid is no longer available for bidding (due to expiry, end of auction, bid withdrawn, invalid bid ID, etc.).

In operation 1314, the DPC 146 may generate and send a DSC BUY REJECT message to the DSC 144. In various embodiments, the DPC 146 may generate the DSC BUY REJECT message to include any or all of a message type information element (IE), a message ID IE, a bid ID IE and a cause IE. The value of the bid ID IE may be the same as the bid identifier included in the DSC BUY REQUEST message received as part of operation 1304. The cause IE may include a reason code for the rejection of the buy request (e.g., requested purchase price not met, bid not found, etc.). In operation block 1316, the DSC 1316 may perform various failure-response operations, such as determining whether to submit a new purchase request with a higher bid amount. In operation block 1318, the DPC 146 perform various operations so to make that resource available for bidding or buying by other lessee DSCs.

Figure 14A:
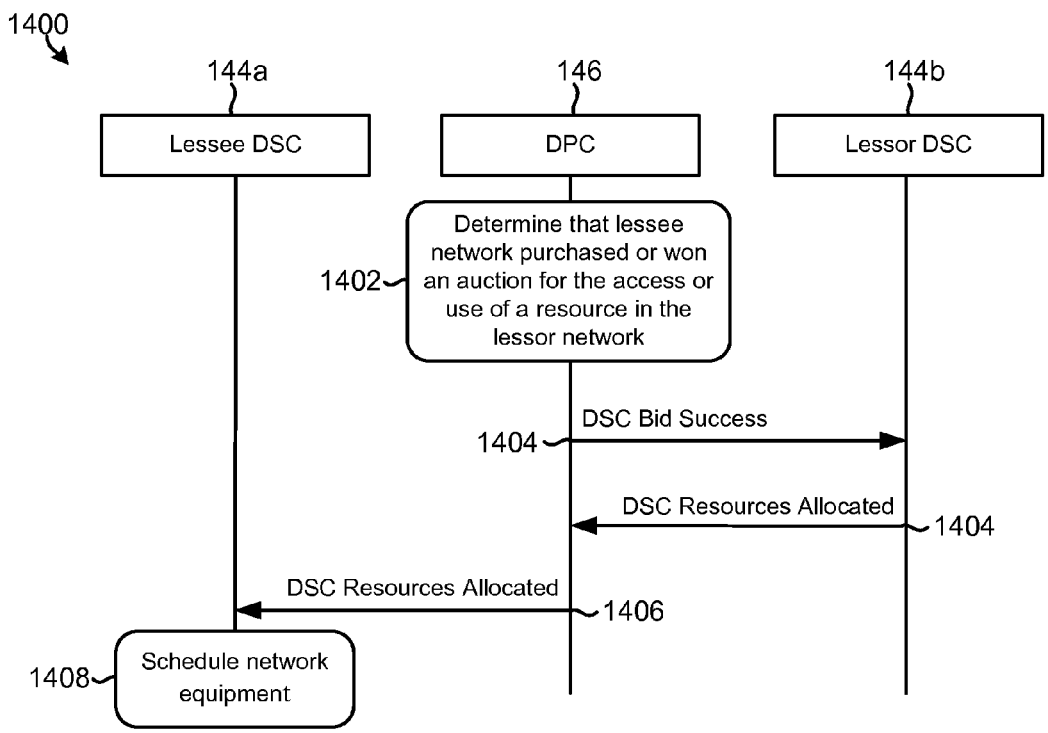
FIGS. 14A and 14B are message flow diagrams illustrating an embodiment DSAAP allocation method for allocating resources in a lessor network for access and use by components in a lessee network.
Figure 14B:
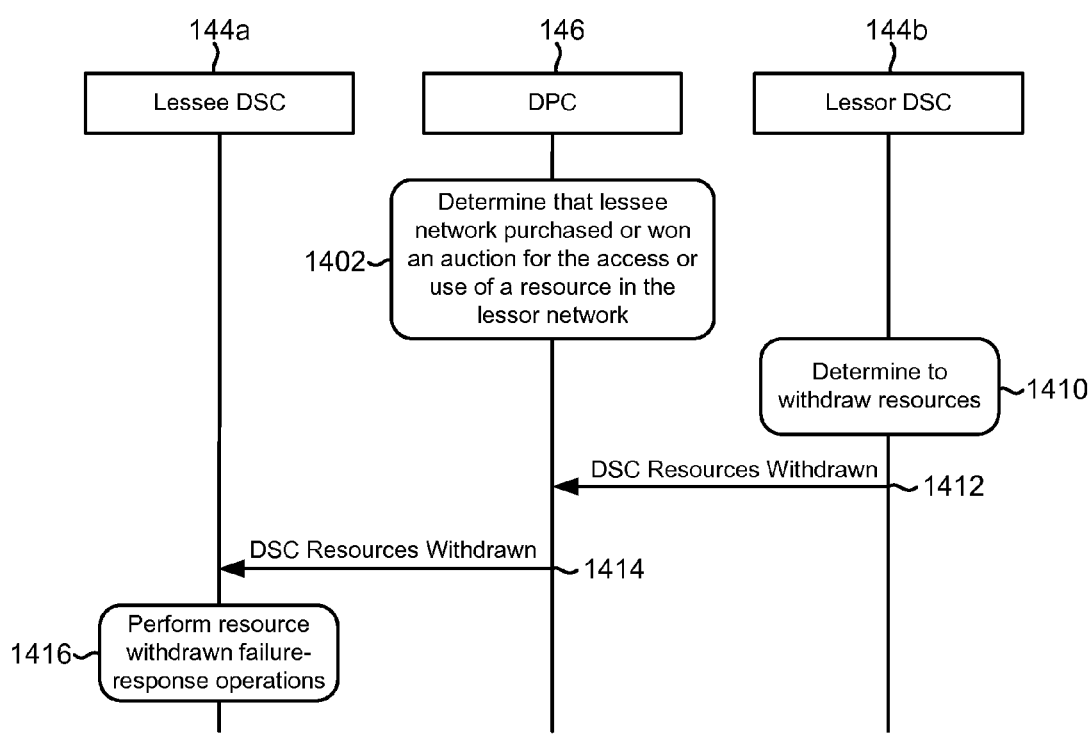

FIGS. 14A and 14B illustrate a DSAAP resource allocation method 1400 of allocating resources in a lessor network for access and use by components in a lessee network. In the examples illustrated in FIGS. 14A and 14B, the DSAAP resource allocation method 1400 is performed by processing cores in a DPC 146 component, a lessee DSC 144a component, and a lessor DSC 144b component, each of which may include all or portions of a DSAAP module/component.

In operation block 1402 illustrated in FIGS. 14A and 14B, the DPC 146 may determine that the lessee DSC 144a has successfully purchased or won an auction for a resource in a lessor network represented by the lessor DSC 144b. In operation 1404 illustrated in FIG. 14A, the DPC 146 may generate and send a DSC BID SUCCESS message to the lessor DSC 144b to inform the lessor network that one or more of its allocated resources/bids has been won by the lessee DSC 144a.

In various embodiments, the DPC 146 may generate the DSC BID SUCCESS message to include any or all of a message type information element (IE), a message ID IE, a cause IE, and a criticality diagnostics IE. In a further embodiment, the DPC 146 may be configured to generate the DSC BID SUCCESS message to also include any or all of a bid ID IE, a DSC ID IE, and a bid value IE. These additional information elements may be used to communicate information regarding the winning bid. For example, the bid ID IE may include a bid ID that corresponds to the bid that successfully participated in and won the auction for the resources. The DSC ID IE may include the DSC ID of the auction winner (i.e., the lessee DSC 144a). The bid value IE may include the winning bid amount and/or the purchase price of the resources.

In operation 1404, the lessor DSC 144b may generate and send DSC RESOURCES ALLOCATED message to the DPC 146 to allocate/commit the resources for access and use by components in the lessee network. The lessor DSC 144b may be configured to generate DSC RESOURCES ALLOCATED message to include any or all of a message type information element (IE), a message ID IE, a bid iD, a PLMN-ID Grid ID Cell ID list IE, a PLMN ID IE, a grid ID IE, list of cell IDs IE, and various auction/resource details (e.g., bandwidth, MBPS, duration, etc.). In an embodiment, the PLMN ID IE, a grid ID IE, and list of cell IDs IE may be included in the PLMN-ID Grid ID Cell ID list IE. The PLMN ID IE may include the PLMN ID of the lessor network allocating the resources, which may be the same PLMN ID/network identified in the winning bid. The grid ID IE and list of cell IDs IE may include information suitable for identifying the grid/cells associated with the resources. These values may be the same as the grid/cell values included in the winning bid.

In operation 1406, the DPC 146 may forward the received DSC RESOURCES ALLOCATED message to the winning lessee DSC 144a to enable the lessee DSC 144a to start using the allocated resources of lessor network resources. In operation block 1408, the lessee DSC 144a may schedule its network equipment to start using lessor network resources from the time of day specified as part of the bid and/or included in the received DSC RESOURCES ALLOCATED message.

With reference to FIG. 14B, in operation block 1410, the lessor DSC 144b may determine that the resources submitted for auction should be withdrawn and/or to forego allocating the submitted resources to a winner of the auction. The lessor DSC 144b may determine to withdraw the resources after the DPC 146 determines that lessee network purchased or won an auction for those resources and/or for any of a variety of reasons (e.g., unforeseen or administrative reasons, etc.).

In operation 1412, the lessor DSC 144b may generate and send a DSC RESOURCES WITHDRAWN message to the DPC 146 to withdraw the resources. The lessor DSC 144b may generate the DSC RESOURCES WITHDRAWN message to include any or all of a message type information element (IE), a message ID IE, a bid ID IE, a cause IE, and a PLMN-ID Grid ID Cell ID list IE. The bid ID IE may include information that is suitable for use in identifying the bid. The cause IE may include a reason code that describes the reason for withdrawal of resource allocations (e.g., resources not available, resources withdrawn, administrative, etc.).

In operation 1414, the DPC 146 may forward the received DSC RESOURCES WITHDRAWN message to the lessee DSC 144a, which may have submitted a winning bid for the withdrawn resources. In operation block 1416, the lessee DSC 144a may perform various failure-response operations, such as determining whether to participate in another auction, whether to bid on a different resource, determining whether to drop calls to free up resources, etc.

Figure 15A:
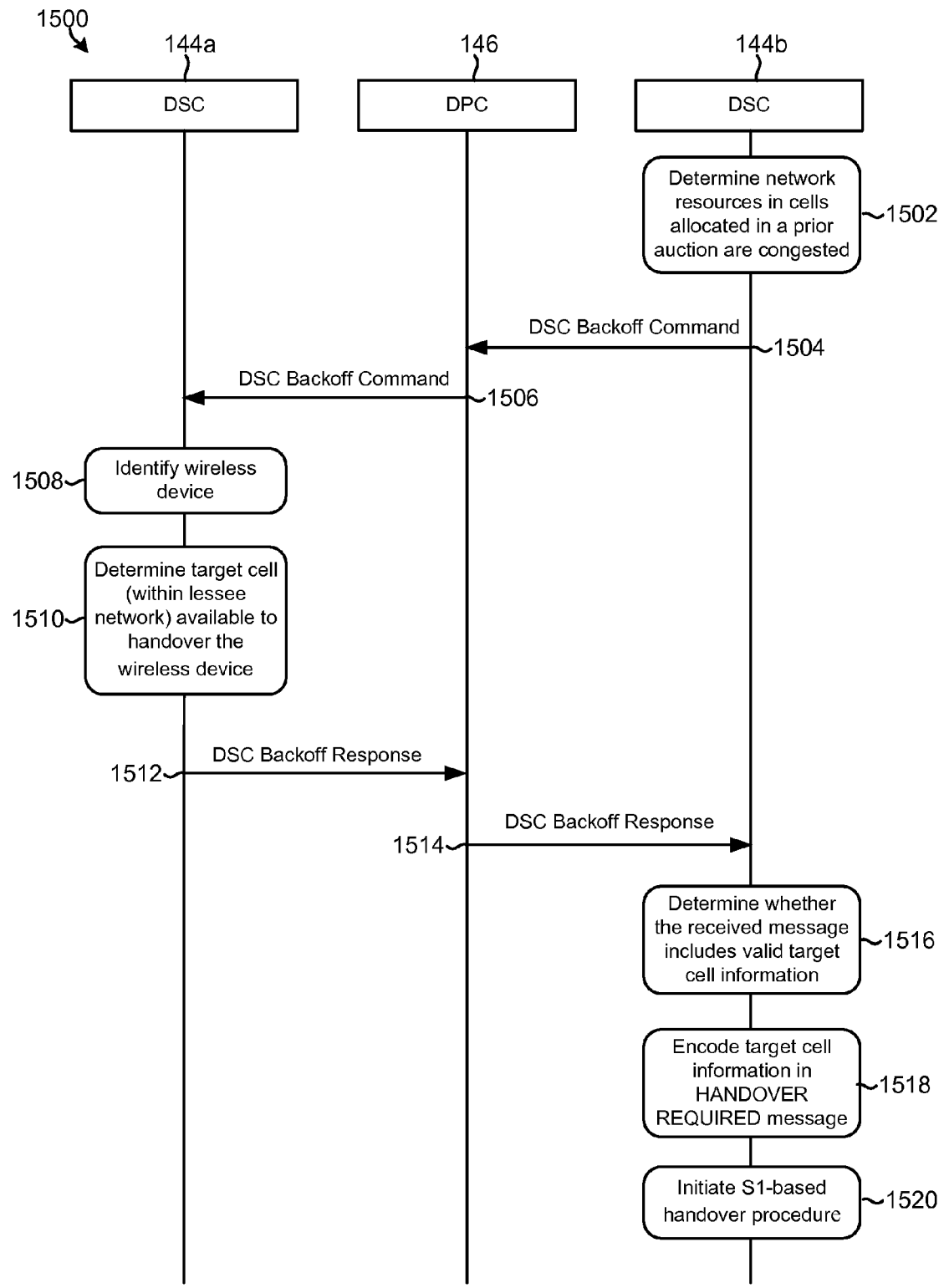
FIGS. 15A and 15B are message flow diagrams illustrating an embodiment DSAAP backoff method of selectively handing over a wireless device from a lessor network back to the lessee's network (i.e. its home PLMN).
Figure 15B:
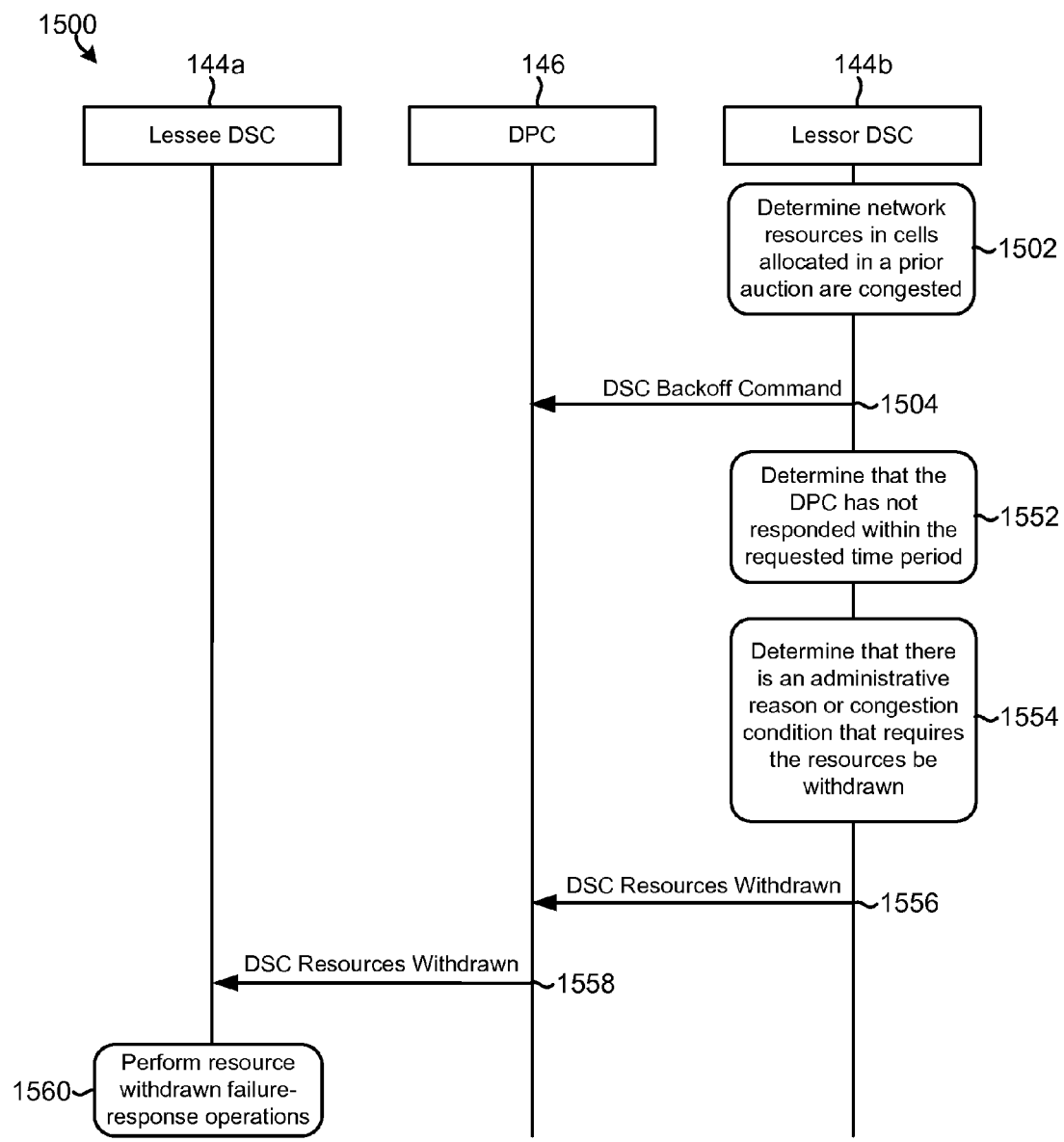

FIGS. 15A and 15B illustrate an embodiment DSAAP backoff method 1500 of selectively handing over a wireless device from a lessor network back to the lessee's network to which the wireless device subscribes (i.e. its home PLMN). In the examples illustrated in FIGS. 15A and 15B, the DSAAP backoff method 1500 is performed by processing cores in a DPC 146 component, a lessee DSC 144a component, and a lessor DSC 144b component, each of which may include all or portions of a DSAAP module/component.

In operation block 1502 illustrated in FIGS. 15A and 15B, the lessor DSC 144b may determine that its network resources from the cells that are part of a prior auction are in congestion. That is, the lessor DSC 144b may determine that it requires access or use of its allocated resources. In operation 1504, the lessor DSC 144b may generate and send a DSC BACKOFF COMMAND message to the DPC 146 to selectively handover wireless device(s) that are using the allocated resources of the lessor network back to the lessee network (i.e. its home PLMN).

The lessor DSC 144b may be configured to generate the DSC BACKOFF COMMAND message to include any or all of a message type information element (IE), a message ID IE, a bid ID IE, a UE identity IE, a measurement report IE, handoff cell information IE, a cause IE, and a DSC backoff response timer IE.

The UE identity IE may include information suitable for use in determining identity related information for the wireless device (or UE), such as the international mobile subscriber identity (IMSI) of the wireless device or its network.

The measurement report IE may include the latest, last, or most recent measurement report E-UTRAN RRC message received by the lessor network for the identified wireless device (i.e., the wireless devices that are requested to backoff to lessee network).

The bid ID IE may include a bid ID value corresponding to the bid that successfully participated in and completed/won the auction. The bid ID may be used to identify the auction/contract associated with the backoff operations (i.e., the auction/contract for which the resources were allocated).

In an embodiment, the lessor DSC 144b may be configured to determine whether there are multiple bid IDs that correspond to a congested cell. In an embodiment, the lessor DSC 144b may be configured to select the bid ID value from a plurality of bid IDs in response to determining that there are multiple bid IDs that correspond to a congested cell. In various embodiments, the lessor DSC 144b may be configured to select the bid ID value based on an operator policy provisioned at the lessor DSC 144b, based on a previous agreement, based on a policy/rule previously negotiated by lessor and lessee network operators, etc.

In operation 1506, the DPC 146 may forward the received DSC BACKOFF COMMAND message to the lessee DSC 144a. In operation block 1508, the lessee DSC 144a may use the information in the UE identity IE of the received DSC BACKOFF COMMAND message identify wireless device(s) that are to be subjected to the backoff operations (i.e., the wireless devices that are to be handed back).

In operation block 1510, the lessee DSC 144a may use the information included in the measurement report IE of the received DSC BACKOFF COMMAND message to determine, identify, and/or select a target cell (within lessee network) to which the identified wireless device(s) are to be handed over (the lessor network may have previously enabled measurement reporting from the wireless devices, such as when they attached, or were handed over, to the lessor network.)

In operation 1512, the lessee DSC 144a may generate and send a DSC BACKOFF RESPONSE message to the DPC 146. The lessee DSC 144a may be configured to generate the DSC BACKOFF RESPONSE message to include any or all of a message type information element (IE), a message ID IE, a bid ID IE, a UE identity IE, a handoff cell information IE, and a cause IE. In an embodiment, the lessee DSC 144a may be configured to generate the DSC BACKOFF RESPONSE message to include the cause IE (or a value for the cause IE) in response to determining that a suitable target cell (within lessee network) could not be identified or selected for the handed over. The value of the cause IE may identify a cause of the failure, such as network overload, no appropriate target cell found, or unknown wireless device/UE. In an embodiment, the lessee DSC 144a may be configured to generate the DSC BACKOFF RESPONSE message to include a value (e.g., target cell information) for the handoff cell information IE in response to successfully identifying a target cell (within lessee network) to which the wireless device may be handed over.

In operation 1514, the DPC 146 may identify the lessor DSC 144a based on the bid id IE included in the received DSC BACKOFF RESPONSE message, and forward the received DSC BACKOFF RESPONSE message to the lessor DSC 144b. In operation block 1516, the lessor DSC 144b may determine whether the received DSC BACKOFF RESPONSE message includes a handoff cell information IE (or a valid value for the handoff cell information IE). In response to determining that the received DSC BACKOFF RESPONSE message includes a handoff cell information IE (or a valid value for the handoff cell information IE), in operation block 1518, the lessor DSC 144b may use the target cell information included in the handoff cell information IE to encode a HANDOVER REQUIRED message. In operation block 1520, the lessor DSC 144b may and initiate 51 based handover procedure to handover the wireless device from lessor network to lessee network.

With reference to FIG. 15B, in operation block 1552, the lessor DSC 144b may determine that the DPC 146 has not responded to the DSC BACKOFF COMMAND message (sent as part of operation 1504) within a time period identified in the DSC backoff response timer IE included in the DSC BACKOFF COMMAND message. Alternatively or additionally, in operation block 1554, the lessor DSC 144b may determine that there is significant or severe network congestion or administrative reasons that require withdraw of the allocation of all remaining network resources pertaining to the resources/bid id included or identified in the DSC BACKOFF COMMAND message.

In operation 1556, the lessor DSC 144b may generate and send a DSC RESOURCES WITHDRAWN message to the DPC 146. In operation 1558, the DPC 146 may forward the received DSC RESOURCES WITHDRAWN message to the lessee DSC 144*a* to withdraw the allocation of the remaining network resources. In operation block 1560, the lessee DSC 144*a* may perform various resource withdrawn failure-response operations, such as dropping calls, determining whether to bid for new resources, etc.

Figure 16A:
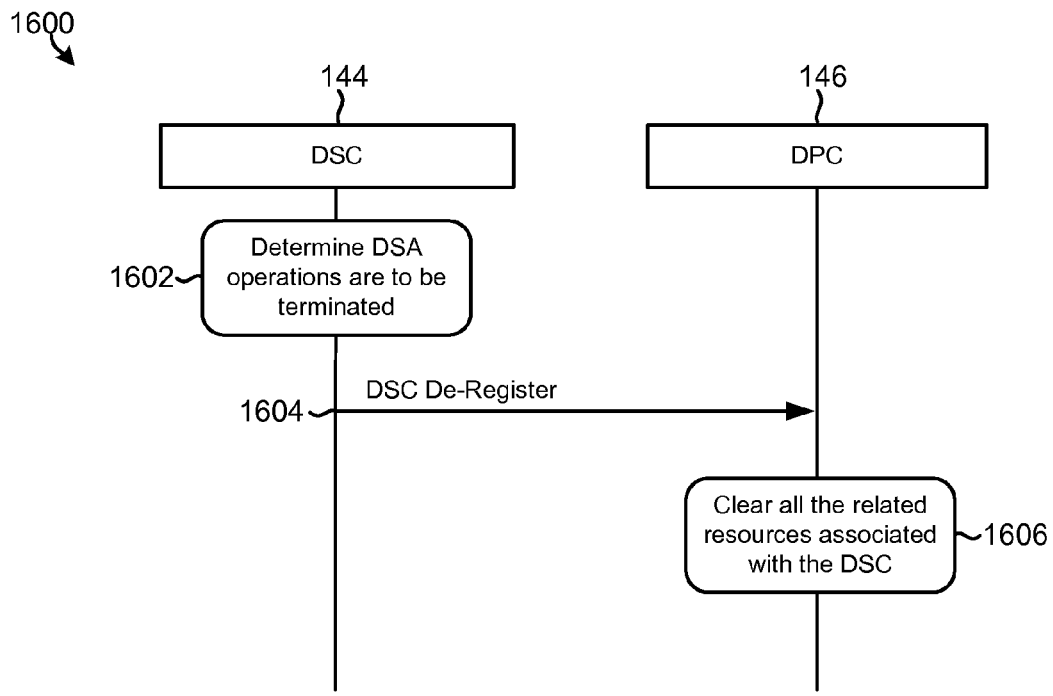
FIG. 16A is a message flow diagram illustrating an embodiment DSC initiated DSAAP de-registration method for terminating DSA operations.

FIG. 16A illustrates an embodiment DSC initiated DSAAP de-registration method 1600 for terminating operations. In the example illustrated in FIG. 16A, the DSC initiated DSAAP de-registration method 1600 is performed by processing cores in a DPC 146 component and a DSC 144 component, each of which may include all or portions of a DSAAP module/component.

In operation block 1602, the DSC 144 may determine that it needs to terminate DSA operations. In operation 1604, the DSC 144 may generate and send a DSC DE-REGISTER message to the DPC 146. The DSC 144 may be configured to generate the DSC DE-REGISTER message to include any or all of a message type information element (IE), a message ID IE, a backoff timer IE, and a cause IE that identifies a cause for the termination of operations. In operation block 1606, the DPC 146 may clear all the related resources associated with the DSC 144 and/or perform other similar operations to de-register the DSC 144 in response to receiving the DSC DE-REGISTER message.

Figure 16B:
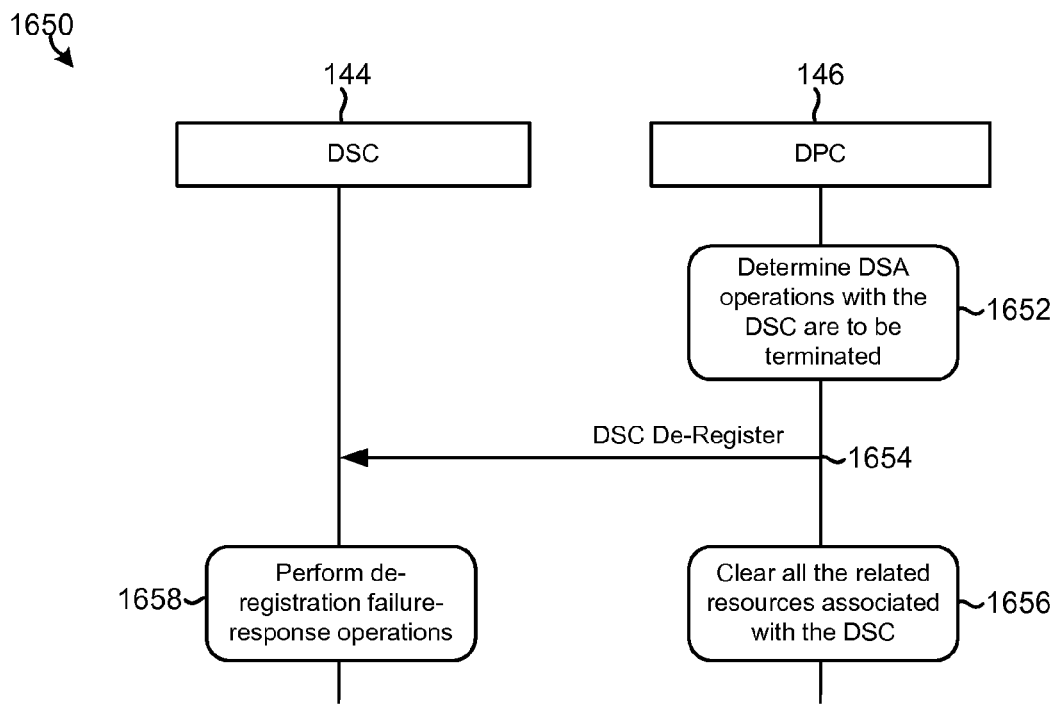
FIG. 16B is a message flow diagram illustrating an embodiment DPC initiated DSAAP de-registration method for terminating DSA operations.

FIG. 16B illustrates an embodiment DPC initiated DSAAP de-registration method 1650 for terminating operations. In the example illustrated in FIG. 16B, the DPC initiated DSAAP de-registration method 1650 is performed by processing cores in a DPC 146 component and a DSC 144 component, each of which may include all or portions of a DSAAP module/component.

In operation block 1652, the DPC 146 may determine that it needs to terminate DSA operations with the DSC 144. In operation 1654, the DPC 146 may generate and send a DSC DE-REGISTER message to the DSC 144. The DPC 146 may be configured to generate the DSC DE-REGISTER message to include any or all of a message type information element (IE), a message ID IE, a backoff timer IE, and a cause IE that identifies a cause for the termination of operations (e.g., overload, unspecified, etc.). In operation block 1656, the DPC 146 may clear all the related resources associated with the DSC 144 and/or perform other similar operations to de-register the DSC 144.

In operation block 1658, the DSC 144 may perform various de-registration failure response operations based on the information included in the received DSC DE-REGISTER message. For example, the DSC 144 may be configured to not retry registration to the same DPC 146 for at least the duration indicated in the backoff timer IE included in the received DSC DE-REGISTER message when the value of the cause IE in the DSC DE-REGISTER message is set to "overload."

Figure 17A:
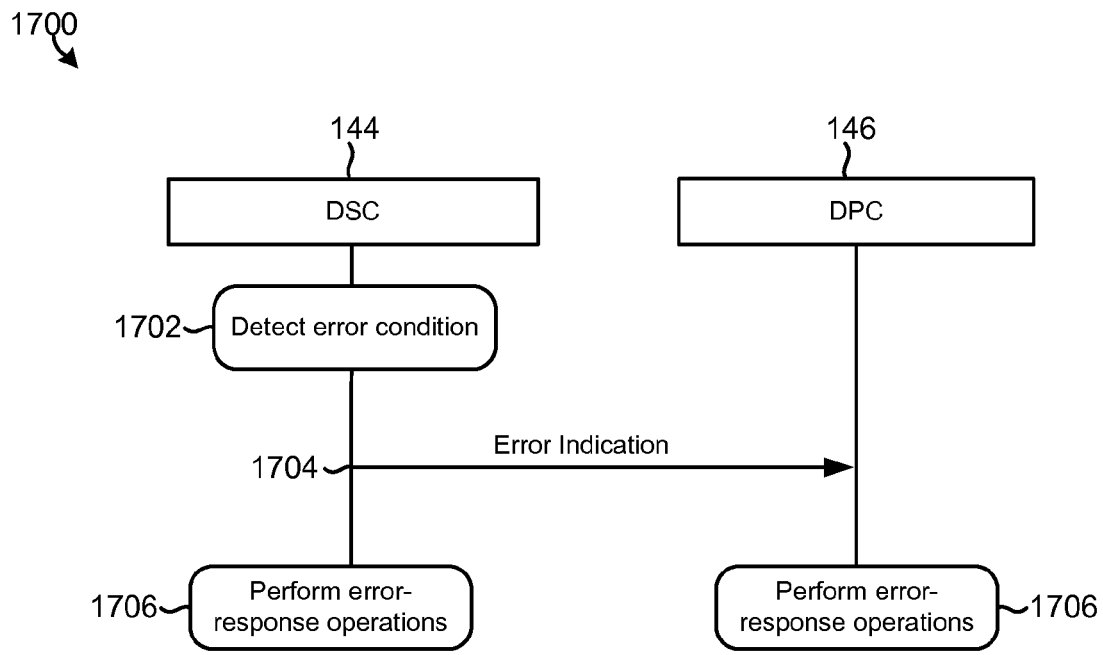
FIG. 17A is a message flow diagram illustrating a DSC initiated DSAAP error indication method for reporting errors.

FIG. 17A illustrates a DSC initiated DSAAP error indication method 1700 for reporting errors in accordance with an embodiment. In the example illustrated in FIG. 17A, method 1700 is performed by processing cores in a DPC 146 component and a DSC 144 component, each of which may include all or portions of a DSAAP module/component.

In operation block 1702, the DSC 144 may detect an error or error condition (e.g., a protocol error, etc.). In operation 1704, the DSC 144 may generate and send an ERROR INDICATION message to the DPC 146. The DSC 144 may be configured to generate the ERROR INDICATION message to include any or all of a message type information element (IE), a message ID IE, cause IE, and a criticality diagnostics IE. The cause IE may include information suitable for use in identifying a cause or type of the error (e.g., transfer syntax error, abstract syntax error, logical error, etc.). The criticality diagnostics IE may include a procedure code IE, a triggering message IE, and a procedure criticality IE. In operation block 1706, the DSC 144 and/or DPC 146 may perform various error-response operations based on the detected error or information included in the received ERROR INDICATION message. The error detection and response operations are discussed in detail further below.

Figure 17B:
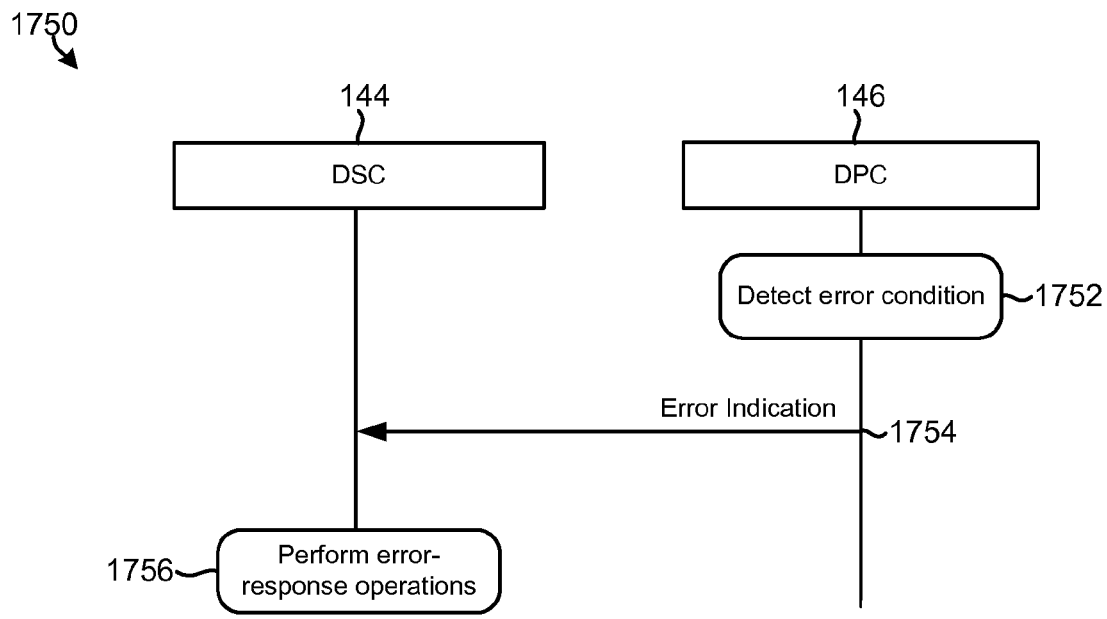
FIG. 17B is a message flow diagram illustrating a DPC initiated DSAAP error indication method for reporting errors.

FIG. 17B illustrates an embodiment DPC initiated DSAAP error indication method 1750 for reporting errors in accordance with another embodiment. In the example illustrated in FIG. 17B, method 1750 is performed by processing cores in a DPC 146 component and a DSC 144 component, each of which may include all or portions of a DSAAP module/component.

In operation block 1752, the DPC 146 may detect an error condition. In operation 1754, the DPC 146 may generate and send an ERROR INDICATION message to the DSC 144. The DPC 146 may be configured to generate the ERROR INDICATION message to include a cause information element (IE) that identifies a cause for the error. In operation block 1756, the DSC 144 and/or DPC 146 may perform various error-response operations based on the information included in the received ERROR INDICATION message.

As mentioned above, the DSC 144 and DPC 146 may be configured perform various error-response or failure response operations in response to detecting an error or failure condition. As part of these operations, the DSC 144 and/or DPC 146 may identify the type or cause of the error/failure condition, and tailor their responses based on the identified type or cause. For example, the DSC 144 and/or DPC 146 may be configured to determine whether a detected error is a protocol error, and tailor their responses accordingly.

Protocol errors include transfer syntax errors, abstract syntax errors, and logical errors. A transfer syntax error may occur when the receiving functional DSAAP entity (e.g., DSC, DPC, etc.) is not able to decode the received physical message. For example, transfer syntax errors may be detected while decoding ASN.1 information in a received message. In an embodiment, the DSC 144 and DPC 146 components may be configured to retransmit or re-request a DSAAP message in response to determining that a detected error is a transfer syntax error (e.g., as part of the error-response operations).

An abstract syntax error may occur when the receiving functional DSAAP entity (e.g., DSC, DPC, etc.) receives information elements (IEs) or IE groups that cannot be comprehended or understood (i.e., an unknown IE id). An abstract syntax error may also occur when the entity receives an information element (IE) for which a logical range (e.g., allowed number of copies) is violated. The DSC 144 and DPC 146 components may be configured to detect or identify these types of abstract syntax errors (i.e., cannot comprehend abstract syntax error), and in response, perform error-response operations based on criticality information included in the corresponding DSAAP message. Additional details regarding these operations and the criticality information are provided further below.

An abstract syntax error may also occur when the receiving functional DSAAP entity does not receive IEs or IE groups, but according to the specified presence of the object, the IEs or IE groups should have been present in the received message. The DSC 144 and DPC 146 components may be configured to detect or identify these particular types of abstract syntax errors (i.e., missing IE or IE group), and in response, perform error-response operations based on criticality information and presence information for the missing IE/IE group.

Additional details regarding these operations, criticality information, and presence information are provided further below.

An abstract syntax error may also occur when the receiving entity receives IEs or IE groups that are defined to be part of that message in wrong order or with too many occurrences of the same IE or IE group. In addition, an abstract syntax error may also occur when the receiving entity receives IEs or IE groups, but according to the conditional presence of the concerning object and the specified condition, the IEs or IE groups should not have been present in the received message. The DSC 144 and DPC 146 components may be configured to detect or identify such abstract syntax errors (i.e., wrong order, too many occurrences, erroneously present, etc.), and in response, reject or terminate a procedure or method associated with the error (e.g., the method that caused the error). The DSC 144 and DPC 146 components may reject or terminate the procedure/method as part of the error-response operations.

In the various embodiments, the DSC 144 and DPC 146 components may be configured to continue to decode, read, or process a DSAAP message after detecting, identifying, or determining that an abstract syntax error occurred for that message. For example, the DSC 144 and DPC 146 components may skip a portion of the message that includes an error, and continue processing the other portions of the message. As part of this continued processing, the DSC 144 and DPC 146 components may detect or identify additional abstract syntax errors.

In an embodiment, the DSC 144 and DPC 146 components may be configured to perform error-response operations for each detected abstract syntax error and/or based on the criticality information and presence information for the IE/IE group associated with the abstract syntax error.

As mentioned above, each DSAAP message may include, or may be associated with, criticality information, presence information, range information, and assigned criticality information. In the various embodiments, a receiving functional DSAAP entity (e.g., DSC, DPC, etc.) may be configured to use any or all of such information (e.g., criticality information, presence information, etc.) when detecting an error, identifying the type of the error, or the specific error-response that are to be performed. That is, the entity may perform different operations depending on the values of the criticality information, presence information, range information, and/or assigned criticality information.

In an embodiment, the receiving functional DSAAP entity (e.g., DSC, DPC, etc.) may be configured to use the presence information included in a DSAAP message when identifying the type of error and the specific error-response operations that are to be performed for the identified error type. For example, the entity may use the presence information to determine whether the presence of an information element (IE) is optional, conditional, or mandatory (e.g., with respect to RNS application) for that message or communication. The entity may determine that an abstract syntax error has occurred when a received message is missing one or more information elements that are determined to be mandatory (or conditional when the condition is true).

In an embodiment, the receiving functional DSAAP entity (e.g., DSC, DPC, etc.) may be configured use the criticality information when identifying the specific error-response operations that are to be performed. That is, each DSAAP message may include criticality information for each individual information element (IE) or IE group included in that message. The values of criticality information for each IE or IE group may include "Reject IE," "Ignore IE and Notify Sender," and "Ignore IE." The receiving entity (e.g., DSC, DPC, etc.) may use this criticality information to determine that an IE, an IE group, or an EP is incomprehensible, identify the condition as an abstract syntax error (i.e., a cannot comprehend abstract syntax error), and/or to identify the error-response operations that are to be performed (e.g., reject, ignore, notify, etc.).

In an embodiment, the receiving entity (e.g., DSC, DPC, etc.) may be configured to reject a method/procedure and initiate a DSAAP error indication method (discussed above with reference to FIGS. 17A-B) in response to determining that an information element (IE) included in a message received during the performance of that method/procedure is incomprehensible, and that value of the criticality information for that IE is set to "Reject IE."

For example, when a message that initiates a method/procedure (e.g., a DSC REGISTER REQUEST message, etc.) is received, determined to include one or more IEs/IE groups that are incomprehensible and marked as "Reject IE," the receiving entity may the reject the method/procedure by not executing any of the functional requests included in that message. The receiving entity may also report the rejection of one or more IEs/IE groups using the message normally used to report unsuccessful outcome of the procedure. When the information in the received initiating message is insufficient and cannot be used to determine a value for all IEs that are required to be present in the message used to report the unsuccessful outcome of the procedure, the receiving entity may terminate the procedure and initiate a DSAAP error indication method/procedure.

As a further example, when a message initiating a method/procedure that does not have a message to report unsuccessful outcome is received, and that message includes one or more IEs/IE groups marked with "Reject IE" which the receiving entity does not comprehend, the receiving entity may terminate the method/procedure and initiate a DSAAP error indication method/procedure.

As yet another example, when a response message (e.g., a DSC REGISTER RESPONSE message, etc.) is received that includes one or more IEs marked with "Reject IE" which the receiving entity does not comprehend, the receiving entity may consider the method/procedure as being unsuccessfully terminated, and initiate a local error handling method.

In an embodiment, the receiving entity (e.g., DSC, DPC, etc.) may be configured to ignore or skip a method/procedure and initiate an DSAAP error indication method (discussed above with reference to FIGS. 17A-B) in response to determining that an information element (IE) included in a message received during the performance of that method/procedure is incomprehensible, and that value of the criticality information for that IE is set to "Ignore IE and Notify Sender."

As an example, when a message initiating a method/procedure is received containing one or more IEs/IE groups marked with "Ignore IE and Notify Sender" which the receiving entity does not comprehend, the receiving entity may ignore the content of the incomprehensible IEs/IE groups, continue with the method/procedure as if the incomprehensible IEs/IE groups were not received (except for the reporting) using the comprehended IEs/IE groups, and report in the response message of the method/procedure that one or more IEs/IE groups have been ignored. When the information received in the initiating message is insufficient to determine a value for all IEs that are required to be present in the response message, the receiving entity may terminate the method/procedure and initiate a DSAAP error indication method/procedure.

As a further example, when a message initiating a method/procedure that does not have a message to report the outcome of the method/procedure is received containing one or more IEs/IE groups marked with "Ignore IE and Notify Sender" which the receiving entity does not comprehend, the receiving entity may ignore the content of the not comprehended IEs/IE groups, continue with the method/procedure as if the not comprehended IEs/IE groups were not received (except for the reporting) using the understood IEs/IE groups, and initiate a DSAAP error indication method/procedure to report that one or more IEs/IE groups have been ignored.

As yet another example, when a response message is received containing one or more IEs/IE groups marked with "Ignore IE and Notify Sender" which the receiving entity does not comprehend, the receiving entity may ignore the content of the not comprehended IE/IE groups, continue with the method/procedure as if the not comprehended IEs/IE groups were not received (except for the reporting) using the understood IEs/IE groups and initiate a DSAAP error indication method/procedure.

In an embodiment, the receiving entity (e.g., DSC, DPC, etc.) may be configured to ignore or skip a method/procedure in response to determining that an information element (IE) included in a message received during the performance of that method/procedure is incomprehensible, and that value of the criticality information for that IE is set to "Ignore IE."

As an example, when a message initiating a method/procedure is received containing one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using only the understood IEs/IE groups.

As a further example, when a response message is received that includes one or more IEs/IE groups marked with "Ignore IE" which the receiving entity does not comprehend, the receiving entity may ignore the content of the not comprehended IEs/IE groups and continue with the method/procedure as if the not comprehended IEs/IE groups were not received using the understood IEs/IE groups.

When reporting not comprehended IEs/IE groups marked with "Reject IE" or "Ignore IE and Notify Sender" using a response message defined for the method/procedure, the Information Element Criticality Diagnostics IE may be included in the Criticality Diagnostics IE for each reported IE/IE group.

In an embodiment, the receiving entity (e.g., DSC, DPC, etc.) may be configured to initiate a DSAAP error indication method (discussed above with reference to FIGS. 17A-B) in response to determining that it cannot decode a type of message IE in a received message. In an embodiment, the entity may be configured to only consider the IEs specified in the specification version used by the component when determining the correct order for the IE included in a message.

In an embodiment, the receiving entity (e.g., DSC, DPC, etc.) may be configured to treat the missing IE/IE group according to the criticality information for the missing IE/IE group in the received message specified in the version of the present document used by the receiver.

As an example, the receiving entity (e.g., DSC, DPC, etc.) may be configured to not execute any of the functional requests of a received initiating message in response to determining that the received message is missing one or more IEs/IE groups with specified criticality "Reject IE." The receiving entity may reject the method/procedure and report the missing IEs/IE groups using the message normally used to report unsuccessful outcome of the method/procedure. When it is determined that the information received in the initiating message was insufficient to determine a value for all IEs that are required to be present in the message used to report the unsuccessful outcome of the method/procedure, the receiving entity may terminate the method/procedure and initiate a DSAAP error indication method/procedure.

As a further example, when a received message initiating a method/procedure that does not have a message to report unsuccessful outcome is missing one or more IEs/IE groups with specified criticality "Reject IE", the receiving entity may terminate the method/procedure and initiate a DSAAP error indication method/procedure.

As yet another example, when a received response message is missing one or more IEs/IE groups with specified criticality "Reject IE", the receiving entity may consider the method/procedure as unsuccessfully terminated and initiate a local error handling method/procedure.

As another example, when a received message initiating a method/procedure is missing one or more IEs/IE groups with specified criticality "Ignore IE and Notify Sender", the receiving entity may ignore that those IEs are missing and continue with the method/procedure based on the other IEs/IE groups present in the message and report in the response message of the method/procedure that one or more IEs/IE groups were missing. When the information received in the initiating message is insufficient to determine a value for all IEs that are required to be present in the response message, the receiving entity may terminate the method/procedure and initiate a DSAAP error indication method/procedure.

As another example, when a received message initiating a method/procedure that does not have a message to report the outcome of the method/procedure is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message a received response message is missing one or more IEs/IE groups with specified criticality "Ignore IE and Notify Sender", the receiving entity may ignore that those IEs are missing and continue with the method/procedure based on the other IEs/IE groups present in the message and initiate a DSAAP error indication method/procedure to report that one or more IEs/IE groups were missing.

As another example, when a received message initiating a method/procedure is missing one or more IEs/IE groups with specified criticality "Ignore IE", the receiving entity may ignore that those IEs are missing and continue with the method/procedure based on the other IEs/IE groups present in the message.

As another example, when a received response message is missing one or more IEs/IE groups with specified criticality "Ignore IE", the receiving entity may ignore that those IEs/IE groups are missing and continue with the method/procedure based on the other IEs/IE groups present in the message.

The receiving entity (e.g., DSC, DPC, etc.) may be configured to respond to messages that include IEs or IE groups that received in wrong order, include too many occurrences, or are erroneously present (i.e., are included and marked as "conditional" when the condition is not met) in various ways. For example, the receiving entity (e.g., DSC, DPC, etc.) may be configured to not execute any of the functional requests of a received initiating message in response to determining that the received message includes IEs or IE groups in wrong order, includes too many occurrences of an IE, or includes erroneously present IEs. The receiving entity may reject the method/procedure and report the cause value "Abstract Syntax Error (Falsely Constructed Message)" using the message normally used to report unsuccessful outcome of the method/procedure. When the information received in the initiating message is insufficient to determine a value for all IEs that are required to be present in the message used to report the unsuccessful outcome of the method/procedure, the receiving entity may terminate the method/procedure and initiate a DSAAP error indication method/procedure.

As another example, when a message initiating a method/procedure that does not have a message to report unsuccessful outcome is received containing IEs or IE groups in wrong order or with too many occurrences or erroneously present, the receiving entity may terminate the method/procedure, and initiate a DSAAP error indication method/procedure using the cause value "Abstract Syntax Error (Falsely Constructed Message)".

As another example, when a response message is received containing IEs or IE groups in wrong order or with too many occurrences or erroneously present, the receiving entity may consider the method/procedure as unsuccessfully terminated and initiate local error handling.

As mentioned above, protocol errors include transfer syntax errors, abstract syntax errors, and logical errors. A logical error occurs when a message is comprehended correctly, but the information contained within the message is not valid (i.e. semantic error), or describes a method/procedure which is not compatible with the state of the receiving entity.

In an embodiment, a receiving entity (e.g., DSC, DPC, etc.) may be configured to perform error response operations based on the class of the method/procedure and irrespective of the criticality information of the IE's/IE groups containing the erroneous values in response to determining/detecting an logical error.

For example, when a logical error is detected in a request message of a class 1 method/procedure, and the method/procedure has a message to report this unsuccessful outcome, this message may be sent with an appropriate cause value (i.e., in the clause IE), such as "semantic error" or "message not compatible with receiver state." When a logical error is detected in a request message of a class 1 method/procedure, and the method/procedure does not have a message to report this unsuccessful outcome, the method/procedure may be terminated and a DSAAP error indication method/procedure may be initiated with an appropriate cause value. Where the logical error exists in a response message of a class 1 procedure, the procedure may be considered as unsuccessfully terminated and local error handling may be initiated.

When a logical error is detected in a message of a class 2 procedure, the procedure may be terminated and a DSAAP error indication procedure may be initiated with an appropriate cause value.

In the various embodiments, the receiving entity (e.g., DSC, DPC, etc.) may be configured to perform a local error handling method/procedure (as opposed to a DSAAP error indication method/procedure) when a protocol error is detected in the ERROR INDICATION message. In case a response message or error indication message needs to be returned, but the information necessary to determine the receiver of that message is missing, the procedure may be considered as unsuccessfully terminated and local error handling may be initiated. When an error that terminates a procedure occurs, the returned cause value may reflect the error that caused the termination of the procedure even if one or more abstract syntax errors with criticality "ignore and notify" have earlier occurred within the same procedure.

In an embodiment, a DPC 146 component may be configured to allocate/lease out resources, monitor the usage of the leased resources, and automatically charge accounts for usage of leased resources. In an embodiment, this may be accomplished by generating/installing bid-specific closed subscriber group identifier based (i.e., CSG-ID based) charging rules in a PCRF 134 component.

Figure 18A:
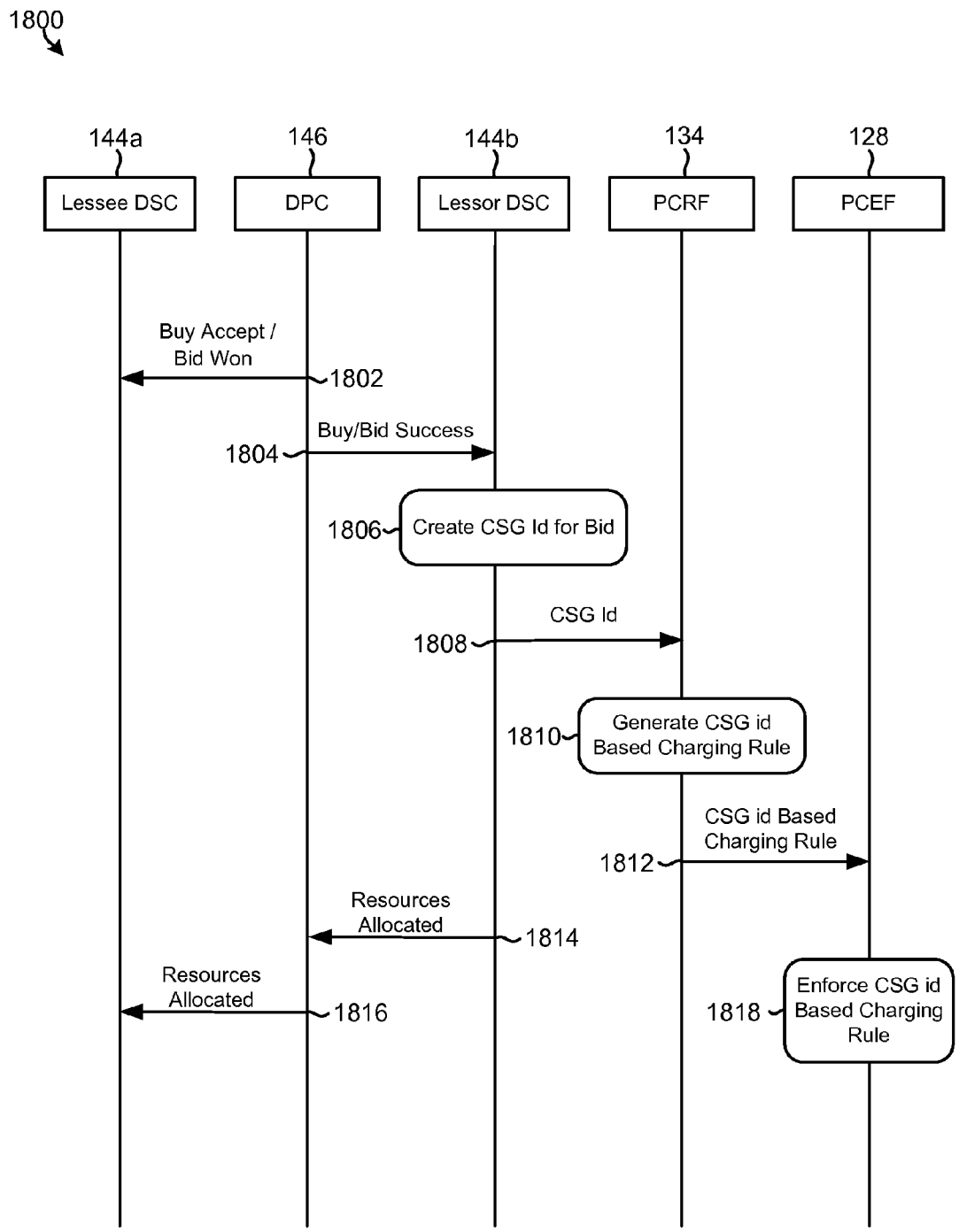
FIGS. 18A and 18B are message flow diagrams illustrating DSA resource allocation methods that include generating charging rules in accordance with various embodiments.
Figure 18B:
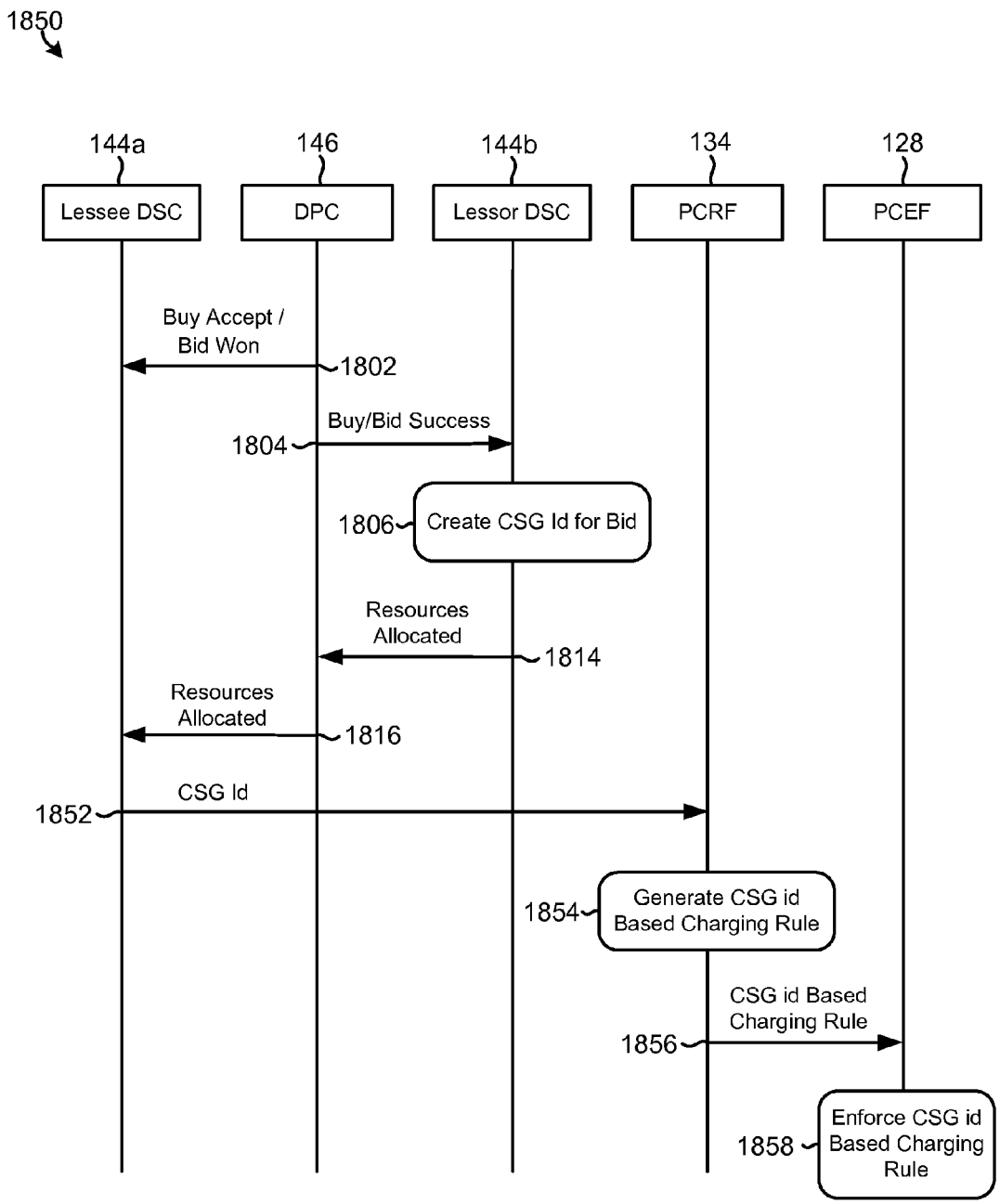

FIGS. 18A and 18B illustrate example DSA resource allocation methods 1800, 1850 for generating/installing CSG-ID based charging rules in accordance with various embodiments. The methods 1800, 1850 may be performed by processing cores in a lessee DSC 144*a*, a DPC 146, a lessor DSC 144*b*, a PCRF 134 and/or a PCEF 128. In the examples illustrated in FIGS. 18A and 18B, a PCRF 134, and/or a PCEF 128 component is included in the lessor network and lessee network, respectively.

With reference to FIG. 18A, in operation 1802, the DPC 146 may send a buy accept message (e.g., DSC BUY ACCEPT) or a bid won message (e.g., DSC BID WON) to the lessee DSC 144*a* to indicate that the lessee network successfully purchased a resource or won an auction for the resource. In operation 1804, the DPC 146 may generate and send a buy success message or a bid success (e.g., DSC BID SUCCESS) message to the lessor DSC 144*b* to inform the lessor network that one or more of its allocated resources/bids have been purchased or won by the lessee DSC 144*a*. The DPC 146 may be configured to generate the buy/bid success messages to include information suitable for identifying the lessee DSC 144*a*, such as a PLMN ID of the network that includes the DSC 144*a*. The winning lessee DSC 144 may wait to receive a "resources allocated" message (e.g., DSC RESOURCES ALLOCATED) from the DPC 146 before scheduling its network equipment (e.g., wireless devices) to start using the resources and/or for the resources to be made available for use.

In operation block 1806, the lessor DSC 144*b* may generate a bid specific closed subscriber group (CSG) identifier (CSG-ID) for mobility management of lessee wireless devices in the lessor network. The lessor DSC 144*b* may generate the CSG-ID so that they may be used as a filter for charging and/or so that it may be use to select all wireless devices pertaining to the bid/resource. In operation 1808, the lessor DSC 144*b* may send the CSG-ID to the PCRF 134 to install CSG-ID-based charging rules in the PCRF 134.

In operation block 1810, the PCRF 134 may receive the CSG-ID and related information from the lessor DSC 144*b*, and use this information to generate CSG-ID-based charging rules. In operation 1812, the PCRF 134 may send the CSG-ID-based charging rules to the PCEF 128 for enforcement. In operation block 1818, the PCEF 128 component may begin enforcing the CSG-ID-based charging rules.

In operation 1814, the lessor DSC 144*b* may generate and send a "resources allocated" message (e.g., DSC RESOURCES ALLOCATED) to the DPC 146 to allocate/commit the resources for access and use by components in the lessee network. The lessor DSC 144*b* may be configured to generate the "resources allocated" message to include any or all of a bid ID, a PLMN-ID Grid ID Cell ID list, a PLMN ID, a grid ID, list of cell IDs, and various auction/resource details (e.g., bandwidth, MBPS, duration, etc.). In operation 1816, the DPC 146 may send the "resources allocated" message to the lessee DSC 144*a*. In operation block 1818, the PCEF 128 component may begin enforcing the CSG-ID-based charging rules.

FIG. 18B illustrates an embodiment DSA method 1850 for allocating resources in a system in which the PCRF 134 is included in the lessee network. Specifically, in the example illustrated in FIG. 18B, the lessee DSC 144a, DPC 146, and lessor DSC 144b perform operations 1802, 1804, 1806, 1814, 1816, discussed above. In operation 1852, the lessee DSC 144a may send the CSG-ID to the PCRF 134 to install CSG-ID-based charging rules in the PCRF 134. In operation block 1854, the PCRF 134 may generate CSG-ID-based charging rules based on the information it receives from the lessee DSC 144a. In operation 1856, the PCRF 134 may send the CSG-ID-based charging rules to the PCEF 128 for enforcement. In operation block 1858, the PCEF 128 component may begin enforcing the CSG-ID-based charging rules.

In an embodiment, the DSA components (e.g., DPC 146, DSC 144, etc.) may be configured to perform mobility management operations to better manage and coordinate the handling (e.g., handoffs, hand-ins, backoff, etc.) of wireless devices 102 as these devices are moved with respect to the available resources, such as resources of their home network, resources allocated by another network, and collocated resources. Performing mobility management operations may include the DSC 144 and/or DPC 146 components communicating with a wireless device 102, eNode 112 MME 130, and/or HSS 132 to determine the locations of wireless devices 102.

FIGS. 19A through 19D illustrate various methods for monitoring the locations of wireless devices 102 in accordance with various embodiments. The methods illustrated in FIGS. 19A through 19D may be performed by processing cores in a wireless device 102, eNodeB 116, MME 1130, HSS 132, and/or a DSC 144.

Figure 19A:
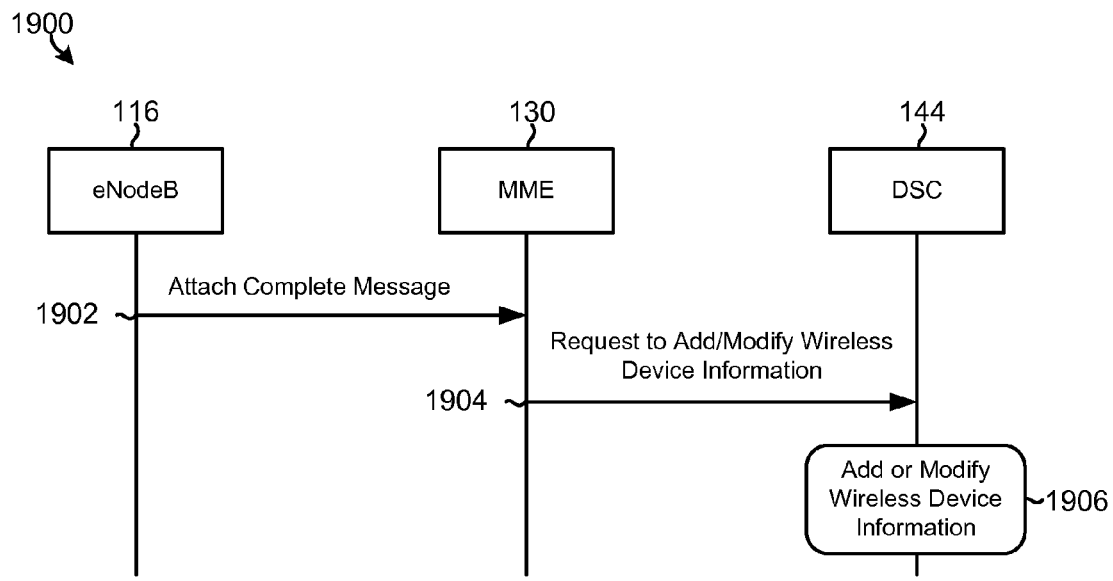
FIGS. 19A through 19D are message flow diagrams illustrating various methods for monitoring the locations of wireless devices in accordance with various embodiments.

FIG. 19A illustrates a method 1900 of adding or updating the location information of a wireless device 102 when it attaches to an eNodeB 116. In operation 1902 the eNodeB 116 may send an "attach complete" message to the MME 130 to indicate that a new wireless device 102 has initiated an attach procedure and/or has successfully attached to the eNodeB 116. In operation 1904, the MME 130 may send a request to add or modify wireless device information to the DSC 144. In operation block 1906, the DSC 144 may receive the request message and use the information included in the received request message to add or update the location information and/or database records of the wireless device 102. The DSC 144 may then use this location information to better allocate or use its telecommunication resources (e.g., by better selecting a target eNodeB for handovers, etc.).

Figure 19B:
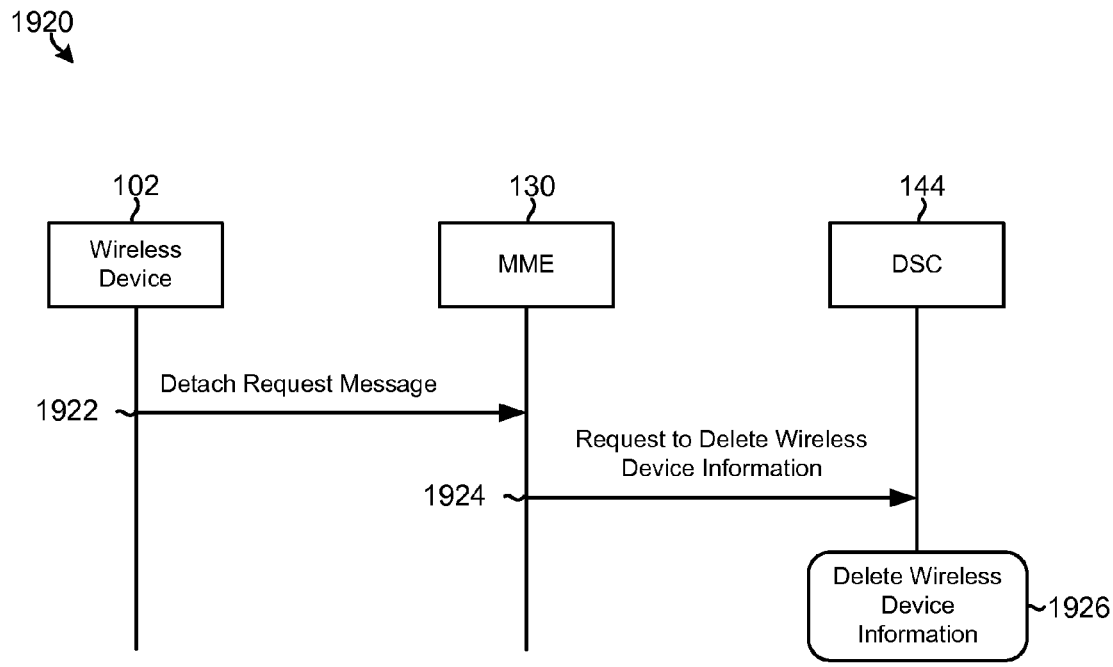

FIG. 19B illustrates a method 1920 of updating/deleting location information for a wireless device 102 in response to a device or eNodeB initiated detach procedure. In operation 1922, a wireless device 102 may send a detach request message to the MME 130, either directly or via an eNodeB 116. In another embodiment, an eNodeB 116 may be configured to send the detach request message to the MME 130 in response to determining that the wireless device 102 has initiated a detach procedure, has been dropped, has been terminated, or is otherwise no longer attached to that eNodeB 116. In operation 1924, the MME 130 may send a request to delete wireless device information to the DSC 144. In operation block 1926, the DSC 144 may use the information included in the received request message to update/remove a location record for the wireless device 102. For example, the DSC 144 may delete a location record associated with the wireless device 102 to indicate that the wireless device 102 is no longer using network resources (e.g., the eNodeB 116).

Figure 19C:
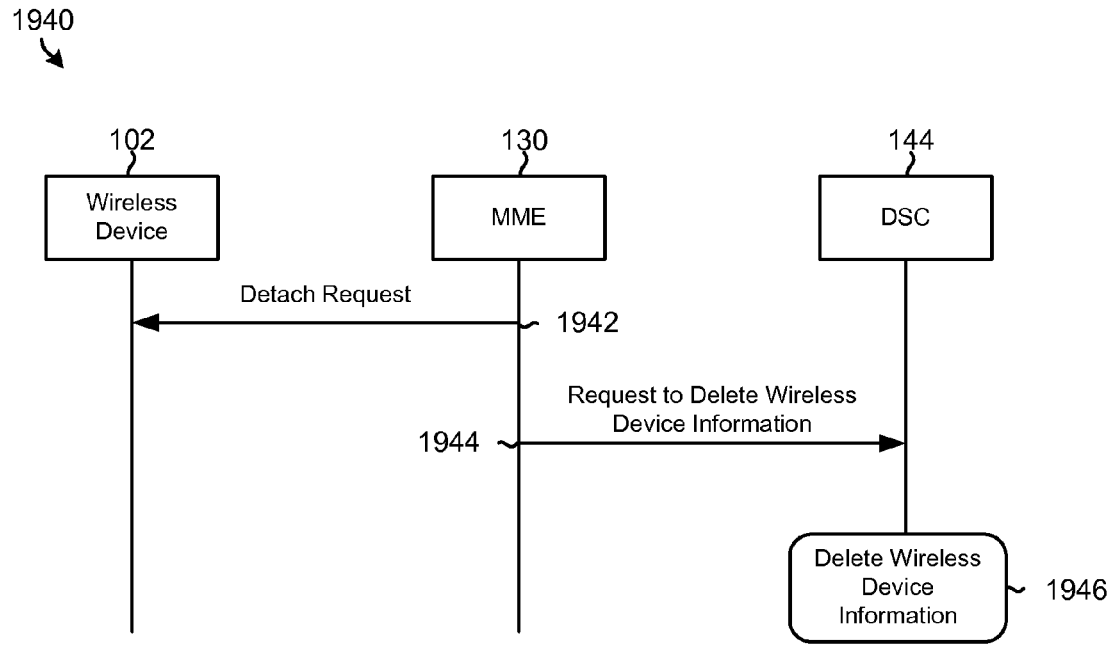

FIG. 19C illustrates a method 1940 of updating/deleting location information for a wireless device 102 in response to detecting a MME-initiated detach procedure. In operation 1942, the MME 130 may send a detach request message to a wireless device 102, either directly or via an eNodeB 116, to commence an MME-initiated detach procedure. In operation 1944, the MME 130 may send a request to delete wireless device information to the DSC 144. In operation block 1946, the DSC 144 may receive and use the request message (or information included in the received request message) to update/remove a location record for the wireless device 102.

Figure 19D:
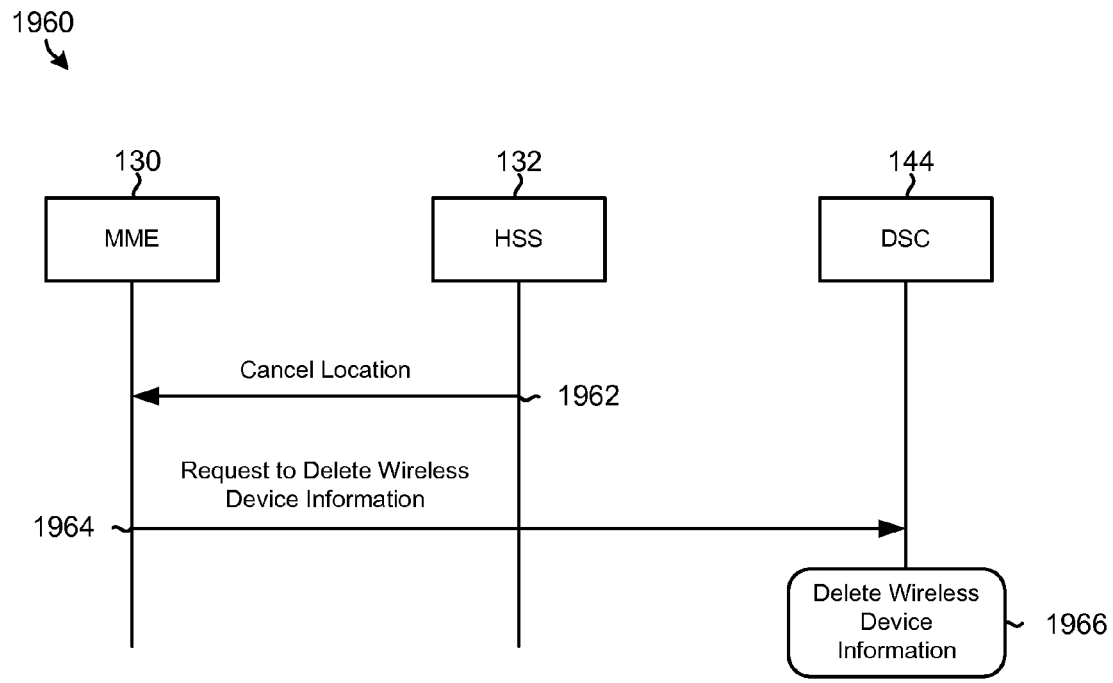

FIG. 19D illustrates a method of updating/deleting location information for a wireless device 102 in response to detecting a HSS-initiated detach procedure. In operation 1962 of method 1960, a HSS 132 may send a "cancel location" message to MME 130 to commence the HSS-initiated detach procedure. In operation 1964, the MME 130 may send a request to delete wireless device information to the DSC 144. In operation block 1966, the DSC 144 may receive the request message and use the information included in the received request message to update or remove a location record for the wireless device 102.

The methods 1900, 1920, 1940, 1960 discussed above may be used to keep the DSC 144 informed of the locations of the wireless device 102 so that it can make better and more informed DSA decisions. That is, these methods allow the DSC 144 to store up-to-date information (e.g., location or database records) for the wireless devices. The DSC 144 may use this information to identify candidate devices for handin and backoff operations (e.g., due to mobility of the devices).

As a further example, the DSC 144 may designate a lessee wireless device 102 that is determined to be moving towards a lessor's grid boundary (where a bid is active for the lessee) as candidate for a handin procedure. Similarly, a DSC 144 may designate a lessee wireless device 102 that has moved out of the grid boundary as a candidate for backoff (from the view of lessor DSC).

In addition, the DPC 146 and/or DSC 144 components may be configured to perform various special functions to further support the mobility of lessee wireless devices as they are moved between the lessee and lessor networks. These special functions may include identifying a resource grid, determining a buffer zone for the grid, finding geographical boundaries or boundaries during wireless device mobility, performing inter-network handovers for connected wireless devices, monitoring a wireless device's vicinity, determining whether a wireless device is an idle, determining congestion state changes, etc. These special functions may further include handling coverage gaps due to cell outages or blacklisting during a handin, a handoff, or backoff procedure. In addition, these special functions may include identifying operator policies, determining blacklists and dynamic changes via a grid map, and pre-planning a handin, a handoff, or a backoff procedure. The special function may further include performing mobility-based, congestion-based, bid-based, or expiry-based backoff operations.

In an embodiment, the DSA system may be configured to lease-out or allocate resources based on geographical areas, such as a license area, a regional area, a cell/sector region, and/or a subsector cell region. The DSA system may be further configured to divide the relevant geographical areas into subunits, generate a grid-map data structure that identifies these geographic subunits, and use the grid-map data structure to allocate, de-allocate, and reallocate resources based on the geographical locations of the wireless devices with respect to the available resources.

Figure 20:
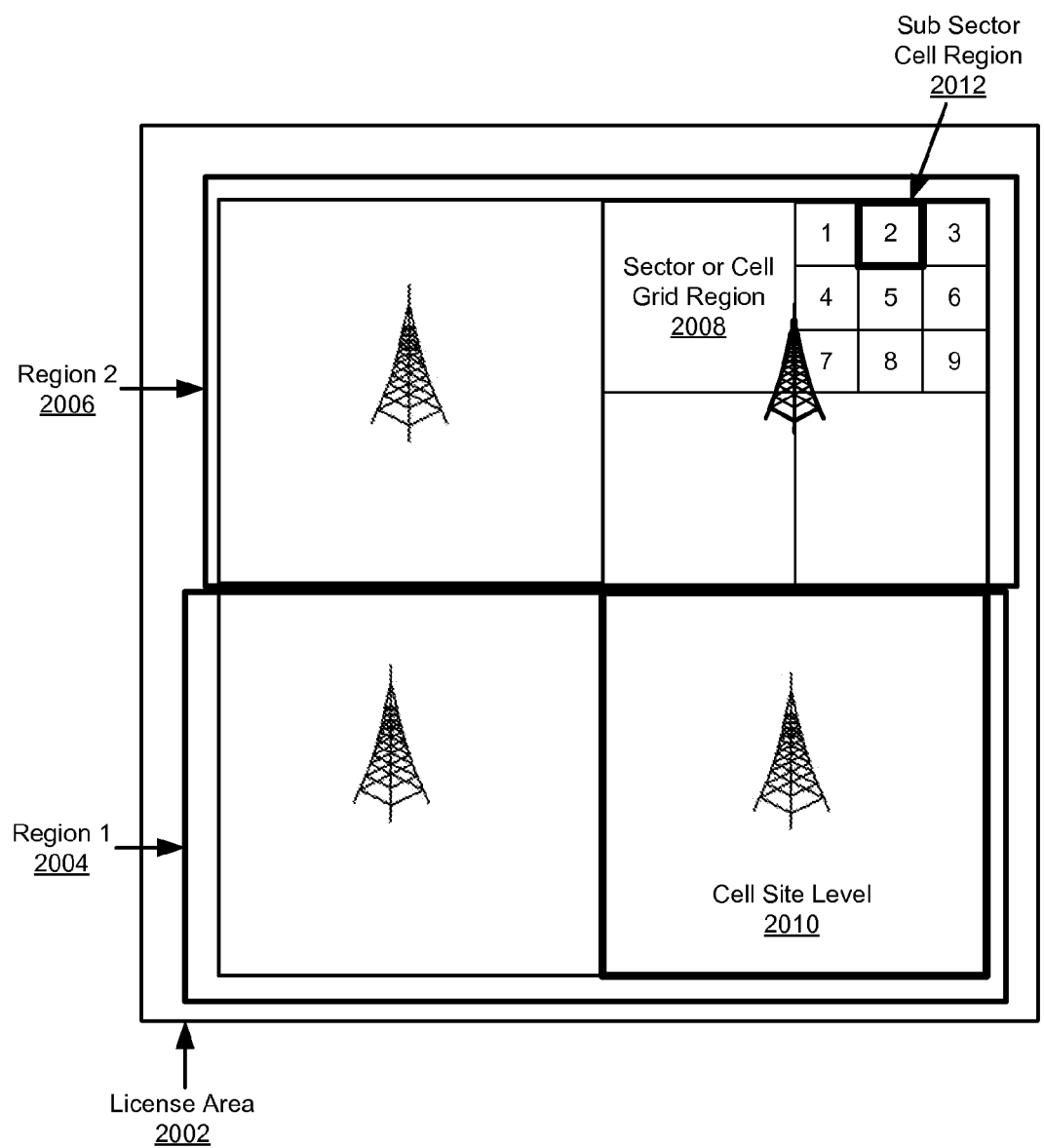
FIG. 20 is an illustration of a geographical area divided into sub-units that may be represented by a grid-map data structure in accordance with an embodiment.

FIG. 20 is an illustration of a geographical area divided into sub-units 2002-2012 that may be represented by a grid-map data structure. These sub-units include license area 2002 having a first region (Region 1) 2004 and a second region (Region 2) 2006. Each of the first and second regions 2004, 2006 may be further divided into one or more cell site levels 2010. Each cell site level 2010 may include one or more sectors or cell grid regions 2008. Each sector or cell grid region 2008 may include one or more sub-sector cell grid regions 2012. In the example illustrated in FIG. 20, the first region 2004 includes a cell site level 2010 region, and the second region 2006 includes a sector/cell grid region 2008 and a sub-section cell grid region 2012. Each of these sub-units 2002-2012 may include or represent all or portion of a telecommunication resource.

A DSA component (e.g., DPC 146, DSC 144, etc.) may be configured to generate a grid-map data structure that includes information elements that represent these sub-units 2002-2012 and/or that identify the locations of resources (e.g., eNodeB 116, available bandwidth, RF spectrum resources, etc.) with respect to a license area, region, cell site level, sector/cell grid region, subsector cell region, etc. The DSA components may be configured to use the grid-map data structure to intelligently allocate, de-allocate, and reallocate resources based on the movements and locations of the wireless devices 102 with respect to the available resources.

FIG. 21 is an illustration of the logical and functional elements that may be represented by a grid-map data structure. The DSA components may be configured to use the grid-map data structure to perform various operations to better support the mobility of lessee wireless devices as these devices moves between the lessee and lessor networks. For example, the DSA components may be configured to generate the grid-map data structure to include a primary grid and a buffer zone, each of which may be an information structure that includes/stores information suitable for identifying cells/sectors and their coverage zones. The DSA components may then use the location of the wireless devices 102 with respect to the cells/sectors identified by the primary grid and/or buffer zone to determine whether to initiate inter-network handover operations (i.e. to handover the device from the lessee network to the lessor network, or vice versa).

With reference to FIG. 21, the primary grid boundary 2102 illustrates the coverage areas of cell sites/sectors that may be represented by a primary grid structure. The buffer zone boundary 2104 illustrates the cell sites/sectors that may be represented by a buffer zone structure.

The primary grid structure may include a list of cell sites or sectors, and their coverage areas (e.g., radio frequency coverage areas, etc.). This list of cells may be used to identify or define a geographical boundary, such as the primary grid boundary 2102 illustrated in FIG. 21. The geographical boundary may be any shape or geographical area, such as an arbitrary polygon-shaped area defined based on the coverage areas of the cells. Each cell may include a plurality of eNodeBs 116, a single eNodeB 116. Each cell may also be a single sector of a macro cell.

The primary grid structure may include/store a list of cell sites or sectors in a primary grid cell list. The primary grid cell list may include lessee cells, lessor cells, or a combination thereof. For example, in an embodiment, the primary grid cell list may include information identifying both lessee and lessor cell sites, and their respective coverage areas. The coverage areas of the lessee and lessor cells (included in the primary grid cell list) may completely overlap, partially overlap, or not overlap. The primary grid cell list may also classify each of the cells as being either an interior cell or a border cell. For example, the primary grid cell list may be generated to include an interior cell list and a border cell list. An interior cell may be a cell having a coverage area that is completely inside the geographical boundary (e.g., primary grid boundary 2102), but not adjacent to the boundary's border. A border cell may be a cell having a coverage area that is adjacent to the boundary border (or that crosses the boundary border).

The buffer zone structure may an information structure that includes/stores information suitable for use in identifying cells in the geographical area that surrounds the outer portion of primary grid boundary 2102. As examples, the buffer zone may include a list of cells that are outside of the geographical boundary identified by the primary grid, that have coverage areas that are outside the coverage areas of the cell sites/sectors identified by the primary grid, and/or that are outside geographical boundary and have coverage areas that partially overlap the coverage areas of the cell sites/sectors identified by the primary grid. As further examples, the buffer zone may include a neighbor list of cells/sectors that are adjacent to the border cells/sectors identified in primary grid, but not border cells or cells included in the primary grid cell list.

Neighbor lists for the both lessee and lessor network are subject to change for performance reasons. As such, the geographical coordinates of the cells within the primary grid (and/or sector orientation) may be used to dynamically determine the neighbor list for the buffer zone. That is, the neighbor list of the cells/sectors may be determined based on the geographic coordinates of the lessor and lessee cell sites/sectors, with their orientation used to determine whether the cell/sector is pointing into or out of the grid for the lessor system. For the lessee network, the cell/sector orientation of the cells/sectors may be used to identify neighbor cells for pre-selection for handins into the lessor network.

In an embodiment, the buffer zone structure may be generated to include multiple zones, levels, or tiers. For example, the buffer zone structure may be generated to include a list of first tier cells and a list of second tier cells. The list of first tier cells may include cells that are adjacent to the cells included in the primary grid (but not included in the grid). The list of second tier cells may include cells that are adjacent to the first tier cells (but not first tiers cells themselves). The generation and use of buffer zones that include multiple zones/levels/tiers is discussed in more detail further below.

Each DSC 144 (e.g., the lessee and lessor DSCs) may be configured to determine, compute, and/or generate the primary grids, geographical boundaries, interior cells, border cells, buffer zones, depth of the buffer zones for its network. The DSCs 144 may be configured to determine size/depth of the buffer zone so as to reduce the number of messages and/or to reduce the probability of handover drops (e.g., due to RF propagation characteristics). The DSCs 144 may also be configured to determine the size/depth of the buffer zone so as to balance the performance, congestion, and resource consumption characteristics of the network/devices.

In an embodiment, the DSC 144 components may be configured to generate the buffer zone to include a number of tiers that is commensurate with the mobility of the wireless devices 102 in that geographical area. For example, a DSC 144 component may be configured to generate the buffer zone to include a large number of tiers when the geographical boundary of the grid is relatively small, or for rural/metropolitan areas where people (and their wireless devices) frequently travel large distances or in high speed vehicles. Similarly, the DSC 144 component may be configured to generate the buffer zone to include a small number of level/tiers when the geographical boundary of the grid is relatively wide or large, or for urban areas where people typically travel shorter distances.

Figure 22A:
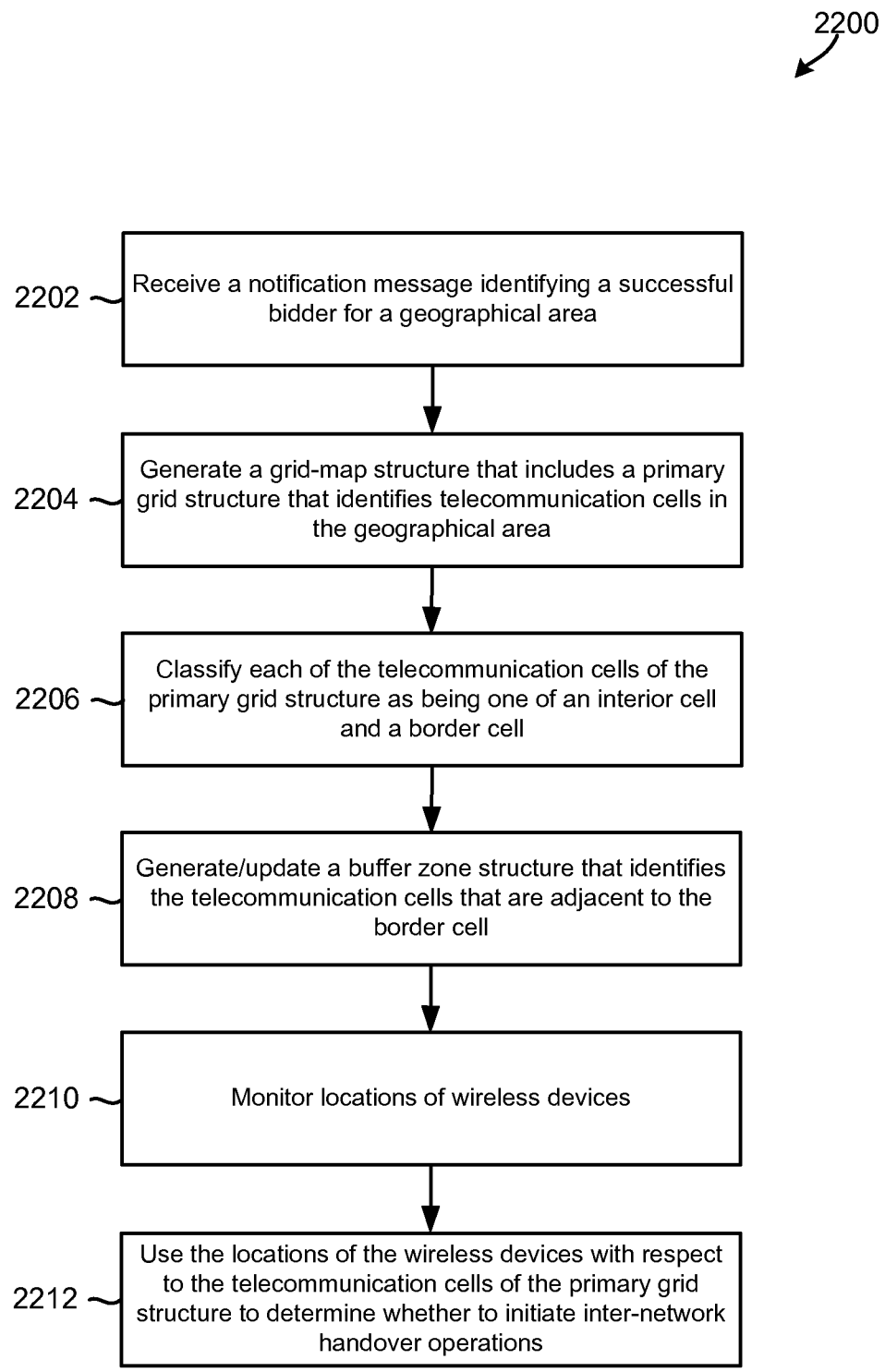
FIG. 22A is a process flow diagram illustrating a method for using a grid-map structure to intelligently determine whether to initiate inter-network handover operations in accordance with an embodiment.

FIG. 22A illustrates a method 2200 generating and using a grid-map data structure to intelligently determine whether to initiate inter-network handover operations. Method 2250 may be performed in a processing core of a DSC 144 component.

In block 2202, the processing core of the DSC 144 may receive a notification message identifying a successful bidder for a geographical area. In an embodiment, the DSC may be a lessee DSC that is included in a first telecommunication network, and the notification message may include information identifying the first telecommunication network as the successful bidder. In another embodiment, the DSC may be a lessor DSC that is included in a first telecommunication network, and the notification message may include information identifying a second telecommunication network as the successful bidder.

In block 2204, the processing core may generate a grid-map structure that includes a primary grid structure that identifies telecommunication cells in the geographical area. In block 2206, the processing core may classify each of the telecommunication cells of the primary grid structure as being one of an interior cell and a border cell. In block 2208, the processing core may generate/update a buffer zone structure that identifies the telecommunication cells that are adjacent to the border cell, and update the grid-map to include the generated/updated buffer zone structure.

In block 2210, the processing core may monitor locations of wireless devices. In an embodiment, the DSC may be a lessee DSC that is included in a first telecommunication network, and monitoring locations of wireless devices may include monitoring the locations of wireless devices attached to a first eNodeB in the first telecommunication network. In another embodiment, the DSC may be a lessor DSC that is included in a first telecommunication network, and monitoring locations of wireless devices may include monitoring the location of a wireless device that subscribes to the first telecommunication network and is attached to an eNodeB in a second telecommunication network.

In block 2212, the processing core may use the locations of the wireless devices with respect to the telecommunication cells of the primary grid structure to determine whether to initiate inter-network handover operations. In various embodiments, determining whether to initiate inter-network handover operations may include whether a resource lease period has ended, the eNodeB is congested, and/or that the wireless device has moved outside of the geographical area before. In an embodiment, the DSC may be a lessee DSC that is included in a first telecommunication network, and using the locations of the wireless devices with respect to the cells of the primary grid structure to determine whether to initiate inter-network handover operations may include determining whether to initiate handin operations to transfer the wireless devices attached to the first eNodeB to a second eNodeB in a second telecommunication network. In another embodiment, the DSC may be a lessor DSC that is included in a first telecommunication network, and using the locations of the wireless devices with respect to the cells of the primary grid structure to determine whether to initiate inter-network handover operations in block 2212 may include determining whether to initiate backoff operations to transfer the wireless device that subscribes to the first telecommunication network and is attached to the eNodeB back to the first telecommunication network.

Figure 22B:
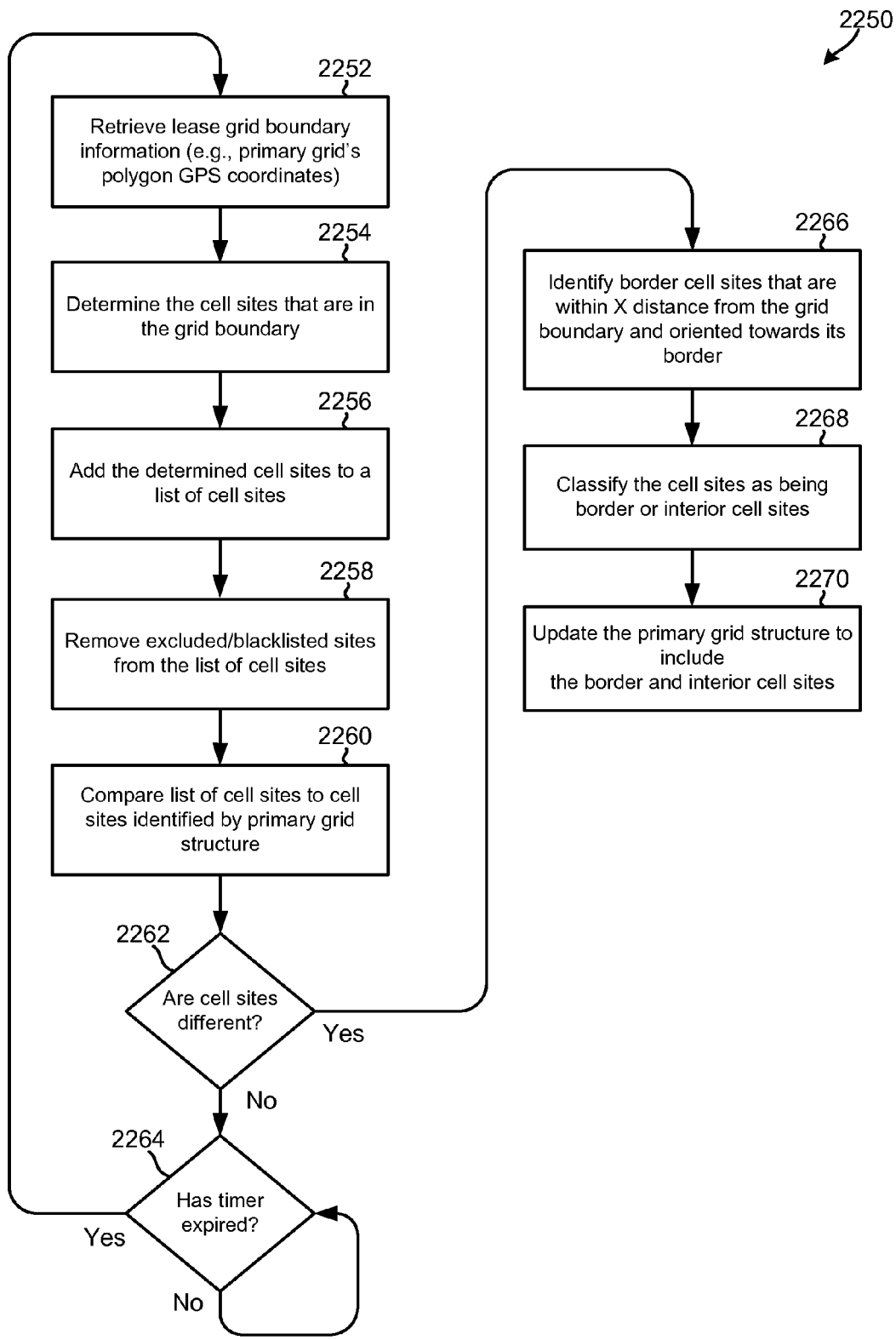
FIG. 22B is a process flow diagram illustrating a method for generating or updating the list of cell sites of a primary grid structure of the grid-map in accordance with an embodiment.

FIG. 22B illustrates an embodiment method 2250 for generating/updating the list of cell sites of the primary grid structure of the grid-map data structure. Method 2250 may be performed in a processing core of a DSC 144 component. In block 2252, the processing core may receive lease grid boundary information, such as GPS coordinates identifying a geographical area (e.g., a polygon-shaped area) corresponding to the primary grid boundary. In block 2254, the processing core may determine the cell sites (or their coverage areas) that are in the primary grid boundary. In block 2256, the processing core may generate a list of cells sites and add the determined cell sites to the generated list of cell sites. In block 2258, the processing core may remove the cell sites that have been marked for exclusion and/or blacklisted from the generated list of cell sites. Alternatively, in blocks 2256 and 2258, the processing core may generate the list of cell sites so that it excludes cell sites that have been marked for exclusion and/or blacklisted.

In block 2260, the processing core may compare the cell sites included in the generated list of cell sites to those identified by the primary grid structure. In determination block 2262, the processing core may use the results of the comparison to determine whether there are differences between the cell sites identified in the generated list of cell sites and those identified by the primary grid structure. In response to determining that there are no differences (i.e., determination block 2262="No"), in determination block 2264, the processing core may determine whether a timer has expired. In response to determining that has not yet expired (i.e., determination block 2264="No"), the processing core may wait or performing other tasks, and recheck the timer again at a later time (e.g., after performing other tasks). In response to determining that has expired (i.e., determination block 2264="Yes"), the processing core may repeat the operations of blocks 2252-2262.

In response to determining that there are differences between the cell sites identified in the generated list of cell sites and those identified by the primary grid structure (i.e., determination block 2262="Yes"), in block 2266, the processing core may identify border cell sites that are within a certain distance (e.g., x distance) from the primary grid boundary and oriented towards its border. In block 2268, the processing core may classify the cell sites in the generated list of cell sites as being border or interior cell sites. In block 2270, the processing core may add or update the list cell sites in the primary grid structure to include the border and interior cell sites.

Figure 23A:
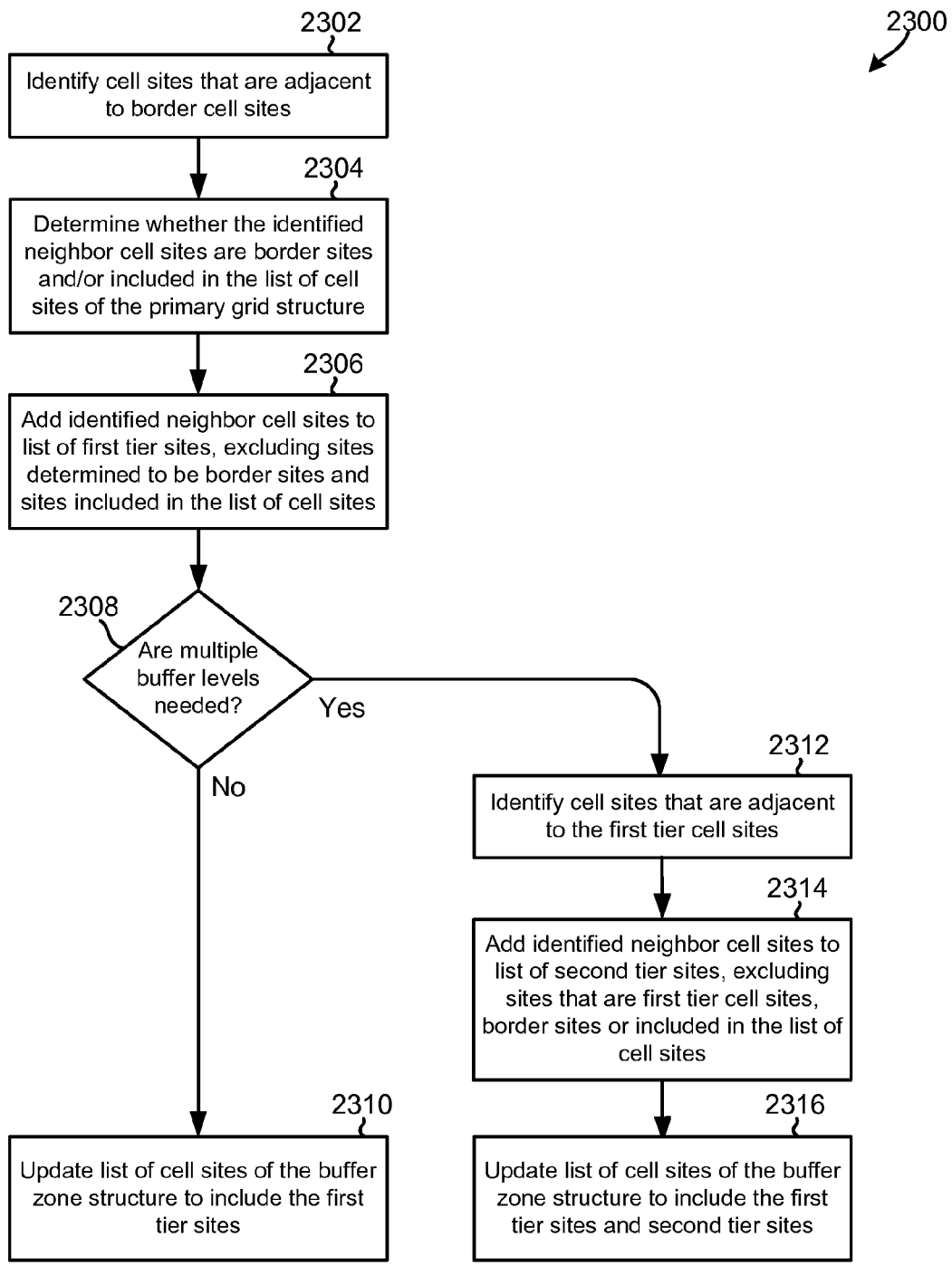
FIGS. 23A and 23B are process flow diagrams illustrating methods for determining buffer zones in accordance with various embodiments.
Figure 23B:
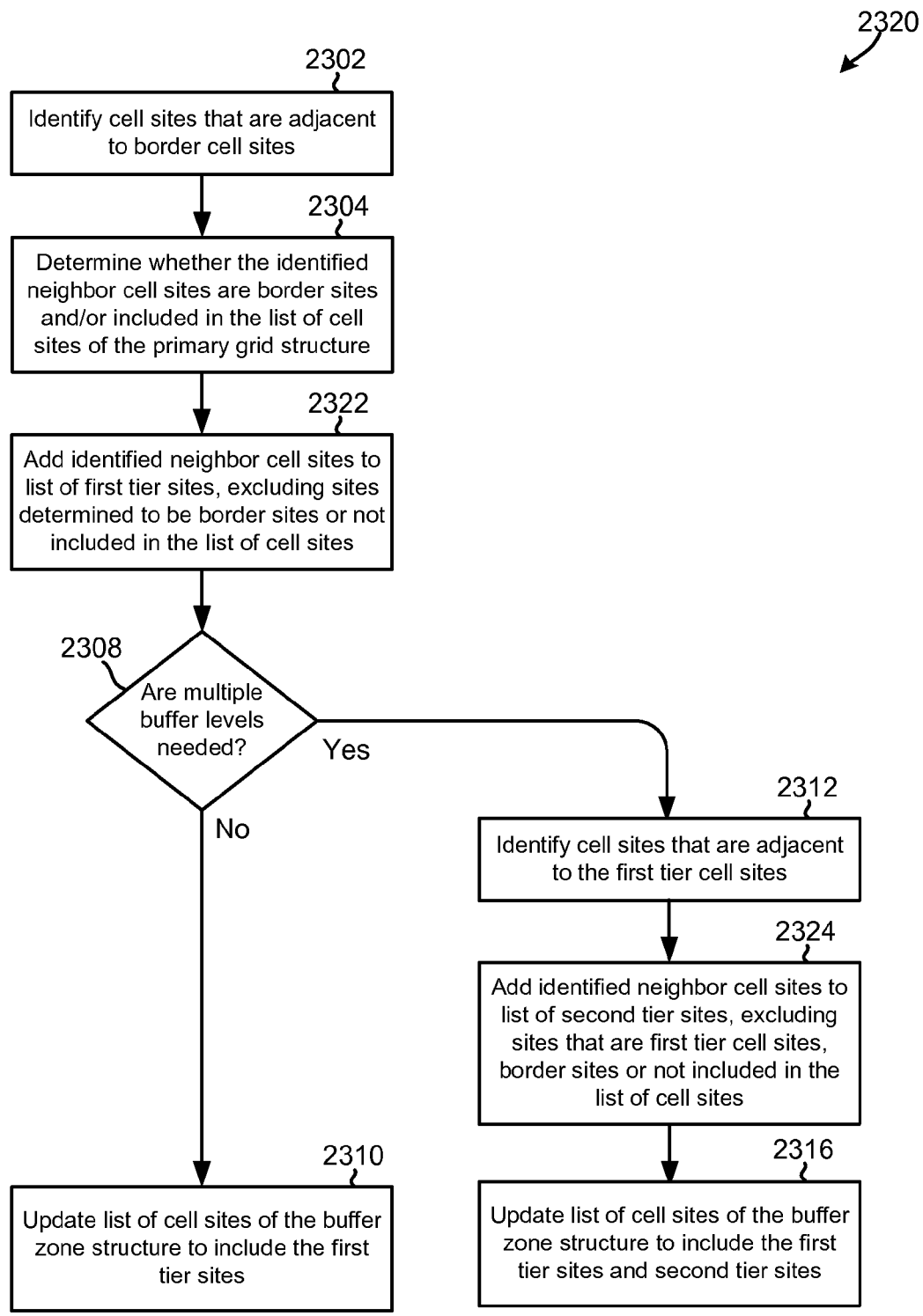

FIGS. 23A and 23B illustrate embodiment methods 2300, 2320 for determining buffer zones by selecting cell sites for inclusion in buffer zone structure. In addition, FIGS. 23A and 23B illustrate that the buffer zones may be determined differently depending on whether the DSC is in a lessee or lessor network. This is because the lessee buffer cells may be selected to facilitate a graceful handin process to the lessor network, whereas and the lessor buffer cells may be selected to facilitate backoff to the lessee network. As such, methods 2300 and 2320 address the variable nature of wireless device mobility around the primary grid boundary.

With reference to FIG. 23A, in block 2302, the processing core may identify neighbor cell sites that are adjacent to border cell sites. In block 2304, the processing core may determine whether the identified neighbor cell sites are border sites and/or cell sites that are included in the list of cell sites of the primary grid structure (i.e., in the primary grid cell site list). In block 2306, the processing core may generate a list of first tier sites to include the identified neighbor cell sites. The processing core may generate the list of first tier sites to exclude cell sites that are determined to be border sites and included in the primary grid cell site list.

In determination block 2308, the processing core may determine whether multiple buffer levels are requested or required, such as by evaluating network operator policies or the mobility of the wireless devices 102. In response to determining that multiple buffer levels are not requested or required (i.e., determination block 2308="No"), in block 2310, the processing core may add or update list of cell sites of the buffer zone structure to include the first tier sites.

In response to determining that multiple buffer levels are requested or required (i.e., determination block 2308="Yes"), in block 2312, the processing core may identify cell sites that are adjacent to the first tier cell sites. In block 2312, the processing core may generate a list of second tier sites to include these identified neighbor cell sites, excluding sites that are first tier cell sites, border sites, and sites that are included in the primary grid cell site list. In block 2314, the processing core may update list of cell sites of the buffer zone structure to include the first tier sites and second tier sites. While the above example discusses two levels/tiers, it should be understood that method 2300 may be performed so as to support any number of levels/tiers.

FIG. 23B illustrates another embodiment method 2320 for generating or updating the list of cell sites of the buffer zone structure. Method 2320 may be performed in a processing core of a lessor DSC 144 component. Same as the method 2300 discussed above, in block 2302, the processing core may identify cell sites that are adjacent to border cell sites, and in block 2304, the processing core may determine whether the identified neighbor cell sites are border sites and/or cell sites that are included in the list of cell sites of the primary grid structure.

In block 2322, the processing core may add the identified neighbor cell sites to list of first tier sites, excluding the cell sites that are determined to be border sites and the cell sites that are not included in the list of cell sites of the primary grid structure. In determination block 2308, the processing core may determine whether multiple buffer levels are requested or required. In response to determining that multiple buffer levels are not requested or required (i.e., determination block 2308="No"), in block 2310, the processing core may add or update list of cell sites of the buffer zone structure to include the first tier sites. In response to determining that multiple buffer levels are not requested or required (i.e., determination block 2308="Yes"), in block 2312, the processing core may identify cell sites that are adjacent to the first tier cell sites.

In block 2324, the processing core may add identified neighbor cell sites to list of second tier sites, excluding sites that are first tier cell sites, border sites or not included in the list of cell sites. In block 2314, the processing core may update list of cell sites of the buffer zone structure to include the first tier sites and second tier sites.

In an embodiment, the DSCs 144 may be configured to periodically reevaluate their identification of the interior, border, and buffer zone cells to account for changes to the grid, such as when cell sites are taken down for maintenance or when sectors that were down are brought back up.

In various embodiments, the DSA components may be configured to perform intelligent target cell selection and handover operations. That is, it is important to perform handover operations so as to reduce failures and latency. It is also desirable to allow a DSC 144 in the target network choose a target cell based on the DSC's 144 policies, congestion levels, load balance criteria, etc. However, involving the target DSC 144 in every inter-network S1-handover procedure may introduce latency and/or cause handover failures.

To overcome these and other limitations, in an embodiment, an eNodeB 116 may be configured to receive measurement reports from the wireless devices 102 (for the target network), and use the received measurement reports to select a target cell and/or initiate the inter-network handover (handin or backoff) procedures to the target cell. In another embodiment, the DSCs 144 may be configured to use a secure peer-to-peer connection (established for the bid life time) to coordinate the target cell selection operations. By selecting the target cell based on measurement reports and/or based on the DSC coordination operations, the various embodiments reduce latency, improve performance, and allow target cell selection based on policies, congestion levels, load balance criteria, etc.

In an embodiment, a DSC 144 component may be configured to receive congestion state information from the eNodeBs 114 in its network, and use this congestion state information to intelligently allocate resources, manage user traffic of the eNodeBs, select target eNodeBs for handovers, determine the quality of service (QoS) levels that are to be given to wireless devices attached to the eNodeBs, and/or perform other similar operations to intelligently manage the allocation and use of resources by the various networks. The congestion state information may identify a current congestion state (e.g., Normal, Minor, Major, Critical, etc.) of an eNodeB. Each congestion state may be associated with a congestion level. For example, a "Normal" congestion state may indicate that the eNodeB is operating under normal load (e.g., at or below a 50% usage threshold). A "Minor" congestion state may indicate that the network component is experiencing congestion and/or operating under an above-average load (e.g., above 50% usage threshold). A "Major" congestion state may indicate that the network component is experiencing significant congestion and/or operating under heavy load (e.g., above 70% usage threshold). A "Critical" congestion state may indicate that the network component is experiencing severe congestion, experiencing an emergency situation, or operating under an extremely heavy load (e.g., above 90% usage threshold).

The DSA components may be configured to perform various operations each time the eNodeB congestion state changes. As such, frequent changes in these congestions states may have a significant negative impact on the performance of the DSA system. As an example, an eNodeB 116 may enter the "Minor" congestion state each time the usage levels increase to 51%, and return to the "Normal" congestion state each time the usage levels drop to 49%. Each of these state transitions (i.e., Normal-to-Minor and Minor-to-Normal) may trigger a large number of operations or events (e.g., for handins, backoff, etc.). As such, frequent fluctuations between 51% and 49% usage levels may have a significant negative impact on the performance of the network and DSA system.

To avoid frequent fluctuations between the same two states, the DSA components may be configured to add a hysteresis gap by implementing different thresholds for the up and down triggers that cause the congestion state transitions. For example, an eNodeB 116 may be configured to average the samples for congestion, and transition between congestions states when the samples exceed a certain threshold, lag, or hysteresis value (e.g., 10%).

Figure 24:
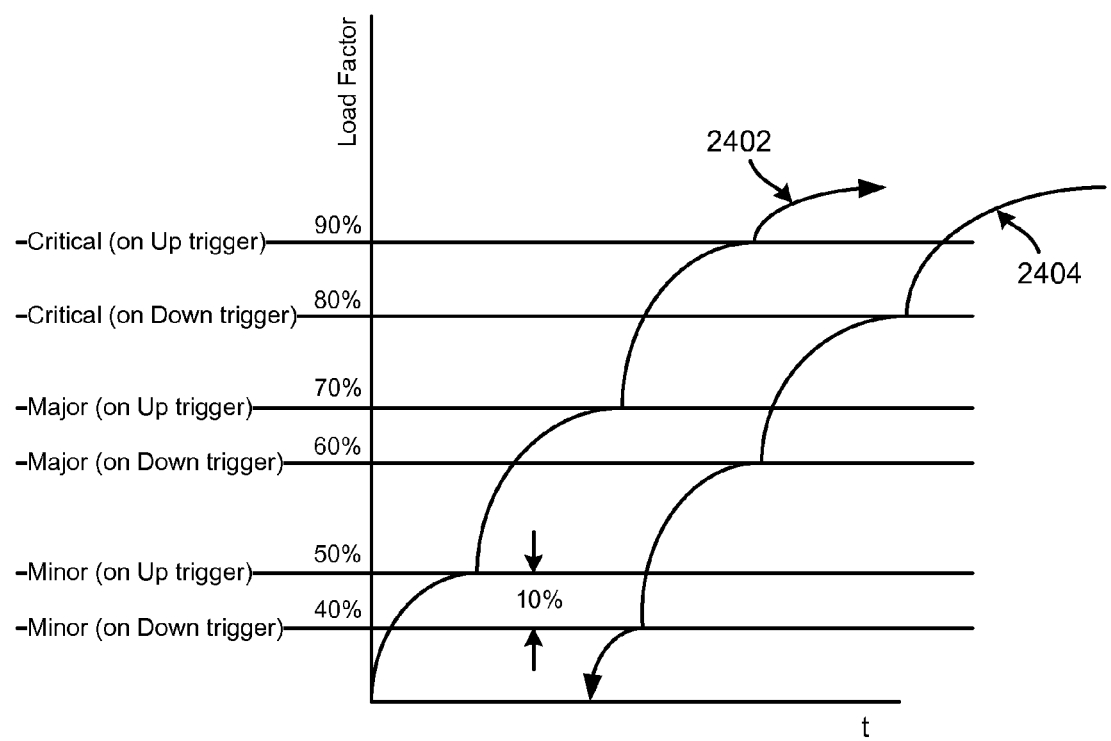
FIG. 24 is a chart diagram that illustrates different thresholds may be used for the up and down triggers to introduce hysteresis gap between state changes in accordance with an embodiment.

FIG. 24 illustrates that different thresholds may be used for the up and down triggers to introduce a lag or hysteresis gap between state changes. The Y-axis shows load factor (e.g. congestion level) at an eNodeB 116 and up and down trigger points for congestion states: Minor, Major and Critical. The X-axis describes a timeline (t). The left hand curve 2402 illustrates increases in load (e.g., increasing levels of congestion at an eNodeB). The right hand curve 2404 illustrates a decreasing load/congestion.

FIG. 24 also illustrates the gaps between the Up and Down triggers for each of the Minor, Major and Critical congestions states. For example, the up triggers for the Minor, Major and Critical congestions states may be set to 50%, 70% and 90% respectively, whereas the down triggers for the Minor, Major and Critical congestion states may be set to 40%, 60% and 80%, respectively. This builds a 10% hysteresis gap, which may allow the DSA system to avoid frequent congestion state changes. The DSA components may be configured to use such hysteresis gaps between the up and down triggers to avoid frequent state changes. The hysteresis gap may set by an eNodeB 144. This hysteresis gap may be set or overwritten by a DSC 144.

A DSC 144 may be configured to overwrite the hysteresis gap set by an eNodeB 144 so as to enforce same hysteresis levels across the entire network. The DSC 144 may also be configured to increase or decrease the hysteresis gaps for different cell sites based on the cell site specific traffic model. For example, since traffic usage levels near a stadium may increase/decrease in large bursts, the DSC 144 may use larger hysteresis gaps (e.g., 15% vs. 10%) for the components that service the area surrounding the stadium.

Figure 25:
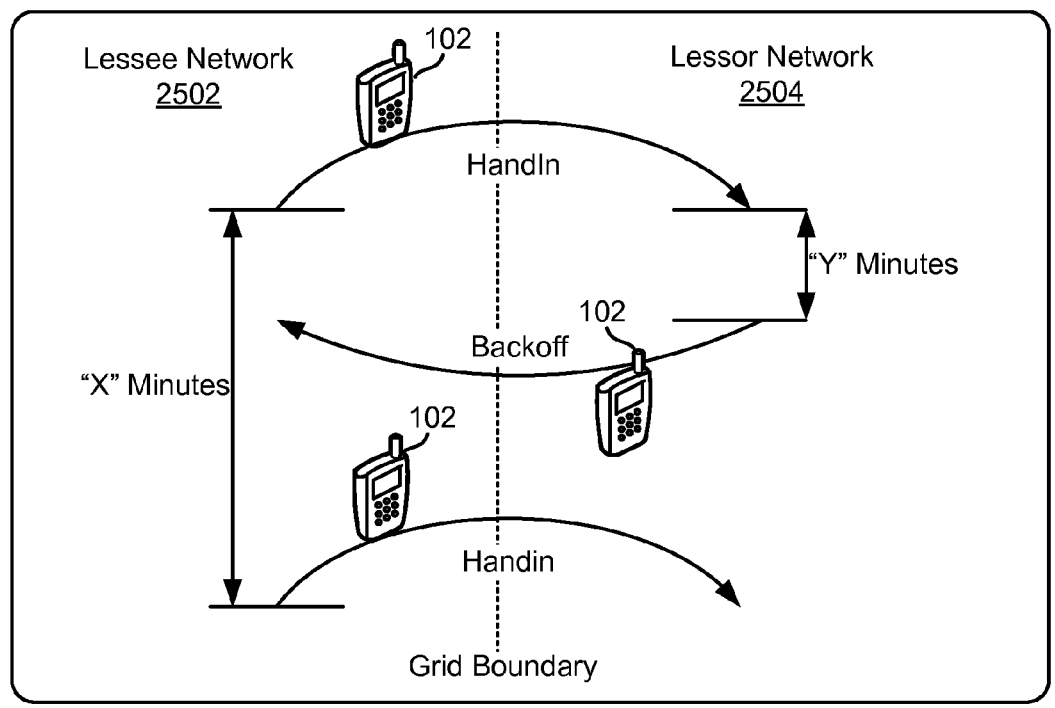
FIG. 25 is a block diagram illustrating the movements of a wireless device that is located close to a grid boundary and for which performing an embodiment ping-pong avoidance method may be beneficial.

FIG. 25 is an illustration of a wireless device 102 located close to a grid boundary (e.g., primary grid boundary 2202) for which performing embodiment ping-pong avoidance operations is beneficial. Specifically, FIG. 25 illustrates that the DSA system may perform handin and backoff operations each time the lessee wireless device 102 moves across the boundary to transfer the wireless device 102 between the lessee network 2502 and the lessor network 2504. If the wireless device 102 crosses the grid boundary frequently, performing such handin and backoff operations may be an inefficient use of resources. In an embodiment, the DSA components may be configured to use the buffer zone structure (e.g., in a grid-map) to determine whether to perform handin or backoff operations and so as to reduce the ping-pong effect caused by a wireless device 102 that frequently crosses the same grid boundary. That is, the DSA components may be configured to use the buffer zone structure to perform ping-pong avoidance operations.

The DSA components may also be configured to use a timer to further reduce the ping-pong effect. For example, a lessee DSC 144 may be configured to use time to not initiate handin operations for the same lessee wireless device 102 for "X" seconds (e.g., between 1 to 600 seconds) after the wireless device 102 crosses the grid boundary. Similarly, the lessor DSC may be configured to use a timer to not initiate backoff operations for a lessee wireless device for "Y" seconds (e.g., between 1 to 600 seconds) after the wireless device 102 crosses the grid boundary.

In an embodiment, the DSA components may be configured to perform load balancing operations based on inter-network mobility. For example, a lessee DSC 144 may be configured to perform the handin procedures so as to load balance its network load. For example, a lessor DSC 144 may load balance wireless devices 102 based on the overall load generated by both primary and secondary users. The lessor DSC 144 may also load balance the wireless devices 102 by capping resource usage by secondary wireless devices 102 in a cell while maintaining a balance of total load generated by both primary and secondary wireless devices 102.

FIG. 26 illustrates the movement of a wireless device 102 with respect to a leased grid boundary 2601, lessee cells 2602, and lessor cells/sectors 2603. FIG. 26 also illustrates that a coverage gap may be caused by lack of RF coverage from lessor cells/sectors 2603 (inside the leased grid) in the area where lessee cells/sectors 2602 have coverage. In these cases, attempting to handover lessee wireless devices to lessor cells/sectors 2603 may cause a handover failure soon after handing over to the lessor cell/sector 2603. To overcome these and other conditions caused by coverage gaps, the wireless device 102 may be configured to send measurement reports on a target network (in this case lessor's network) prior to initiating the handin operations. The measurement reports may include signal strengths of overlapped lessor cells/sectors 2603 measured by the wireless device 102. The DSC 144 may be configured to receive and use these measurement reports to identify target lessor cells/sectors to which the wireless device 102 is to be handed over.

In a further embodiment, the system may be configured to request two consecutive measurement reports from the wireless device 102 on the cells/sector(s) from the target network. The lessee cell may be configured to initiate the handin operations in response to receiving the second measurement report from the wireless device and/or based on signal strength reports (e.g., when two consecutive measurement reports have same or higher RSRP/RSRQ).

In the various embodiments, the DSA components may be configured to perform operations for handling coverage gaps in lessor network (within leased grid) during handin, handling coverage gaps in lessor network (within leased grid) during handoff, handling coverage gaps in lessee network (within leased grid) during backoff, handling coverage gaps caused by cell outages, and handling coverage gaps due to blacklisting of cell. The DSA components may be configured to respond to coverage gaps caused by cell outages and blacklisting may be applicable for both lessee and lessor networks, during the handin, handoff and backoff operations.

In an embodiment, the DSA components may be configured to manage coverage gaps during handoff operations. Generally, after a lessee wireless device 102 is handed over to the lessor network, any coverage gaps within lessor network are expected to be handled by lessor network's RF planning and handover algorithms. For example, SON in 3GPP specifies many approaches to find and address coverage gaps in an automated fashion. The Coverage and Capacity Optimization (CCO) function of SON in 3GPP LTE Release 10 and 11 describe some of the SON approaches to address coverage gaps, such as modification of antenna tilts, increasing or decreasing antenna power and minimization of drive tests by taking wireless device measurement and location-reporting features. In an embodiment, the DSA components may be configured to use these and other functions of CCO as the network continuously gathers measurements and suggests parameter changes, such as to change antenna tilt and power control parameters.

In various embodiments, the DSA components may be configured to manage coverage gaps during backoff operations, including backoff due to wireless device mobility, backoff due to congestion in the lessor network, backoff due to bid cancellation or bid withdraw, and backoff due to bid expiry. The DSA components may be configured to manage coverage gaps during backoff operations caused by wireless device mobility by selecting the target cell based on wireless device measurement reports. The DSA components may be configured to manage coverage gaps during backoff operations caused by congestion in lessor network by forcing the backoff operations and/or performing backoff operations quickly so that they do not result in a handover failure. The DSA components may be configured to manage coverage gaps during backoff operations caused by bid cancellation or withdraw by either forcing the backoff operations or by selecting the target cell based on wireless device measurement report on sectors from lessee network and requiring two consecutive measurement reports have same or higher RSRP/RSRQ The DSA components may be configured to manage coverage gaps during backoff operations caused by bid expiry by preparing the wireless devices 102 to measure signal strengths (RSRP/RSRQ) on the lessee network slightly ahead of bid expiry time.

In various embodiments, the DSA components may be configured to apply operator policies for wireless device selection during the handin and backoff operations. For example, a lessee DSC 144 may use the wireless device's service package (i.e., which services the wireless device is using for active calls), its DSA eligibility, and/or its priority. The order of these three parameters may be configurable at the DSC 144. The system may select an order for above three parameters, and the wireless devices 102 may be sorted according to that parameter order into a sorted wireless device list. This sorted wireless device list may be used for inter-network handovers, such as handins.

In an embodiment, the DSA components may be configured to select a target cell for an inter-network handover of a wireless device 102 based on that wireless device's measurement report on target network.

In various embodiments, the DSA components may be configured to generate and use blacklists. Blacklisting of cell sites refers to listing cell sites that are barred from a network for use by wireless devices and by neighboring cell sites during handover. The blacklisting may be temporary or for a long period of time. This may occur due to cell site maintenances, due to catastrophes at a cell site, or due to severe performance issues at the cell site.

A lessor network operator may identify the cells are not included in a blacklist, such as due to some special event or known performance problem. The DSC 144 may also determine the cells/sites that are to be included in a blacklist dynamically, based on network conditions. For example, the DSC 144 may add sites that are currently offline to the blacklist. The DSC 144 may also delist cells/sites from the blacklist to place them back into the general pool for DSA usage, such as when a site is back in service.

The blacklists may be communicated between lessor and lessee networks. This may be accomplished via a DPC 146 or a communication tunnel established between lessee and lessor DSCs 144, which is active during the bid duration time. The same tunnel may be used for coordinating target cell selection. The lessee and lessor DSCs 144 may use the blacklists to inform the eNodeBs 116 that are neighbors to cells/sectors that are impacted by the blacklisted cells. Those eNodeBs 116 may exclude the blacklisted cells from the partner network while considering target resources for handin or backoff operations. By using blacklists and ensuring two (or more) consecutive measurement reports are received from wireless device 102, the DSA components may better manage the impact of coverage gaps on the performance of the DSA system and the user experience.

A different case arises when cells/sectors operationally go down or become silent cells. Since the DSC 144 may be connected to the eNodeBs 116, the DSC 144 may detect cells going operationally down or becoming silent cells. In addition, the network operators may inform the DSC 144 that the cell/sectors operational status has changed. The DSC 144 may communicate both blacklists and operational status changes to other DSCs 144 for cells/sectors that are in the primary grid or in the buffer zone. For example, after a DSC 144 receives information regarding a cell's operational status, it may communicate this information to a partner DSC 144 for the bid. The partner DSC 144 may then communicate the cell/sector status to all relevant eNodeBs 116 who are neighbors to the other network's cell/sector. The eNodeBs 116 may then use this information to make more intelligent handover decisions.

Since a wireless device 102 may include silent cells in its measurement reports, the source eNodeB 116 may not be able to detect the presence of such cells. A sleeping cells is one in which the eNodeB 116 is transmitting but does not accept hand-ins. To overcome these and other conditions, the DSA components may be configured to perform handin pre-planning operations.

A lessee DSC 144 may be configured to keep track of lessee wireless devices 102 eligible for resources allocation that are currently attached to cells in and around a bid's grid. This is a list of candidate wireless devices for handin. This list may be updated to remove wireless devices if a wireless device detaches from one of these cells/sectors, and add a new wireless device to the list if a new wireless device attaches to one of these cells. Similarly, the DSC 144 may store a list of wireless devices 102 that are currently attached to cells in buffer zone.

Before the bid start time (e.g., X minutes ahead of bid start time) the lessee DSC 144 queries the MMEs 130 in its network to retrieve the list of DSA eligible wireless devices 102 that are attached to lessee cells inside the lessor's leased grid. This list of wireless devices may be included in a handin candidate list. When a wireless device detaches from or attaches to a lessee cell within the leased grid, MME's 130 notifications will trigger the DSC 144 to update the handin candidate list. The "X" minutes is time to prepare the handin, but the list continuously changes as wireless devices move around. Thus, when the bid start time occurs, the DSC 144 may initiate handin operations for the wireless devices that are in handin candidates list. This list may be sorted based on the operator policies of the order chosen for wireless device's service package, DSA eligibility, and priority.

The DSC 144 may request eNodeBs 116 in the grid to initiate handin operations for specific wireless device 102, which may be identifies based on their inclusion in a handin candidate list. The DSC 144 may be configured to initiate handins from the center of the grid outward to edge of buffer zone. After all the wireless devices 102 identified in candidate list are moved or transferred, the DSC 144 may initiate handin operations for the wireless devices 102 that are attached to cells/sectors in buffer zone.

In an embodiment, the DSC 144 may be configured to give preference or a higher priority to the wireless devices 102 included in the handin candidate list. As an example, new wireless devices may attach to cells/sectors in grid while the DSC 144 is performing handin operations for the wireless devices 102 attached to cells/sectors in buffer zone. As such, these new wireless devices may be added to handin candidate list after this list has been processed by the DSC 144. In such cases, the DSC 144 may be configured stop further handins for the wireless devices 102 attached to cells/sectors in buffer zone, and initiate handin operations for new wireless devices 102 added to the handin candidate list.

A lessor eNodeB 116 may be configured select a target cell based on wireless device's measurement reports and/or in response to determining that the target cell has the highest RSRP/RSRQ value among lessor cells reported by the wireless device.

In various embodiments, the DSA components may be configured to perform handoff pre-planning operations. As an example, the lessor network may closely track the location of a lessee wireless device 120 after the lessee wireless device 102 is handed into the lessor network so that it may quickly initiate backoff operations if the wireless device 102 exits the grid boundary (which may identified in the grid-map). This is to protect the radio and network resources of lessor network outside the grid boundary. However, the lessor resources may be still in use in the buffer zone (which may also be identified via the grid-map) during backoff, which may slow the backoff operations or cause a handover failure. By performing handoff pre-planning operations, the various embodiments prepare the lessee wireless devices 102 for backoff so as to ensure that a wireless device 102 that exits the grid boundary may be handed over quickly, accurately, and efficiently.

Performing handoff pre-planning operations may include configured each eNodeB 116 to periodically report its load factor to the DSC 144, such as by sending congestion state information and an attached wireless device list to the DSC 144. The DSC 144 may be configured to send this information to each neighboring eNodeB 116 or cell (which may be identified by the neighbor cell list in the grid-map). The eNodeBs 114 may use this information when selecting a target cell for an intra-network handover. The eNodeBs 114 may then (without the involvement of the DSC 144) determine whether to handover a lessee wireless device 102 to target lessor eNodeB 116 or to prepare the wireless device for backoff.

For example, an eNodeB 116 may be configured to perform handover operations in response to determining that a neighbor target eNodeB 116 or cell is inside the leased grid (e.g., is included in the primary grid cell list). The eNodeB 116 may be configured to perform backoff operations in response to determining that a neighbor target eNodeB 116 or cell is in the buffer zone (e.g., is included in the buffer zone cell list). By allowing the eNodeBs 114 to select a target cell for handoff, the various embodiments reduce latency and improve performance.

In various embodiments, the DSA components may be configured to perform backoff pre-planning operations. A backoff procedure may be initiated for a number of reasons/cases, including wireless device mobility, congestion, bid cancel/withdrawal, and bid expiry. The DSA components may be configured to perform backoff pre-planning operations that are specific to each of these cases.

In an embodiment, the DSA components may be configured to perform backoff pre-planning operations to better support backoff operations that are initiated due to wireless device mobility. As part of these operations, a lessor DSC 144 may add a lessee wireless device 102 to a backoff candidate list when that wireless device 102 is handed over from a cell/sector in the primary grid to a cell/sector in the buffer zone. The lessee DSC 144 may initiate backoff operations for the wireless device 102 listed in backoff candidate list by sending a backoff request to its corresponding eNodeB 116. A lessor eNodeB 116 in the buffer zone may using the neighboring lessee cells/sectors information and wireless device's measurement report on target network to select a target cell and initiate the handover operations. In an embodiment, the eNodeB 144 may be configured to select a lessee cell that is identified in wireless device measurement report as having the strongest RSRP/RSRQ value as the target cell.

In an embodiment, the DSA components may be configured to perform backoff pre-planning operations to better support backoff operations that are initiated by a DSC 144 due to congestion in its network. As part of these operations, the eNodeBs 114 may be configured to receive and store a list of neighboring lessee cells/sectors and measurement reports for each lessee wireless device 102. An eNodeB 114 in primary grid and buffer zone may select a target cell from the list of neighboring lessee cells/sectors. A lessor eNodeB 116 may use the most recent measurement report from the wireless device 102 (within last few 100 milliseconds of time) to select the best target cell. If no such measurement report is available for the wireless device 102 (due to either not present or the measurement report older than the time window configured), the lessor eNodeB 116 may select any suitable target eNodeB 116 from the list of neighboring lessee cells.

In an embodiment, the DSA components may be configured to perform backoff pre-planning operations to better support backoff operations that are initiated due to bid expiry. That is, around the time of bid expiry, the DSC 144 may select lessee wireless devices 102 that are attached to cells/sectors in the primary grid and buffer zone may be selected for backoff. The backoff operations may be performed from the grid boundary to center of the grid. This is because the wireless devices 102 that are attached to border cells on the grid are more likely (with 50% probability) to move out of the grid and enter buffer zone.

In the various embodiments, the DSA components may be configured to perform the backoff operations based on various parameters, including the wireless device's service package, wireless device's TPA priority, wireless device's location within the grid (i.e., on the border of grid or interior to the grid and how interior, if the grid is of large size), total number of wireless device's still attached to cells/sectors in the grid, remaining time for bid expiry, and target pacing rate of backoff (to cap the CPU processing time).

In an embodiment, the DSA components may be configured to perform the backoff operations in response to determining that a wireless device is idle. An idle wireless device may be a device that is in ECM-IDLE state (i.e., no RRC connection). A lessee wireless device 102 may also become idle after it is handed into the lessor network. The lessor DSC 144 and/or eNodeB 116 components may be configured to determine that a wireless device is idle in response to determining that the wireless device 102 has not transmitted or received data for a period of time. The lessor DSC 144 may be configured to identify and move idle wireless devices 102 back to lessee network after a bid expired or the bid's resources are consumed above a pre-configured threshold.

Figure 27:
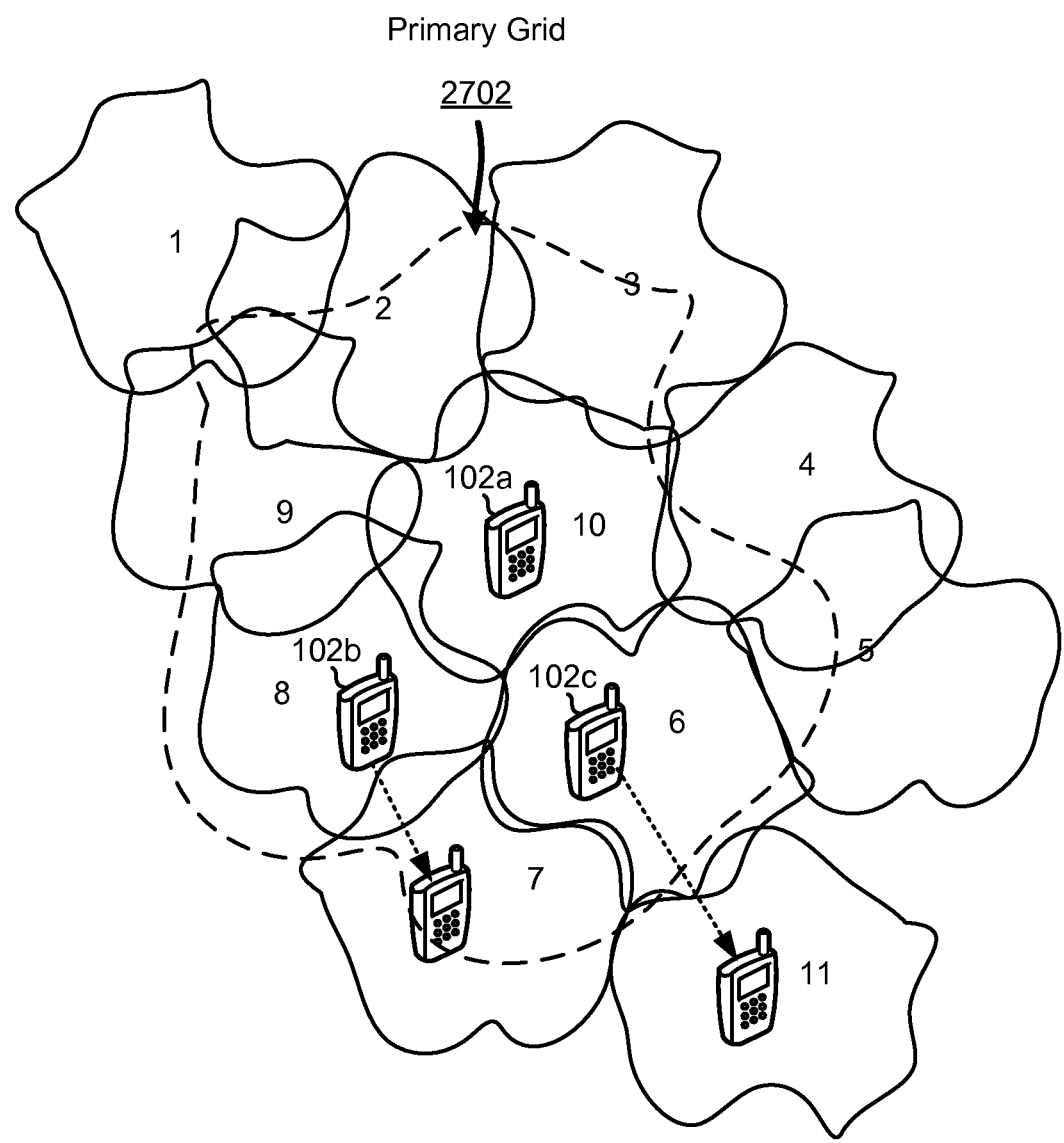
FIG. 27 is an illustration of the locations of various wireless devices with respect to a primary grid and tracking areas and for which performing an embodiment move-back method may be beneficial.

FIG. 27 illustrates the location of various wireless devices 102 a-c with respect to a lessor's primary grid 2702 and tracking areas 1-11 that are completely or partially inside the primary grid 2702. The DSA components may be configured to use the different tracking areas 1-11 and wireless device mobility to better manage transferring idle wireless devices back to the lessee network after bid expiry.

In the example illustrated in FIG. 27, each of the wireless devices 102 a-c is idle. Wireless device 102a as is not mobile and is still positioned inside the primary grid 102a after bid expiry. Wireless device 102b has moved from traffic area 8 to traffic area 7, which is inside the primary grid 2702. Wireless device 102c has moved from traffic area 6 to traffic area 11, which is outside the primary grid 2702.

The wireless devices 102a-c may be configured to report to an MME 130 each time they enter a different tracking area or each time they enter a tracking area that is not yet registered with that MME 130. The MME 130 store information identifying each of the tracking areas the wireless devices 102 traverse.

For example, wireless device 102b may be configured to determine that it has moved from tracking area 8 to tracking area 7, determine whether tracking area 7 has previously been reported/registered with the MME 130, and send a tracking area update message to MME 130 in response to determining that tracking area 7 has not previously been reported/registered with the MME 130. The MME 103 may receive the tracking area update message, determine that the wireless device 102b is a lessee device (via its IMSI value), and communicate with a MME (which has prior knowledge of tracking areas of the grid) to validate the tracking area update message. The MME 130 may register tracking area 7 for wireless device 102b and send a tracking area update accept message to the wireless device 102b in response to determining that the received tracking area update message is valid.

As another example, wireless device 102c may be configured to determine that it has moved from tracking area 6 to tracking area 11, determine whether tracking area 11 has previously been reported/registered with the MME 130, and send a tracking area update message to MME 130 in response to determining that tracking area 11 has not previously been reported/registered with the MME 130. The MME 103 may receive the tracking area update message, determine that the wireless device 102b is a lessee device (via its IMSI value), and communicate with a MME (which has prior knowledge of traffic areas of the grid) to validate the tracking area update message. In this case, the MME determines that tracking area 11 is outside the primary grid boundary 2702, and thus does not validate the tracking area update message. As such, the MME 130 sends a tracking area update reject message to wireless device 102c to indicate that the roaming not allowed in that tracking area. The wireless device 102c may be configured to perform PLMN selection operations in response to receiving the tracking area update reject message, as the lessee wireless device is not allowed to roam outside the grid boundary 2702.

Around bid expiry time (or bid cancel/withdrawal), the DSC 144 may request the MME to initiate move-back operations for the lessee wireless devices 102a and 102b (wireless device 103c has moved outside the primary grid 2702). The DSC 144 may select the order in which the lessee wireless devices 102a and 120b are handed back to the lessee network by sending the MME an ordered list of idle devices.

The MME may send a communication message to cause the MME 130 to perform move-back operations for the idle lessee wireless devices 102a and 102b. In response, the MME 130 may page the wireless devices 102a-102b and cause them transition from an ECM-IDLE state to an ECM-CONNECTED state at MME 130. The MME 120 may inform the MME about ECM state change for the wireless devices 102a and 102b. MME may then send a communication message to the DSC 130 to indicate the ECM state changes. The DSC 144 may determine that the ECM state changes where for lessee wireless devices 102a and 102b, and then initiate a backoff procedure for these devices by requesting that their eNodeBs 114 perform backoff operations to transfer these devices to the lessee network.

Generally, when there is a successful bid as a result of performing DSA operations (e.g., after a lessee network wins/purchases a resource), the lessee and lessor DSCs 144 may perform various operations for establishing the geographical boundaries within which a wireless device is to be handed into a particular lessee or lessor network. In an embodiment, the operations for establishing the geographical boundaries may include generating the grid-map structure discussed above.

After the geographical boundaries are established and the DPC allocates the won/purchased resources for access and use by the lessee network in the geographical area, a lessee DSC 144 may be required to identify the active wireless devices 102 that are in the geographical area (i.e., in the bid grid, bid area, primary grid, etc.) and candidates to be handed over to lessor network (i.e., candidates for handin).

Figure 28A:
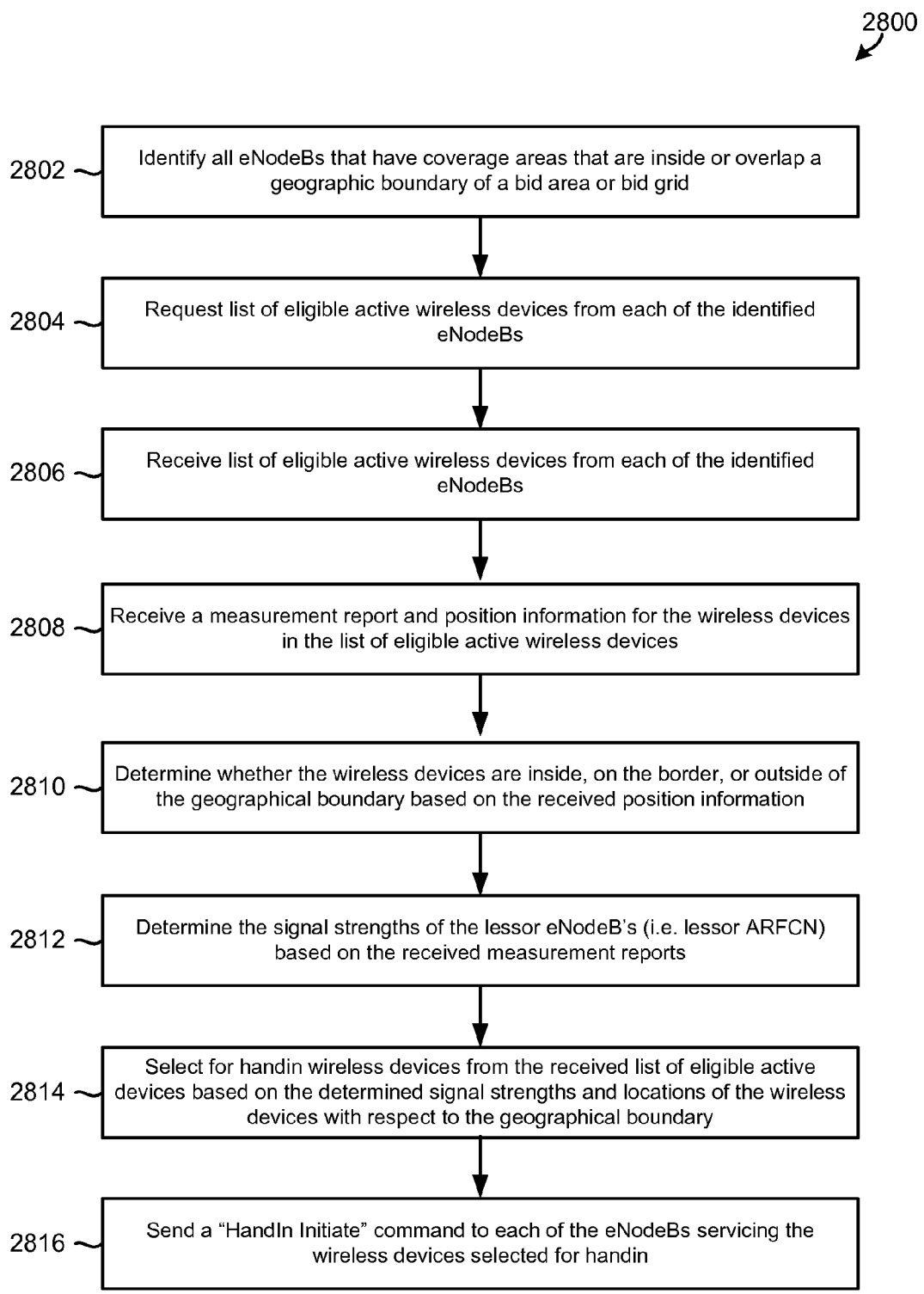
FIGS. 28A and 28B are process flow diagrams illustrating embodiment DSA methods of performing handin operations.

FIG. 28A illustrates an embodiment method 2800 for intelligently identifying the wireless devices that are in the bid's geographical boundary and candidates for handin. Method 2800 may be performed in a processing core of a DSC 144 component.

In block 2802, the processing core may identify all eNodeBs that have coverage areas that are inside or overlap a geographic boundary of a bid area or bid grid. For example, the processing core may query a database that stores the GPS locations of the eNodeBs (e.g., of eNodeB's cell tower's) in its network and/or for which the DSC 144 is responsible/managing. The processing core may query this database to identify the locations of eNodeBs, compute their coverage areas, and determine whether their coverage areas are inside, overlap, or close to the geographic boundary. The processing core may compute the coverage area of cell using that cell's cell-radius (in miles). In another embodiment, the processing core may identify the eNodeBs via the grid-map structure.

In block 2804, the processing core may request a list of eligible active wireless devices from each of the identified eNodeBs. In block 2806, the processing core may receive a list of eligible active wireless devices from each of the identified eNodeBs. In block 2808, the processing core may receive measurement reports and position information for each of the wireless devices in the lists of eligible active wireless devices received from the identified eNodeBs. In block 2810, the processing core may determine whether the wireless devices included in the received lists of eligible active wireless devices are inside, on the border, or outside of the geographical boundary based on the received position information. In an embodiment, the processing core may also determine how far outside of the geographical boundary the wireless devices are located. In block 2812, the processing core may determine the signal strengths of the lessor eNodeB's (i.e. lessor ARFCN) based on the received measurement reports.

In block 2814, the processing core may select for handin operations the wireless devices included in the received list of eligible active devices based on the determined signal strengths and/or locations of the wireless devices with respect to the geographical boundary. In block 2816, the processing core may send a "HandIn Initiate" command to each of the eNodeBs servicing the wireless devices selected for the handin operations.

Figure 28B:
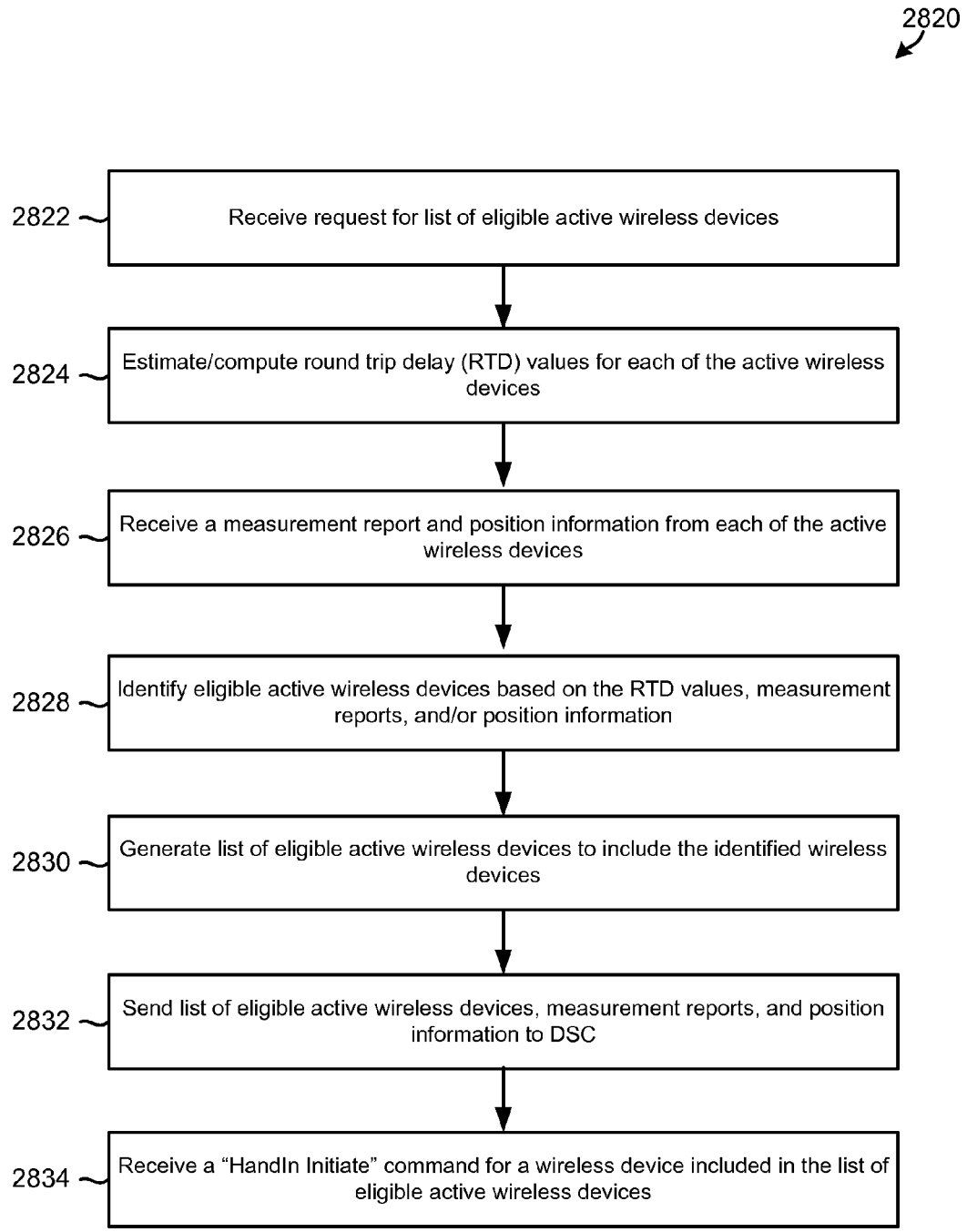

FIG. 28B illustrates an embodiment eNodeB method 2820 for intelligently forming handin operations. Method 2820 may be performed in a processing core of a eNodeB 116 component.

In block 2822, the processing core may receive a request for a list of eligible active wireless devices from a DSC 144 component. In block 2824, the processing core may compute or estimate round trip delay (RTD) values for each of the active wireless devices that are attached to the eNodeB 116. This may be accomplished by useing LTE positioning techniques, a Enhanced Cell ID (ECID), Assisted Global Navigation Satellite Systems (A-GNSS), Observed Time Difference of Arrival (OTDOA), LTE Positioning Protocol (LPP), or Secure User Plane Location (SUPL) protocols, or any combination of these techniques.

In block 2826, the processing core may request and receive measurement reports and position information from each of the active wireless devices. In block 2828, the processing core may identify the eligible active wireless devices based on the RTD values, measurement reports, and/or position information. In block 2830, the processing core may generate list of eligible active wireless devices to include the identified wireless devices. In block 2832, the processing core may send a list of eligible active wireless devices, measurement reports, and position information to the DSC 144 component. In block 2834, the processing core may receive a "HandIn Initiate" command for a wireless device included in the list of eligible active wireless devices from the DSC 144 component.

Figure 29:
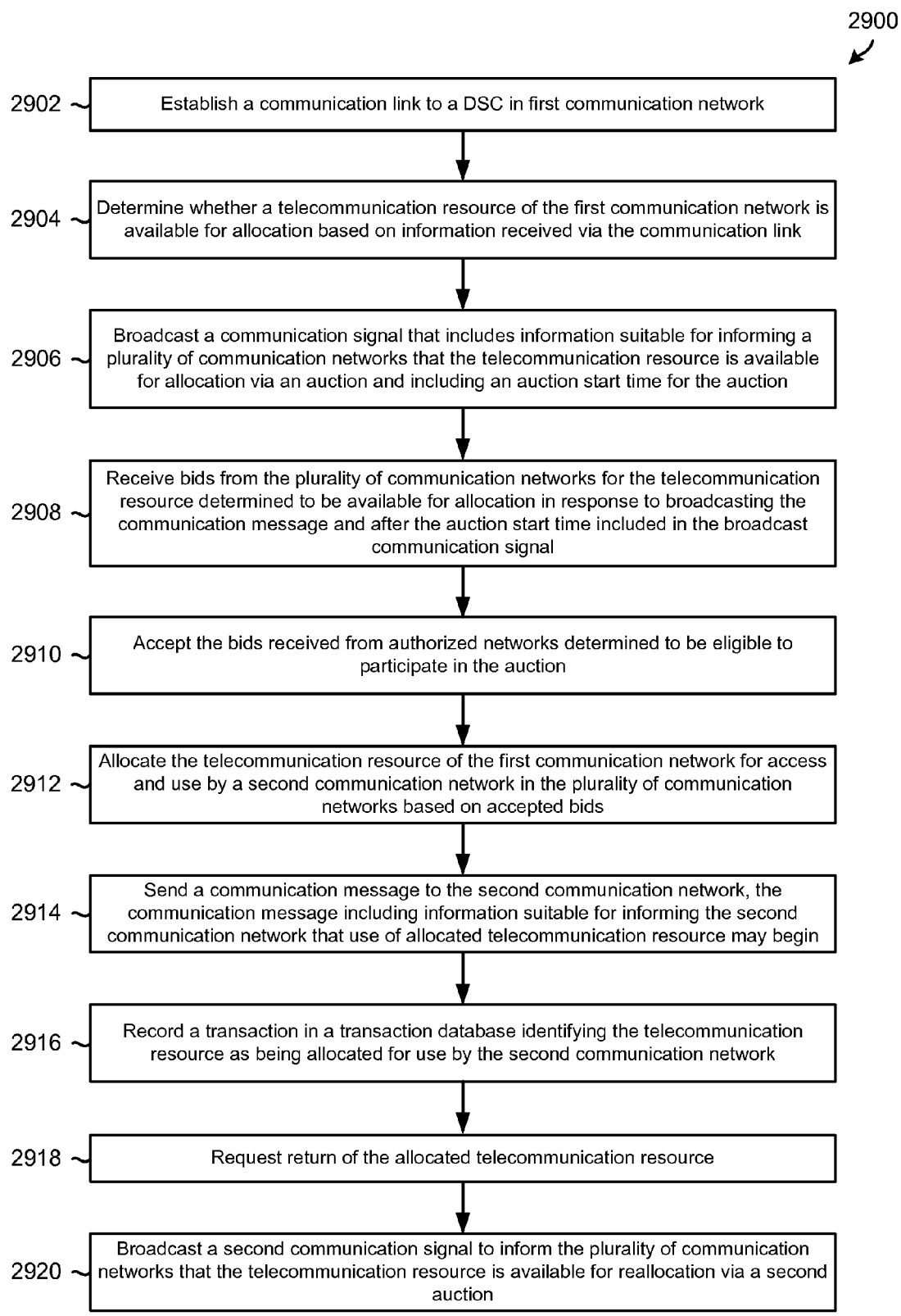
FIGS. 29 and 30 are process flow diagrams illustrating embodiment DSA methods of allocating and de-allocating resources between different networks.

FIG. 29 illustrates an embodiment DSA method 2900 of allocating resources in a first communication network for access and use by a second communication network. The operations of DSA method 2900 may be performed by a processing core of a DPC 146 component.

In operation 2902, a DPC 146 component may establish a communication link to a DSC 144a in first communication network. In operation 2904, the DPC 146 may determine whether a telecommunication resource of the first communication network is available for allocation based on information received via the communication link. In an embodiment, the DPC 146 may determine that the telecommunication resource is available for allocation at a future date and time.

In operation 2906, the DPC 146 may broadcast a communication signal that includes information suitable for informing a plurality of communication networks that the telecommunication resource is available for allocation via an auction and including an auction start time for the auction. In operation 2908, the DPC 146 may receive bids from the plurality of communication networks for the telecommunication resource determined to be available for allocation in response to broadcasting the communication message and after the auction start time included in the broadcast communication signal. In an embodiment, receiving bids from the plurality of communication networks may include receiving bids for access and use of the telecommunication resource determined at the future date and time.

In operation 2910, the DPC 146 may accept only the bids received from authorized networks determined to be eligible to participate in the auction. For example, the DPC 146 may determine whether the telecommunication resource is compatible with each of the plurality of communication networks, authorize networks in the plurality of communication networks as being eligible to participate in the auction based on their compatibility with the telecommunication resource, and accept bids from only the authorized networks.

In operation 2912, the DPC 146 may allocate the telecommunication resource of the first communication network for access and use by a second communication network in the plurality of communication networks based on accepted bids. In an embodiment, allocating the telecommunication resource may include allocating the telecommunication resource of the first communication network for access and use by the second communication network at the future date and time. In operation 2914, the DPC 146 may send a communication message to the second communication network that includes information suitable for informing the second communication network that use of allocated telecommunication resource may begin. In operation 2916, the DPC 146 may record a transaction in a transaction database identifying the telecommunication resource as being allocated for use by the second communication network.

In operation 2918, the DPC 146 may request return of the allocated telecommunication resource. In operation 2920, the DPC 146 may broadcast a second communication signal to inform the plurality of communication networks that the telecommunication resource is available for reallocation via a second auction.

Figure 30:
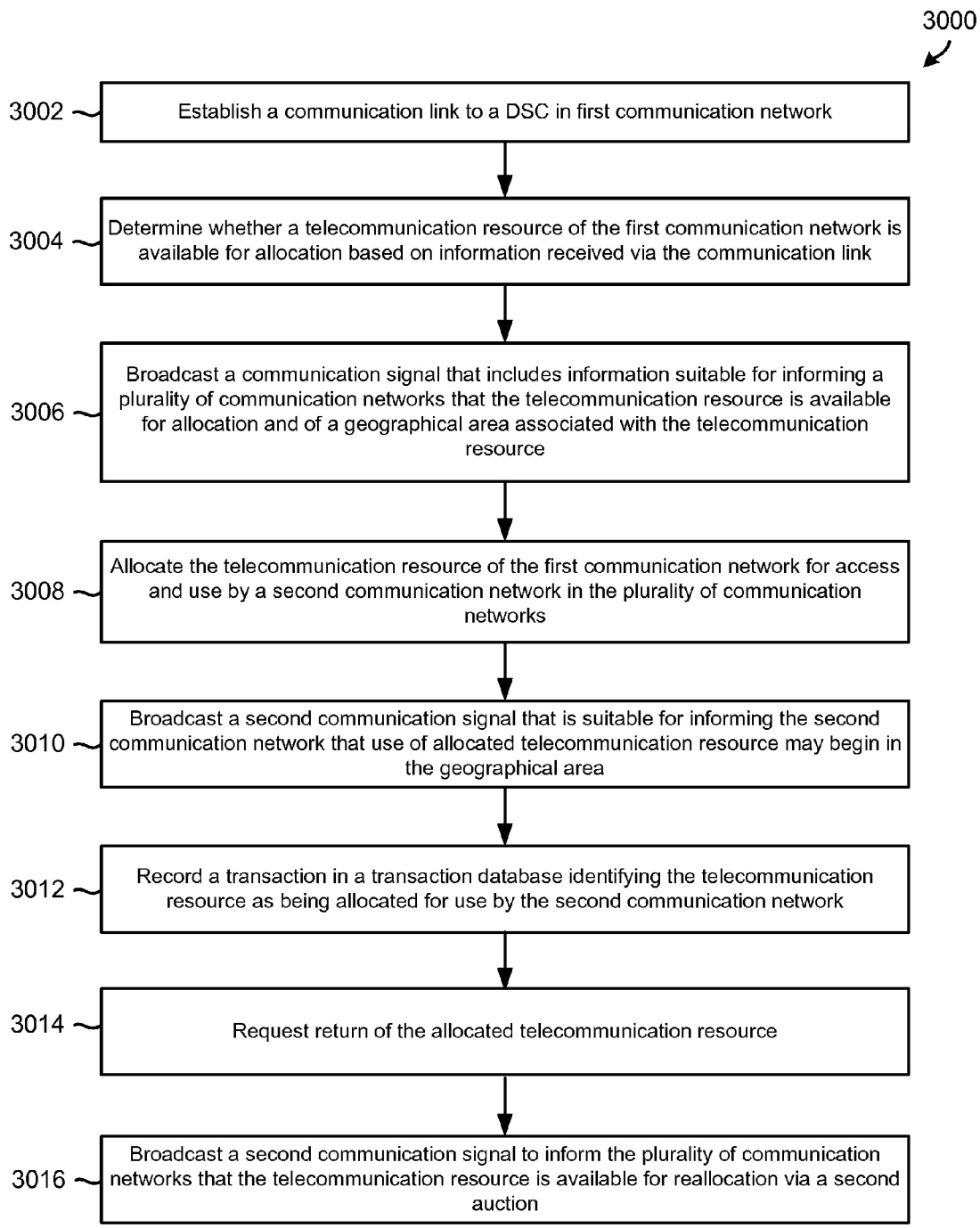

FIG. 30 illustrates another embodiment DSA method 3000 of allocating resources in a first communication network for access and use by a second communication network. The operations of DSA method 3000 may be performed by a processing core of a DPC 146 component.

In block 3002, the DPC 146 component may establish a communication link to a DSC 144a in first communication network. In block 3004, the DPC 146 component may determine that a resource in a first communication network is available for allocation. In block 3006, the DPC 146 component may broadcast a first communication signal informing a plurality of communication networks that the resource is available for allocation and of a geographical area associated with the resource. In block 3008, the DPC 146 component may allocate the resource of the first communication network for access and use by a second communication network in the plurality of communication networks. In block 3010, the DPC 146 component may broadcast a second communication signal informing the second communication network that use of allocated telecommunication resource may begin in the geographical area. In block 3012, the DPC 146 component may record a transaction in a transaction database identifying the telecommunication resource as being allocated for use by the second communication network.

In operation 3014, the DPC 146 component may request return of the allocated telecommunication resource. In operation 3016, the DPC 146 may broadcast a second communication signal to inform the plurality of communication networks that the telecommunication resource is available for reallocation via a second auction.

In an embodiment, the DSA method 3000 may further include the DPC 146 component receiving resource configuration information relating to a resource allocation scheme from a first DSC 144 in the first communication network and sending the resource configuration information to a second DSC 144 in the second communication network. In a further embodiment, the DSA method 3000 may include the DPC 146 component receiving coordination information relating to availability of the telecommunication resource based on geographical areas from the first DSC 144 and sending the coordination configuration information to the second DSC 144.

In a further embodiment, the DPC 146 component may be configured to negotiate a resource leasing scheme between the first and second communication networks for a use of the resource, and coordinating a handover of a mobile device between the first and second communication networks based on geographic boundaries defined in the resource leasing scheme. The DPC 146 may be further configured to determine the validity of a subscriber device (e.g., wireless device 102) of the second communication network based on the proximity of the subscriber device to the geographical area, level of quality of service available to the subscriber device, and/or information included in the resource leasing scheme.

In various embodiments, the DPC 146 may be configured to instruct the subscriber device to change networks or to establish a communication link to a resource in the first communication network based on the proximity of the subscriber device to the geographical area, level of quality of service available to the subscriber device, and/or terms of the resource leasing scheme. The DPC 146 may be configured to instruct a subscriber device that is actively connected to or using the telecommunication resource to change networks and/or to attach to another resource based on the proximity of the subscriber device to the geographical area.

The various embodiments may include or use a dynamic spectrum arbitrage application part (DSAAP) protocol and/or component that is configured to allow, facilitate, support, or augment communications between two or more DSA components (e.g., DPC, DSC, eNodeB, MME, HSS, etc.) so as to improve the efficiency and speed of the DSA system. A DSA component may be any component discussed in this application and/or any component that participates in any of the DSA operations, communications, or methods discussed in this application. As such, the DSAAP component(s) may be configured to allow, facilitate, support, or augment communications between any of the components discussed in this application, including the communications between a DPC component and a DSC component, between the DSC component and a eNodeB component, between the DSC component and an MME component, between the DSC component and an HSS component, between the MME component and the HSS component, between the eNodeB component and a wireless device, etc.

To facilitate the communications between two or more DSA components, the DSAAP component(s) may publish application programming interfaces (API) and/or include client modules that facilitate communications between the DSA components. In addition, the DSAAP component(s) may be configured to allow the DSA components to communicate specific information, use specific communication messages, and/or perform specific operations that together provide various DSA functions that further improve the efficiency and speed of the DSA system and participating networks.

As an example, the DSAAP component(s) may be configured to allow an eNodeB to communicate with a DSC component (e.g., via the Xe interface), with other eNodeBs (e.g., via an X2 interface), and with various other components (e.g., via the S1 interface). As a further example, the DSAAP component(s) may be configured to allow, facilitate, support, or augment communications between the DSC component and the DPC component so as to allow the DPC and/or DSC components to better pool resources across the different networks, better monitor traffic and resource usage in the various networks, to more efficiently communicate bids and bidding information, to quickly and efficiently register and deregister components, and better perform backoff operations. The DSAAP component(s) may also improve the DSA resource auctioning operations by improving the performance and efficiency of the procedures for bidding, generating invoices, advertising resources, requesting resources, purchasing resources, validating bid credentials, etc.

In the various embodiments, all or portions of the DSAAP component may be included in one or more DSA components, such as a DPC component, a DSC component, an eNodeB component, an MME component, and an HSS component. The DSAAP component may be implemented in hardware, software, or a combination of hardware and software. In an embodiment, the DSAAP component may be configured to implement a DSAAP protocol, which may be defined over the Xe, Xd, and/or X2 reference points. In various embodiments, the Xe reference point between DSC and eNodeB may use the DSAAP protocol, TR-069 protocol, and/or TR-192 data model extensions to support listing available resources at the eNodeB and notifying the eNodeB of bid/buy confirmations. The Xd reference point between DSC and DPC may use the DSAAP protocol for dynamic spectrum and resource arbitrage operations. The X2 interface/reference point between the eNodeBs may also use the DSAAP protocol to communicate information.

In various embodiments, the DSAAP component(s) may be configured to allow the various DSA components (e.g., DSC, DPC, eNodeB, etc.) to communicate using the DSAAP protocol and/or to perform various DSAAP methods. DSAAP methods may be performed in any of the DSA systems discussed in this application, such as a system that includes a first DSC server in a first telecommunication network (e.g., a lessee network), a second DSC server in second telecommunication network (e.g., a lessor network), and a DPC server that is outside of the first and second telecommunication networks.

Figure 31:
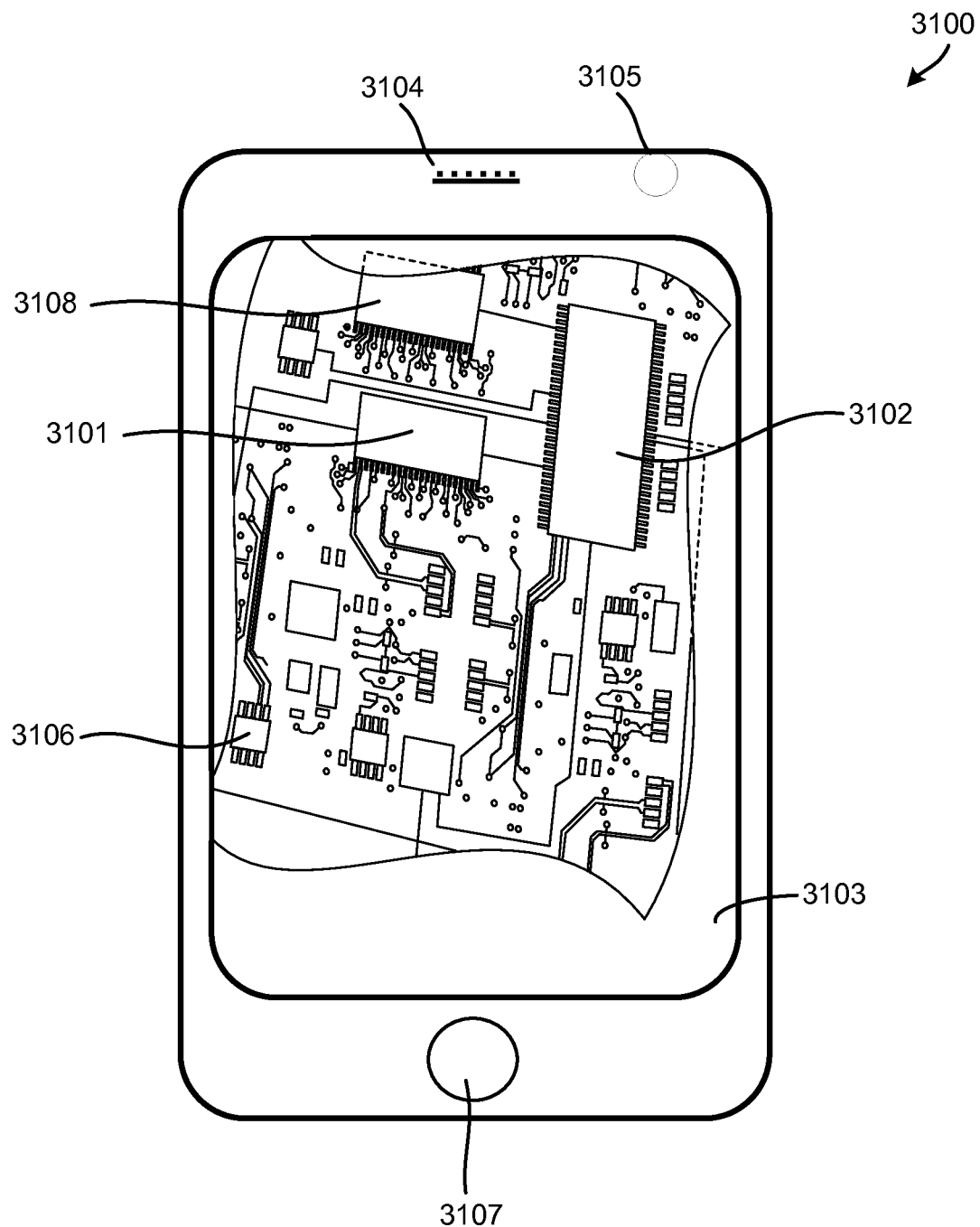
FIG. 31 is a component block diagram of an example wireless device suitable for use with the various embodiments.

The various embodiments may be implemented on a variety of mobile wireless computing devices, an example of which is illustrated in FIG. 31. Specifically, FIG. 31 is a system block diagram of a wireless transceiver device in the form of a smartphone/cell phone 3100 suitable for use with any of the embodiments. The cell phone 3100 may include a processor 3101 coupled to internal memory 3102, a display 3103, and to a speaker 3104. Additionally, the cell phone 3100 may include an antenna 3105 for sending and receiving electromagnetic radiation that may be connected to a wireless data link and/or cellular telephone transceiver 3106 coupled to the processor 3101. Cell phones 3100 typically also include menu selection buttons or rocker switches 3107 for receiving user inputs.

A typical cell phone 3100 also includes a sound encoding/decoding (CODEC) circuit 3108 which digitizes sound received from a microphone into data packets suitable for wireless transmission and decodes received sound data packets to generate analog signals that are provided to the speaker 3104 to generate sound. Also, one or more of the processor 3101, wireless transceiver 3106 and CODEC 3108 may include a digital signal processor (DSP) circuit (not shown separately). The cell phone 3100 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 32:
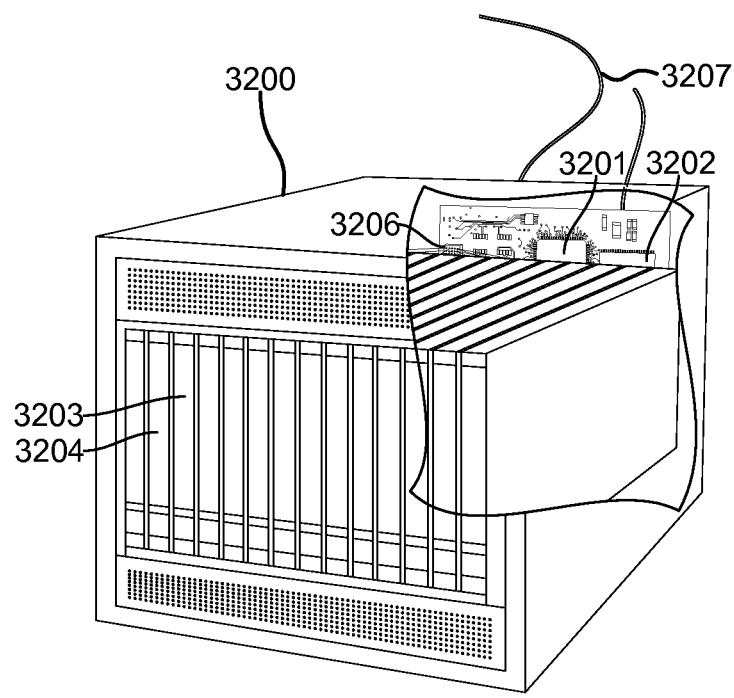
FIG. 32 is a component block diagram of a server suitable for use with an embodiment.

The embodiments described above, including the spectrum arbitrage functions, may be implemented within a broadcast system on any of a variety of commercially available server devices, such as the server 3200 illustrated in FIG. 32. Such a server 3200 typically includes a processor 3201 coupled to volatile memory 3202 and a large capacity nonvolatile memory, such as a disk drive 3203. The server 3200 may also include a floppy disc drive, compact disc (CD) or DVD disc drive 3204 coupled to the processor 3201. The server 3200 may also include network access ports 3206 coupled to the processor 3201 for establishing data connections with a network 3207, such as a local area network coupled to other communication system computers and servers.

The processors 3101, 3201, may be any programmable microprocessor, microcomputer or multiple processor chip or chips that can be configured by software instructions (applications) to perform a variety of functions, including the functions of the various embodiments described below. In some wireless devices, multiple processors 3201 may be provided, such as one processor dedicated to wireless communication functions and one processor dedicated to running other applications. Typically, software applications may be stored in the internal memory 3102, 3202, before they are accessed and loaded into the processor 3101, 3201. The processor 3101, 3201 may include internal memory sufficient to store the application software instructions. In some servers, the processor 3201 may include internal memory sufficient to store the application software instructions. In some receiver devices, the secure memory may be in a separate memory chip coupled to the processor 3101. The internal memory 3102, 3202 may be a volatile or nonvolatile memory, such as flash memory, or a mixture of both. For the purposes of this description, a general reference to memory refers to all memory accessible by the processor 3101, 3201, including internal memory 3102, 3202, removable memory plugged into the device, and memory within the processor 3101, 3201 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A dynamic spectrum arbitrage (DSA) method, comprising:
   receiving, via a processor of server computing device that is configured to perform DSA operations to dynamically allocate telecommunication resources of one telecommunication network for access and use by another telecommunication network, a notification message that identifies a successful bidder for a geographical area;
   generating, via the processor, a grid-map structure that includes a primary grid structure that identifies telecommunication cells in the geographical area;
   monitoring, via the processor, locations of wireless devices; and
   determining, via the processor, whether to initiate inter-network handover operations based on the locations of the wireless devices with respect to the telecommunication cells of the primary grid structure.

2. The DSA method of claim 1, wherein:
   receiving the notification message identifying the successful bidder for the geographical area comprises receiving a message identifying a first telecommunication network as the successful bidder in a dynamic spectrum controller (DSC) in the first telecommunication network;
   monitoring locations of wireless devices comprises monitoring the locations of wireless devices attached to a first eNodeB in the first telecommunication network; and
   determining whether to initiate inter-network handover operations based on the locations of the wireless devices with respect to the telecommunication cells of the primary grid structure comprises determining whether to initiate handin operations to transfer the wireless devices attached to the first eNodeB to a second eNodeB in a second telecommunication network.

3. The DSA method of claim 1, wherein:
   receiving the notification message identifying the successful bidder for the geographical area comprises receiving a message identifying a first telecommunication network as the successful bidder in a dynamic spectrum controller (DSC) in a second telecommunication network;
   monitoring locations of wireless devices comprises monitoring a location of a wireless device that subscribes to the first telecommunication network and is attached to an eNodeB in the second telecommunication network; and
   determining whether to initiate inter-network handover operations based on the locations of the wireless devices with respect to the telecommunication cells of the primary grid structure comprises determining whether to initiate backoff operations to transfer the wireless device that subscribes to the first telecommunication network and is attached to the eNodeB back to the first telecommunication network.

4. The DSA method of claim 3, wherein the operation of determining whether to initiate backoff operations to transfer the wireless device that subscribes to the first telecommunication network and is attached to the eNodeB back to the first telecommunication network is performed in response to one of:
   determining that resource lease period has ended;
   determining that the eNodeB is congested; and
   determining that the wireless device has moved outside of the geographical area.

5. The DSA method of claim 1, wherein receiving the notification message identifying the successful bidder for the geographical area comprises receiving a message identifying a first telecommunication network as the successful bidder in a dynamic spectrum controller (DSC) in the first telecommunication network, the DSA method further comprising:
   allocating telecommunication resources of a second telecommunication network for access and use by wireless devices of the first telecommunication network based on the generated grid-map structure.

6. The DSA method of claim 1, wherein generating the grid-map structure that includes the primary grid structure that identifies the telecommunication cells in the geographical area further comprises:
   classifying each of the telecommunication cells of the primary grid structure as being one of an interior cell and a border cell.

7. The DSA method of claim 6, wherein generating grid-map structure that includes the primary grid structure that identifies the telecommunication cells in the geographical area comprises generating the grid-map structure to further include a buffer zone structure that identifies the telecommunication cells that are adjacent to the border cell.

8. The DSA method of claim 7, wherein generating the grid-map structure to include the buffer zone structure comprises generating the buffer zone structure to include multiple tiers.

9. The DSA method of claim 7, further comprising:
   performing ping-pong avoidance operations based on the buffer zone structure.

10. The DSA method of claim 1, further comprising:
    receiving measurement reports that include eNodeB signal strength information from the wireless devices.

11. A dynamic spectrum arbitrage (DSA) system, comprising:
    an eNodeB comprising an eNodeB processor;
    a dynamic spectrum controller (DSC) comprising DSC processor coupled to the eNodeB via a first communication link; and
    a dynamic spectrum policy controller (DPC) comprising a DPC processor coupled to the DSC via a second communication link,
    wherein the DSC processor is configured with processor executable instruction to perform operations comprising:
       receiving a notification message from the DPC identifying a successful bidder for a geographical area;
       generating a grid-map structure that includes a primary grid structure that identifies telecommunication cells in the geographical area;
       monitoring locations of wireless devices; and
       determining whether to initiate inter-network handover operations based on the locations of the wireless devices with respect to the telecommunication cells of the primary grid structure.

12. The DSA system of claim 11, wherein the eNodeB and DSC are included in a first telecommunication network and the DSC processor is configured with processor executable instruction to perform operations such that:
    receiving the notification message identifying the successful bidder for the geographical area comprises receiving a message identifying the first telecommunication network as the successful bidder;
    monitoring locations of wireless devices comprises monitoring the locations of wireless devices attached to a the eNodeB; and
    determining whether to initiate inter-network handover operations based on the locations of the wireless devices with respect to the telecommunication cells of the primary grid structure comprises determining whether to initiate handin operations to transfer the wireless devices attached to the eNodeB to another eNodeB in a second telecommunication network.

13. The DSA system of claim 11, wherein the eNodeB and DSC are included in a first telecommunication network and the DSC processor is configured with processor executable instruction to perform operations such that:
    receiving the notification message identifying the successful bidder for the geographical area comprises receiving a message identifying a second telecommunication network as the successful bidder;
    monitoring locations of wireless devices comprises monitoring a location of a wireless device that subscribes to the second telecommunication network and is attached to the eNodeB; and
    determining whether to initiate inter-network handover operations based on the locations of the wireless devices with respect to the telecommunication cells of the primary grid structure comprises determining whether to initiate backoff operations to transfer the wireless device to another eNodeB in the second telecommunication network.

14. The DSA system of claim 13, wherein the DSC processor is configured with processor executable instruction to perform operations such that the operation of determining whether to initiate backoff operations to transfer the wireless device to another eNodeB in the second telecommunication network is performed in response to one of:
    determining that resource lease period has ended;
    determining that the eNodeB is congested; and
    determining that the wireless device has moved outside of the geographical area.

15. The DSA system of claim 11, wherein the DSC processor is configured with processor executable instruction to perform operations such that receiving the notification message identifying the successful bidder for the geographical area comprises receiving a message identifying a first telecommunication network as the successful bidder, and wherein the DSC processor is configured with processor executable instruction to perform operations further comprising:
    allocating telecommunication resources of a second telecommunication network for access and use by wireless devices of the first telecommunication network based on the generated grid map structure.

16. The DSA system of claim 11, wherein the DSC processor is configured with processor executable instruction to perform operations such that generating the grid-map structure that includes the primary grid structure that identifies the telecommunication cells in the geographical area further comprises:
  classifying each of the telecommunication cells of the primary grid structure as being one of an interior cell and a border cell.

17. The DSA system of claim 16, wherein the DSC processor is configured with processor executable instruction to perform operations such that generating the grid-map structure that includes the primary grid structure that identifies the telecommunication cells in the geographical area comprises generating the grid-map structure to further include a buffer zone structure that identifies the telecommunication cells that are adjacent to the border cell.

18. The DSA system of claim 17, wherein the DSC processor is configured with processor executable instruction to perform operations such that generating the grid-map structure to include the buffer zone structure comprises generating the buffer zone structure to include multiple tiers.

19. The DSA system of claim 17, wherein the DSC processor is configured with processor executable instruction to perform operations further comprising:
  performing ping-pong avoidance operations based on the generated grid map structure.

20. The DSA system of claim 11, wherein the DSC processor is configured with processor executable instruction to perform operations further comprising:
  receiving measurement reports that include eNodeB signal strength information from the wireless devices.

21. A server computing device, comprising:
  a memory; and
  a processor coupled to the memory, wherein the processor is configured with processor executable instructions to perform operations comprising:
  receiving a notification message identifying a successful bidder for a geographical area;
  generating grid-map structure that includes a primary grid structure that identifies telecommunication cells in the geographical area;
  monitoring locations of wireless devices; and
  determining whether to initiate inter-network handover operations based on the locations of the wireless devices with respect to the telecommunication cells of the primary grid structure.

* * * * *